United States Patent [19]

Hoffman

[11] 4,306,449

[45] Dec. 22, 1981

[54] APPARATUS FOR CONTROLLING A MEMBER

[75] Inventor: John P. Hoffman, Peoria, Ill.

[73] Assignee: Caterpillar Tractor Co., Peoria, Ill.

[21] Appl. No.: 146,726

[22] PCT Filed: Dec. 5, 1979

[86] PCT No.: PCT/US79/01058

§ 371 Date: Dec. 5, 1979

§ 102(e) Date: Dec. 5, 1979

[51] Int. Cl.³ ............................................. G01M 15/00
[52] U.S. Cl. ............................................................ 73/116
[58] Field of Search .................... 73/116, 117, 133 R; 364/424, 551

[56] References Cited

U.S. PATENT DOCUMENTS

| | | | |
|---|---|---|---|
| 3,406,562 | 10/1968 | Perna, Jr. et al. ................. | 73/116 X |
| 3,516,287 | 6/1970 | Masuda et al. ....................... | 73/117 |
| 3,712,126 | 1/1973 | Campbell ............................. | 73/117 |
| 3,926,043 | 12/1975 | Marshall et al. ..................... | 73/117 |
| 4,121,452 | 10/1978 | Wakabayashi et al. .......... | 73/117 X |

Primary Examiner—Jerry W. Myracle
Attorney, Agent, or Firm—Phillips, Moore, Weissenberger, Lempio & Majestic

[57] ABSTRACT

Apparatus (11) for moving a member in accordance with a predetermined speed curve (1) having a plurality of sequential intervals (0-0', 1-2, 2-3, 3-4, 4-5, 5-6, 6-7, 7-8), including controlled devices (12, 14, 16, 18, 30, 34, 40, 44) for controlling the speed of the member and an automatic controller (10) to control the controlled devices to run the member as specified by the speed curve. Prior systems required a highly skilled operator to manipulate various controls to actuate the controlled devices (12, 14, 16, 18, 30, 34, 40, 44), but this has been eliminated through the use of the automatic controller (10). The apparatus (11) can principally be used to control the speed of an engine through a sequence of intervals to test, for example, for smoke emissions during certain of the intervals.

90 Claims, 27 Drawing Figures

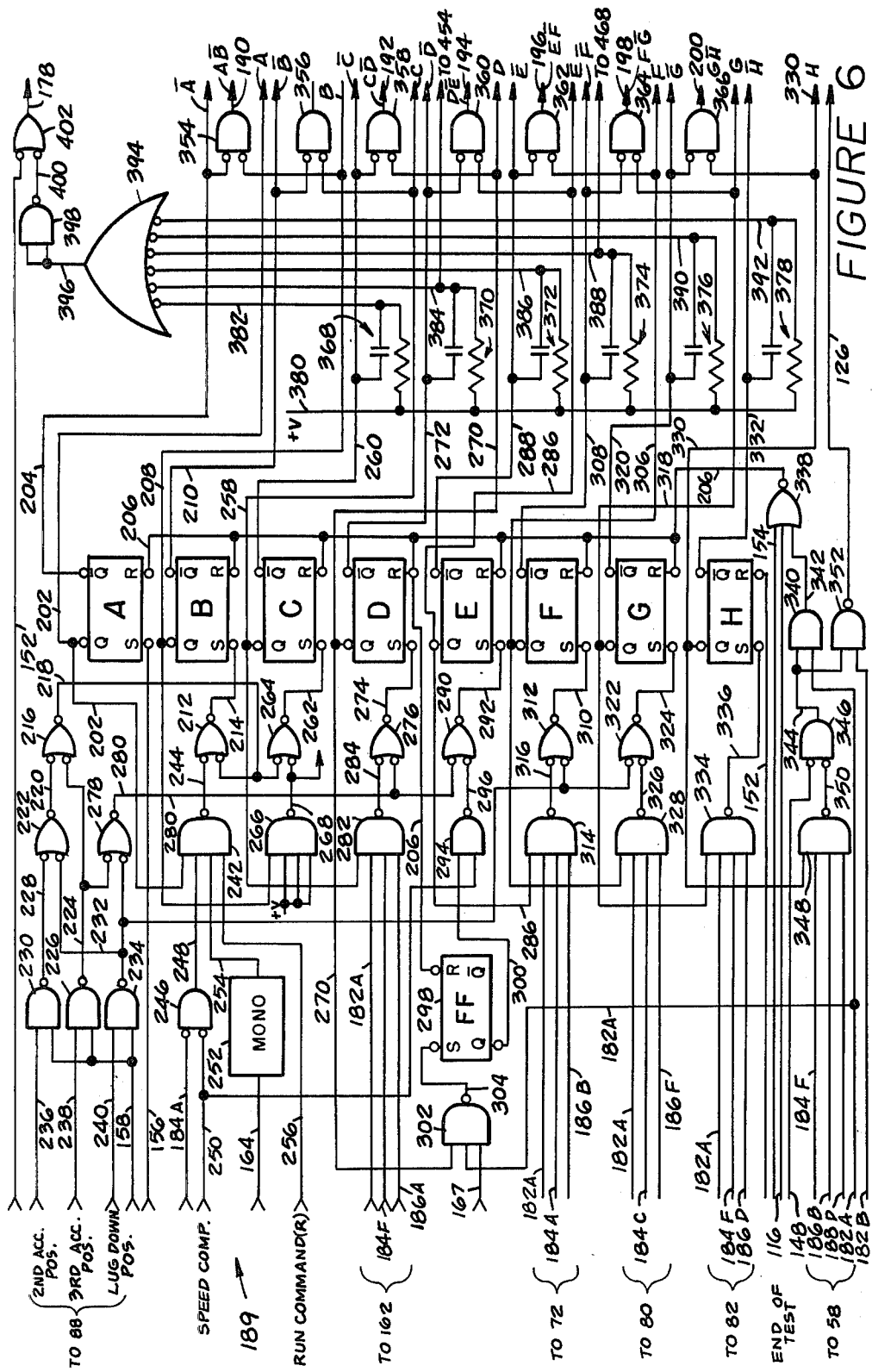

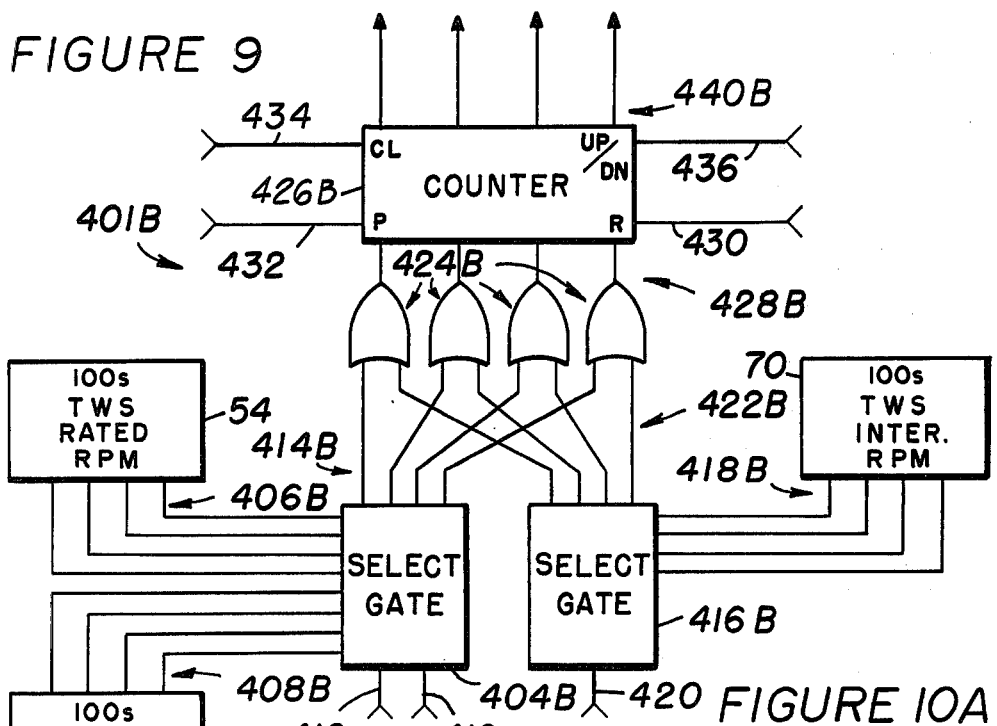
FIGURE 9
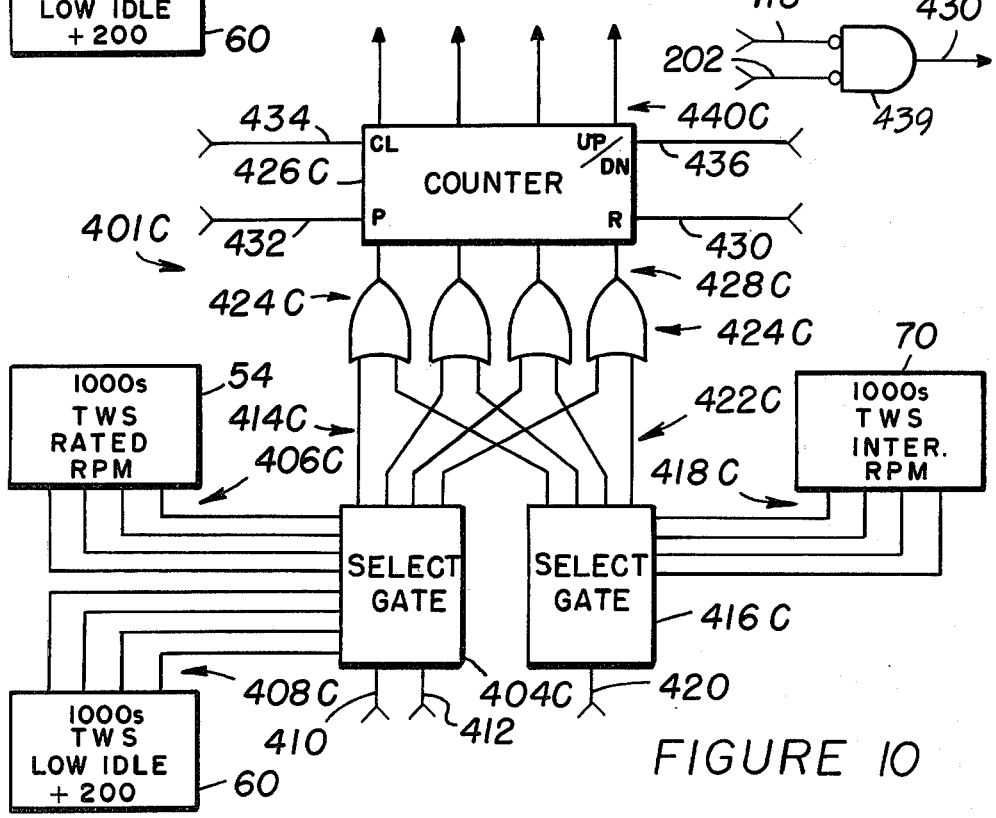
FIGURE 10A
FIGURE 10

APPARATUS FOR CONTROLLING A MEMBER

DESCRIPTION

1. Technical Field

The present invention relates to apparatus for controlling a member and, more particularly, to apparatus for controlling the speed of an engine in accordance with a predetermined speed curve.

2. Background Art

Systems for controlling a member are well known. For example, to control the movement of position of a member, a command signal is generated and compared to a feedback signal to produce a control signal. The feedback signal will give information concerning, for example, the actual speed or position of the member, while the command signal provides information as to the desired speed or position of the member. The control signal will then actuate the member until the desired speed or position is achieved.

The information needed to generate command signals can be obtained from a variety of sources, depending upon the results sought to be achieved by the system. For example, if the member is to be moved randomly, then a systems operator can manually and randomly move controls to generate the command signals. On the other hand, the movement of the member can be ordered, with the command signals being generated automatically based on some predetermined, ordered information stored, for example, on computer tape.

One reason for controlling a member in an ordered sequence is as follows. Recently, the Environmental Protection Agency (EPA) has issued regulations specifying that vehicle engines, such as heavy duty diesel truck engines, should be tested for the amount of smoke emissions which are produced. The EPA has specified that the engine being tested be operated in a predetermined sequence and that the smoke emissions be recorded during certain intervals of the sequence. The sequence involves controlling the speed of the engine through various intervals. As will be described in more detail below, these intervals include, for example, a low idle interval, several acceleration intervals, and several speed reduction intervals. The sequence of operation of the engine can be graphically shown by a curve of engine speed vs. time. Thus, this speed curve gives command information for orderly changing the speed of the engine in a predetermined manner.

In prior systems, the engine speed was manually changed to control the engine as specified by the EPA speed curve. The systems operator was required to manipulate various controls to actuate the engine throttle and a dynamometer, the latter loading the engine to control engine speed.

One significant disadvantage of the prior manual control systems for running an EPA test is the need for a well-coordinated, highly-skilled systems operator. This is because the speed curve or EPA test standards requires the operator to constantly monitor the system and quickly manipulate the controls to change the engine speed as needed. For example, the speed curve specifies a second acceleration interval followed immediately by a speed reduction interval called a closed-throttle-pull-down interval. The operator had to carefully manipulate the controls to accelerate the engine as specified by the curve for the second acceleration interval by opening the throttle and controlling activation and de-activation of the dynamometer. Then, during the second acceleration interval, the operator had to anticipate the closed-throttle pulldown interval and manipulate the controls to rapidly close the throttle at the onset of the latter interval. Furthermore, during the closed-throttle pull-down interval, the operator would have to manipulate the controls to apply a load which is equal to that required for accelerating the engine during a third acceleration interval succeeding the closed-throttle-pull-down interval.

Another problem is that the EPA test procedure requires that the engine be operated through the above intervals three times or cycles in succession for a valid test run. This places a burden on the operator to manipulate the controls consistently through each cycle so that a proper test run could be made. This need for consistency added to the skill required of the operator. As a corollary disadvantage, the efficiency in terms of man-hours and engine use hours was reduced because of the increased time needed to make a proper EPA test.

Furthermore, the operator could not control the dynamometer quickly enough to accelerate the engine as specified by the EPA test procedures. Therefore, inertia, in the form of expensive weights, had to be coupled to the engine. These weights would help the operator to control engine acceleration at the specified rates; otherwise, the engine would accelerate too fast, particularly during the second acceleration interval. Moreover, the systems operator would have to select and install, by trial and error, for each different engine being tested, the proper weights.

DISCLOSURE OF INVENTION

The present invention is directed to overcoming one or more of the problems as set forth above.

In one aspect of the invention, there is provided apparatus for actuating an engine in accordance with a predetermined speed curve having a plurality of sequential intervals, the curve specifying the engine speed at any instant of time, including means for controlling the speed of the engine and means for automatically actuating the controlling means to run the engine.

In another aspect of this invention, there is provided apparatus for actuating controlled devices to operate a member in a sequence specified by a predetermined curve, the curve including a plurality of lines, each line having a slope and end points and corresponding to an interval in the sequence, comprising first means for generating first signals corresponding to the intervals, second means for generating second signals corresponding to the slopes of certain of said lines and means for generating control signals to control the devices to operate the member in response to the first and second signals.

By using the automatic means of the present invention, a member, such as an engine, can be operated consistently and without the need for a skilled operator in accordance with a specified speed curve. Thus, the problems with prior manual control systems are avoided.

BRIEF DESCRIPTION OF THE DRAWINGS

FIG. 6 illustrates, schematically, a signal generator of the controller for generating interval signals and clock reset signals;

FIGS. 7–10 are schematic drawings of signal generators of the controller for generating digital speed command signals;

FIG. 10A is a schematic diagram of a circuit of the controller for resetting the signal generators of FIGS. 7–10.

BEST MODE OF CARRYING OUT THE INVENTION

Figure 1:
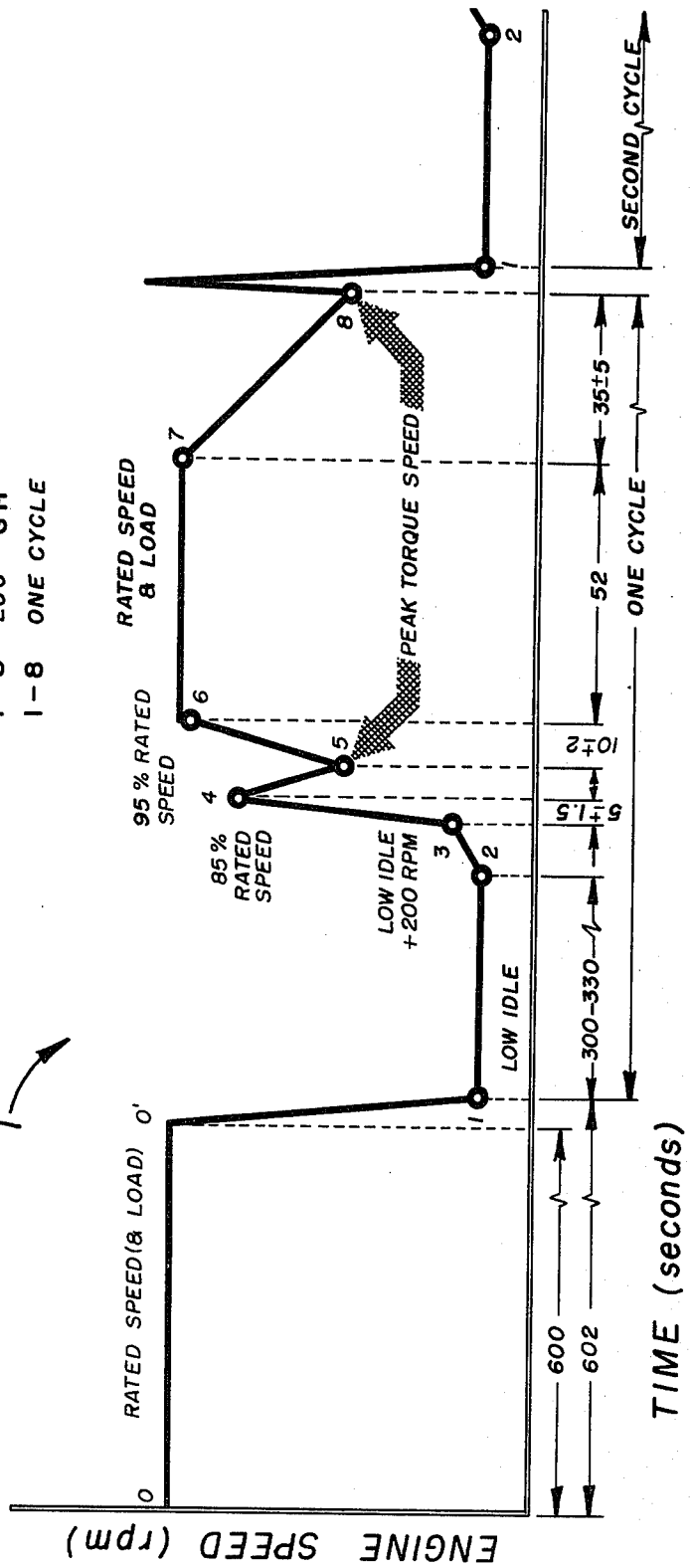
FIG. 1 illustrates a curve of engine speed vs. time for an EPA test procedure.

FIG. 1 can be considered to show a generalized curve 1 that provides information for controlling a member through a course. In particular, the course specified by this curve 1 is a sequence of operating a controlled member. Still more particularly, FIG. 1 is a curve 1 of engine speed vs. time providing data for the running of an engine (not shown).

The sequence of operating or running the engine at the speed given by the curve 1 is predetermined and has been specified by the Environmental Protection Agency (EPA). The purpose of this sequence is to test the engine for smoke emissions at various times or intervals while operating the engine. With reference to FIG. 1, the test procedure for operating the engine is as follows.

The engine is first preconditioned or warmed by operating it for 600 seconds at rated speed and load, as shown by the warm-up interval 0-0' of the curve. Next, the engine is caused to idle for 300–330 seconds at the low idle speed of the engine, as shown by the low idle interval 1-2. During this interval 1-2, the engine should be run with minimum load.

At the end of the low idle interval 1-2, the engine speed must be increased to 200±50 rpm above the low idle speed within 3 seconds and this is indicated by the interval 2-3 called a first acceleration interval. FIG. 1 does not show on the time axis of curve 1 this time period of 3 seconds. This is because, as will become apparent below, the invention terminates this interval on speed, i.e., when the engine reaches low idle speed plus 200 rpm, rather than time. This will occur within the specified 3 seconds for the first acceleration interval 2-3. The time axis is not shown to scale so that the curve 1 can be seen more clearly.

Next, as indicated by the interval 3-4 of curve 1, the engine must be accelerated such that the engine speed reaches 85–90% of rated speed in 5±1.5 seconds. This is called a second acceleration interval 3-4 which must be linear within ±100 rpm. Also, the engine must be accelerated with the engine throttle (see FIG. 2) fully opened during this interval 3-4.

When the engine reaches the required speed at the end of the second acceleration interval 3-4, the throttle (FIG. 2) must be moved rapidly to a closed position and the engine speed reduced to a speed of maximum rated torque, or 60% of rated speed, whichever is higher, within ±50 rpm. This is called a closed-throttle-pulldown (CTPD) interval 4-5. No time is shown on the time axis of curve 1 for the CTPD interval 4-5 because this interval terminates on speed, rather than time. Also, during the CTPD interval 4-5, an engine load must be applied that is used in the immediately following interval.

At the end of the CTPD interval 4-5, the throttle must be moved rapidly to a fully opened position and the engine accelerated against the load which was applied during the CTPD interval 4-5. This next acceleration is called the third acceleration interval 5-6. The applied load must be such that the engine accelerates linearly to 95–100% of rated speed in 10±2 seconds, as shown in curve 1.

After the third acceleration interval 5-6, the engine must be run at rated speed and load. This is called a stabilization interval 6-7 and can occur, for example, for approximately 52 seconds with the throttle fully open.

Following the stabilization interval 6-7, and with the throttle still in a fully open position, the engine must be gradually slowed by loading it to a speed of maximum torque, or 60% of the rated speed, whichever is higher. This is called the lug interval 7-8, which must be performed smoothly over a period of 35±5 seconds. Also, the rate of slowing the engine must be linear, within ±100 rpm. After completion of lug interval 7-8, the engine must be unloaded and the throttle closed to return it to the low idle speed.

The EPA test procedures require that after preconditioning the engine during the warm-up interval 0-0', the engine be run through three cycles of operation. A cycle, as shown in FIG. 1, is the entire interval between the beginning of interval 1-2 at point 1 to the end of interval 7-8 at point 8. Thus, after completing the lug interval 7-8 of the first cycle, the engine is immediately run through the next two cycles, each commencing with the low idle interval 1-2.

The curve 1 can be analyzed to constitute a plurality of intervals 0-0', 1-2, 2-3, etc., each constituting a straight line having end points. For example, interval 2-3 has a straight line with one end point 2 corresponding to 300–330 seconds from the start of interval 1-2, while the other end point 3 corresponds to a speed of low idle $+200\pm50$ rpm. Also, the lines for intervals 3-4 and 5-6 have a positive slope while the line for interval 7-8 has a negative slope.

Figure 2:
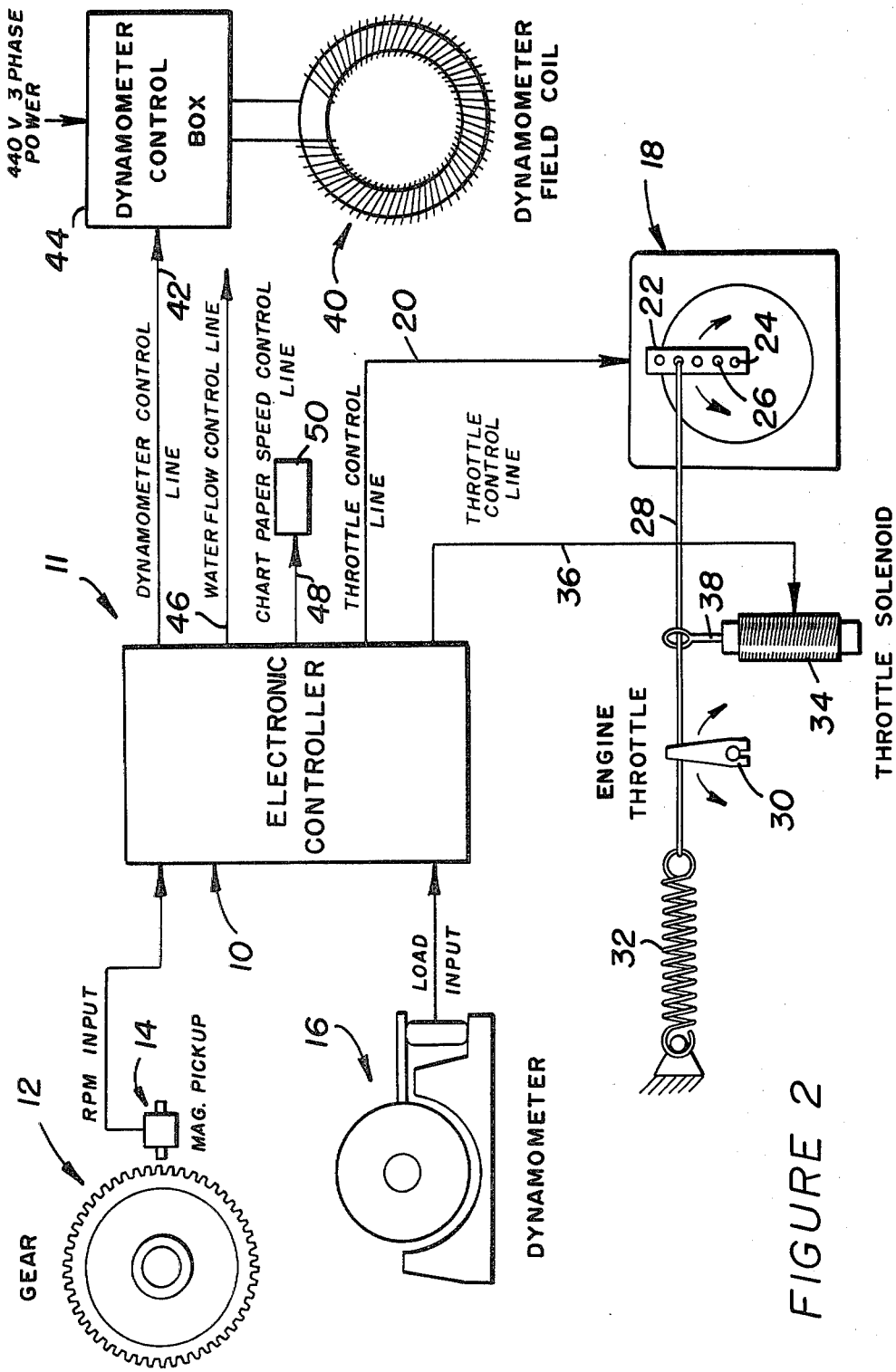
FIG. 2 is a block diagram of an embodiment of the present invention.

FIG. 2 illustrates an electronic controller 10 of an overall engine control system 11. The controller 10 automatically controls the speed and loading of the engine such that it is operated over the course or in a sequence specified by the curve 1 of FIG. 1. The controller 10 receives input information as to the speed of, and load on, the engine. Engine speed is obtained with a toothed wheel or gear 12 that is connected to, and rotates with, an output shaft of the engine, and a conventional magnetic pick-up 14 which senses the teeth of the wheel 12 as the latter rotates. The output of the pick-up 14 is a frequency signal that is proportional to the speed of the engine. Load information is received by the controller 10 from a load cell attached to a conventional eddy current dynamometer 16. This load data is in the form of a voltage signal that is proportional to the load or torque on the engine.

The controller 10 generates a plurality of control signals for running the engine as required by the curve 1 of FIG. 1. A servo motor 18 is actuated by one of the control signals over a line 20. The motor 18 then rotates a lever 22 about a motor shaft axis 24, which lever 22 has a plurality of eyelets 26. A cable 28 is coupled to one of the eyelets 26 and, through an engine throttle 30, to a return spring 32 which biases the throttle 30 to a closed position.

Upon energization of the motor 18, the lever 22 will rotate to open the throttle 30 against the bias of the spring 32. The speed at which the throttle 30 is opened is set by the coupling of the cable 28 to a particular eyelet 26. The coupling of the cable 28 to the outer most eyelet 26 from the axis 24 will open the throttle quickly in relation to the coupling of the cable 28 to the inner most eyelet 26.

A solenoid 34 is energized by another control signal from the controller 10 via a line 36. The solenoid 34, when energized, withdraws an armature 38 through which the cable 28 extends. The solenoid 34, when so energized, will withdraw the armature 38 to quickly pull down the cable 28 and very rapidly move the throttle 30 to a fully opened position.

The dynamometer 26 has a field coil 40 which, when energized, provides a load on the engine. Another control signal from the controller 10 on a line 42 actuates a dynamometer control circuit 44. When actuated by this control signal on line 42, the circuit 44 couples a 440 V, three-phase electrical source to the field coil 40 to energize this coil.

Other control signals are supplied by the controller 10 on a line 46 and a line 48. The control signal on line 46 regulates the flow of cooling water through the dynamometer 16. The control signal on line 48 regulates the speed of a chart paper recorder 50 which provides a trace of the actual engine speed. This trace should be the same as the predetermined curve shown in FIG. 1.

Figure 3:
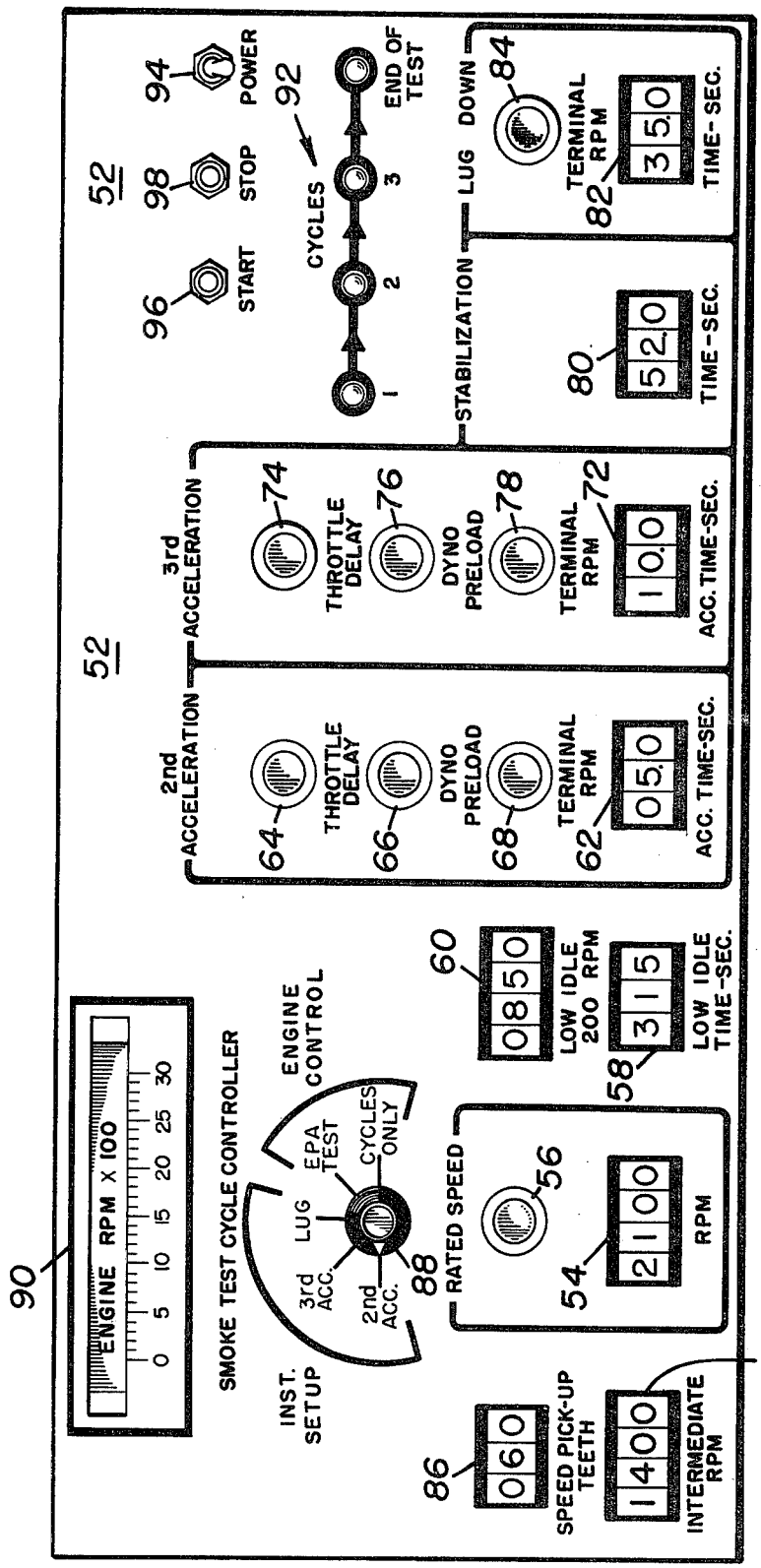
FIG. 3 illustrates the front panel of an electronic controller of FIG. 2.

FIG. 3 shows the front console 52 of the controller 10. A thumbwheel switch 54 is used to program or prestore data as to the rated speed of the particular engine being tested. In the example shown by FIG. 3, the engine has a rated speed of 2100 rpm. A fine adjustment knob 56 is used to fine tune this stored data to correspond exactly to 2100 rpm. This information is used for the warm-up interval 0-0' and the stabilization interval 6-7.

A thumbwheel switch 58 is used to program or preset the duration of the low idle interval 1-2. In the example given, this is 315 seconds which occurs at point 2 on the curve 1 of FIG. 1. Actually, as will become apparent, this setting of thumbwheel switch 58 is used for the low idle intervals of the second and third cycles. A thumbwheel switch 60 is used to program or preset the terminal speed of the first acceleration interval 2-3. In this example, the low idle speed of the engine being tested is 650 rpm so that the terminal speed at point 3 on the curve 1 is 850 rpm.

In relation to the second acceleration interval 3-4, a thumbwheel switch 62 is used to program and prestore the duration of this interval. The preset duration of 5 seconds also corresponds to point 4 on the curve 1. A dial 64 is used to adjust or delay the time at which the throttle 30 is fully opened after commencement of the second acceleration interval 3-4. A dial 66 is used to preset the duration of unconditionally loading the engine at the start of the second acceleration interval 3-4 before the throttle 30 is fully opened. The reasons for this delay and loading will be discussed below. A dial 68 is used for fine tuning purposes to ensure that the engine is at 85% of rated speed at the completion of the second acceleration interval 3-4.

A thumbwheel switch 70 is used to program and prestore data corresponding to the peak torque speed of the engine which, in this example, is 1400 rpm. This information is used at point 5 of the curve 1 to terminate the CTPD interval 4-5.

In relation to the third acceleration interval 5-6, a thumbwheel switch 72 is used to program and prestore data corresponding to the duration of interval 5-6, i.e., 10 seconds, or point 6 on curve 1. A dial 74 is used to adjust or delay the time at which the throttle 30 is fully opened at the beginning of the third acceleration interval 5-6. A dial 76 is used to preset the load against which the engine is to be accelerated for the interval 5-6. A dial 78 is employed to adjust the terminal rpm of the engine at the end of the third acceleration interval 5-6, which speed should be 95% of rated speed, in the example.

Another thumbwheel switch 80 is used to program and prestore data corresponding to the duration of interval 6-7 of 52 seconds. This 52 seconds corresponds to point 7 on the curve 1. With respect to the lug interval 7-8, another thumbwheel switch 82 is used to program and prestore information corresponding to point 8 on the speed curve, this point being 35 seconds after the commencement of the interval 7-8, which is its duration. The speed of the engine at the termination of the interval 7-8, in this example, must be at the peak torque speed of 1400 rpm, and a dial 84 is used to make adjustments for this speed.

As shown in FIG. 2, the wheel 12 has a plurality of teeth which are sensed by the pick-up 14. In order to obtain a proper voltage signal proportional to the actual speed of rotation of the engine, data as to the number of teeth on the wheel 12 should be programmed and pre-stored. This is accomplished by setting the thumbwheel switch 86 on console 52. In the example shown the wheel 12 has 60 teeth.

The console 52 also has a dial 88 that can be set in any one of five positions. These positions are identified as second acceleration, third acceleration, lug, EPA test and cycles only, as shown. For initial set-up purposes of the controller 10, the dial 88 is placed in either the second acceleration, third acceleration, or lug position. This initial set-up, as will be further described, is accomplished prior to engine hook-up or connecting the controller 10 as shown in FIG. 2. After engine hook-up, and when the dial 88 is in the EPA test or cycles only position, the engine speed will be controlled automatically for, respectively, an entire EPA test procedure or only through at least one cycle but commencing with the first acceleration interval 2-3. In other words, when dial 88 is in the cycles only position, the engine will be initially operated starting with the first acceleration interval 2-3 for reasons which will become apparent below.

Also shown on the console 52 is a tachometer 90. This tachometer 90 is used for initial set-up purposes and provides a read-out of the various command speeds that the controller 10 is calling for. Also shown are lights 92 which are lit during the first, second and third cycles of the EPA test and at the end of the test, respectively. A power-on switch 94 is on the console 52, together with a start button 96 and stop button 98.

Before describing the remaining figures, which show various logic circuits, the convention used in illustrating the logic circuit elements should be noted. Logic elements such as a NOR gate, AND gate, or flip-flop, having circles at their inputs, means that these components are qualified or enabled by low level signals. Those logic elements which do not have the circles at their inputs are qualified or enabled by high level signals. Furthermore, multivibrators are shown having +and/or−trigger inputs, meaning that they are triggered by positive and/or negative going edges of a pulse. Also, each remaining figure will be described first as to the structure of that circuit followed by the manner of its operation. After all such circuits are so described, the manner in which all these circuits interrelate to run the engine through the sequence of curve 1 will be discussed.

FIG. 4—START AND RESET CIRCUIT

Figure 4:
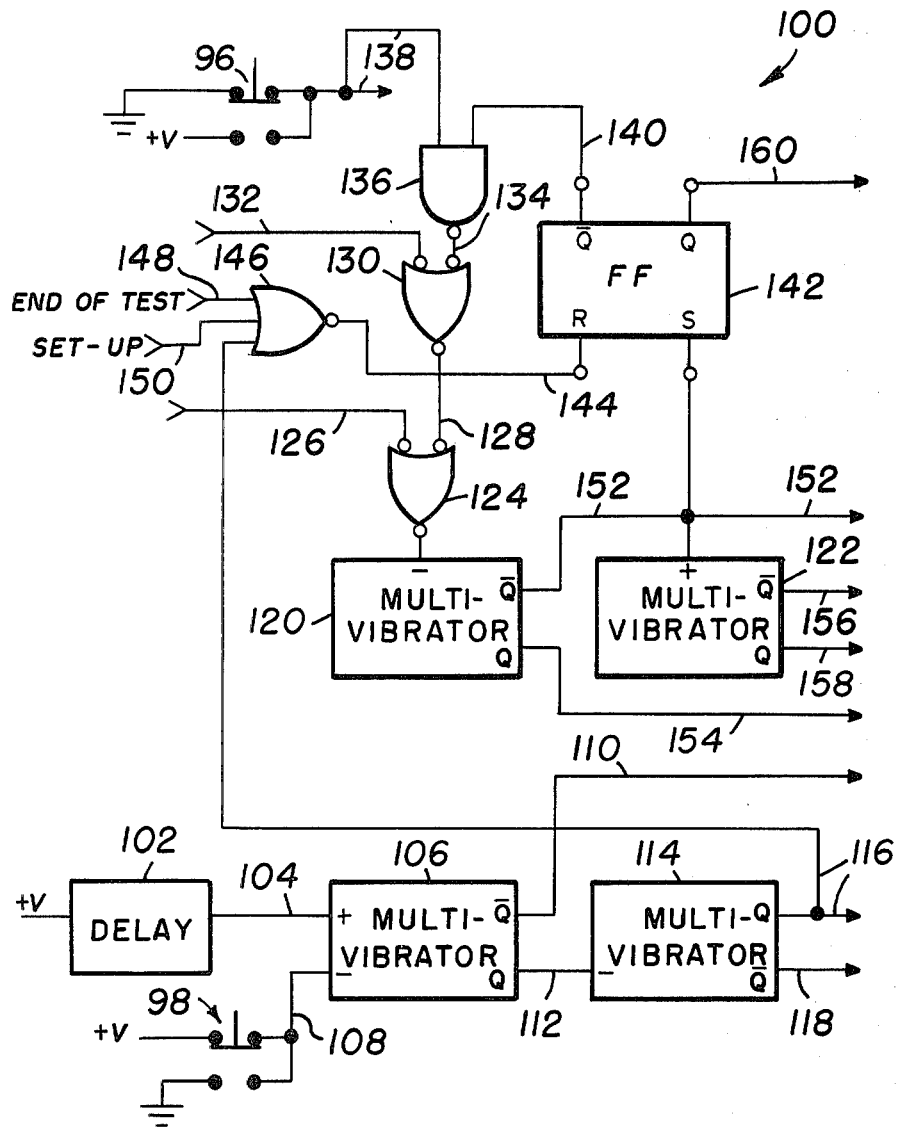
FIG. 4 shows a schematic diagram of the start and reset pulse generator circuits of the controller.

FIG. 4 shows a logic circuit 100 of controller 10 for generating start and reset signals. When the power switch 94 (see FIG. 3) is turned on, +V comes up and is supplied, after a short period determined by a delay 102, over a line 104 to trigger a monostable multivibrator 106. The delay 102 is utilized to enable the other circuit components of the controller 10 to settle when power is first supplied before the multivibrator 106 is triggered. The stop button 98, when depressed, will couple the multivibrator 106 to ground over a line 108, whereby the multivibrator 106 also will be triggered. As will become apparent, the triggering of multivibrator 106 initializes, i.e., resets, internal circuitry such that a cycle of operation can be initiated.

The multivibrator 106 has an output $\bar{Q}$ coupled to a line 110 and an output Q coupled to a line 112. Another monostable multivibrator 114 is triggered by the trailing edge of the pulse on line 112 to produce an output Q and an output $\bar{Q}$ on lines 116 and 118, respectively.

The circuit 100 has a monostable multivibrator 120 and a monostable multivibrator 122 which, when triggered, generate various signals. The multivibrator 120 is triggered by the output of a NOR gate 124 which has one input coupled to a line 126 and another input coupled to a line 128. Line 126 carries a low signal at the end of the low idle interval 1-2 for the second and third cycles to qualify gate 124. A NOR gate 130 provides an output signal on the line 128 and has one input coupled to a line 132. The other input of the NOR gate 130 is coupled over a line 134 to the output of a NAND gate 136. Line 132 carries a start signal at the end of the warm-up interval 0-0' to start a first cycle 1-8.

When the start button 96 is depressed, a line 138 supplies one input to the gate 136. The other input to the gate 136 is provided over a line 140 which is coupled to the output $\bar{Q}$ of a start-lockout flip-flop 142. This flip-flop 142 is reset by the signal on a line 144 which is coupled to the output of a NOR gate 146. The inputs of the gate 146 are coupled to the line 116, to a line 148 and to a line 150. The line 148 carries a reset signal at the end of an EPA test run while the line 150 carries a reset signal at the end of a particular interval when initially setting up the controller 10.

The flip-flop 142 is set by a pulse on a line 152 which is coupled to the output $\bar{Q}$ of the multivibrator 120. The Q output of the multivibrator 120 is provided on a line 154. The multivibrator 122 is triggered by the pulse on line 152 and provides pulses at its output $\bar{Q}$ on a line 156 and at its output Q coupled to a line 158. The flip-flop 142 has its output Q coupled to a line 160.

FIG. 4—CIRCUIT OPERATION

After turning on the power switch 94, (See FIG. 3) the multivibrator 106 is triggered to produce a pulse on line 112. When the pulse on line 112 goes low after multivibrator 106 times out, the multivibrator 114 is triggered to produce pulses on lines 116 and 118. The positive pulse on line 116 qualifies or enables the NOR gate 146 to reset the flip-flop 142 whereby gate 136 has one input qualified by the signal on line 140. Then, when the start button 96 is depressed, the other input on gate 136 is qualified so that a low trigger signal is coupled through gate 130 and gate 124 to trigger the multivibrator 120. Consequently, a low pulse is generated by the multivibrator 120 on the line 152 and a high pulse is generated on the line 154.

The low pulse on line 152 immediately sets the flip-flop 142 and, after a short duration when multivibrator 120 times out, the positive going edge of this pulse triggers the multivibrator 122. The setting of the flip-flop 142 will inhibit retriggering the multivibrator 120, should the start button 96 again be depressed, until the flip-flop 142 is reset. The multivibrator 122, once triggered, will then supply pulses on the line 156 and line 158.

The multivibrator 120 can also be triggered by supplying the signal on the line 132. This signal will be generated at the end of the warm-up interval 0-0' thereby enabling the gate 130 and gate 124 to trigger the multivibrator 120.

At the end of an EPA test run, a signal is supplied on the line 148 to enable the gate 146 and thus reset the flip-flop 142. Also, when the dial 88 is in the second acceleration or third acceleration or lug position, at the end of these corresponding intervals, a signal is supplied on the line 150 to reset the flip-flop 142 via the gate 146. Consequently, the start button 96 can be effective to trigger the multivibrator 120 again at the end of a test run or at the end of one of such intervals, or as already indicated, when the power is first turned on. At the end of the low idle interval 1-2 for cycles two and three, the enabling signal on line 126 is generated. This signal is coupled through the gate 124 also to trigger the multivibrator 120.

At any time, the stop button 98 can be depressed to trigger the multivibrator 106. This will result in pulses being generated on lines 110, 116 and 118 to reset the other circuits to be described and stop the sequence of operating the engine.

FIG. 5—CLOCK SIGNAL GENERATOR

Figure 5:
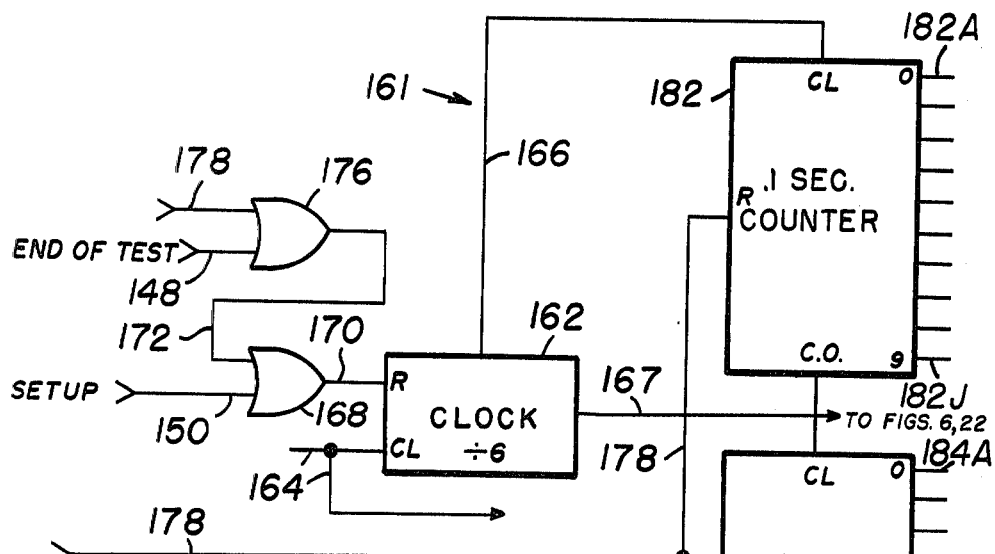
FIG. 5 illustrates, schematically, a clock signal generator of the controller.

FIG. 5 shows a circuit 161 of the controller 10 for generating timing signals. A clock 162, which receives a 60 Hz signal on a line 164 from a power supply (not shown) divides this signal by 6 to provide 10 Hz clock signals on a line 166 and a line 167. The clock 162 is initialized or reset by the output of an OR gate 198 on a line 170. The OR gate 168 has one input coupled to a line 172 and another input coupled to the line 150. An OR gate 176 provides its output on the line 172 and has one input coupled to a line 178 and another input coupled to the line 148. The signal on line 178 is a reset pulse that is generated at the end of one interval and start of the next interval.

The 10 Hz clock signals on the line 166 are counted by four counters 182, 184, 186 and 188 connected in cascade. Counter 182 counts tenths of a second; counter 184 counts seconds; counter 186 counts tens of seconds; and counter 188 counts hundreds of seconds. Each counter 182, 184, 186, and 188 is shown as having ten output lines 182A-J, 184A-J, 186A-J, and 188A-J. Each of the counters 182, 184, 186, and 188 is reset by a signal on the line 178.

FIG. 5—CIRCUIT OPERATION

With the clock 162 not being initialized by a signal on line 170, the 60 Hz signal on line 164 is divided by six to produce the 10 Hz pulses on line 166. Since the 10 Hz pulses have a period of 0.1 second, as each pulse is counted by the counter 182, a corresponding line 182A-J will go high. At the beginning of each second, a corresponding line 184A-J of counter 184 will go high. At the beginning of each tens of seconds, the counter 186 will provide a high signal on the corresponding lines 186A-J. And, at the beginning of each hundreds of seconds, a high signal will be produced on a corresponding line 188A-J of the counter 188.

The reset pulse on line 178 is generated, among other times to be described, at the end of an interval such as the second acceleration interval 3-4. The reset pulse is coupled directly to the counters 182, 184, 186, and 188 to reset them at this time and through the gate 176 and gate 168 to initialize the clock 162.

At the end of an EPA test run, the reset signal is provided on the line 148 to enable the gate 176 and gate 168 to initialize the clock 162. A reset signal is also generated on the line 150 at the end of a particular interval when the dial 88 is in one of the initial set-up positions. This latter reset signal qualifies the gate 168 to initialize the clock 162.

FIG. 6—INTERVAL SIGNAL GENERATOR

FIG. 6 shows a circuit 189 of controller 10 for generating interval signals whose duration corresponds to the duration of intervals 1-2, 2-3, 3-4, 4-5, 5-6, 6-7 and 7-8, as well as signals for producing the pulses on the line 126 and the line 178. Eight flip-flops A-H each have an output Q and an output $\overline{Q}$ as will be described, and these outputs of flip-flops A-H are combined to produce interval signals on lines 190, 192, 194, 196, 198 and 200. Each flip-flop A-H will be discussed by describing the output signals of one flip-flop followed by a description of the logic elements for setting and resetting the one flip-flop. The flip-flops A-H are set in a successive sequence to be described for an EPA test run or cycles-only run.

Flip-flop A provides a signal A at its output Q on a line 202. A signal $\overline{A}$ is provided on a line 204 at the output $\overline{Q}$ of flip-flop A. It should be noted that a similar convention of signal identification will be used with respect to the outputs Q and $\overline{Q}$ of the other flip-flops B-H. Flip-flop A is reset with a signal on a line 206 and is set with a signal on the line 156 from FIG. 4.

Flip-flop B provides an output Q or signal B on a line 208. The output $\overline{Q}$ of flip-flop B or signal $\overline{B}$ is supplied on a line 210. The signal on line 206 resets flip-flop B. Flip-flop B is set by the output of a NOR gate 212 on a line 214.

One input to the NOR gate 212 is the output of a NOR gate 216 on a line 218. The NOR gate 216 has one input on a line 220 coupled to the output of a NOR gate 222 and another input on a line 224 coupled to the output of a NAND gate 226. The NOR gate 222 has one input coupled to a line 228 which is coupled to the output of a NAND gate 230. The other input of the NOR gate 222 is coupled over a line 232 to the output of a NAND gate 234.

Gate 226, gate 230 and gate 234 each has one input coupled to the line 158 from FIG. 4. The other input of gate 230 is coupled to a line 236 which is connected to the second acceleration position of the dial 88 of FIG. 3. The other input of the gate 226 is connected to a line 238 which is coupled to the third acceleration position of the dial 88. The gate 234 has its other input connected to a line 240 which extends to the lug position of the dial 88.

The NOR gate 212, whose output is used to set flip-flop B, has its other input coupled to the output of a NAND gate 242 over a line 244. One input to the gate 242 is the signal A on the line 202 from flip-flop A. A second input of the gate 242 is the output of an AND gate 246 on a line 248. One input to the gate 246 is the signal on the line 184A from FIG. 5. The other input of the gate 246 is a signal on a line 250 which is generated when the actual engine speed equals a command or desired speed.

A third input of the gate 242 is the output of a monostable multivibrator 252 on a line 254. The multivibrator 252 is triggered by the 60 Hz signal on the line 164 from FIG. 5. A fourth input to the gate 242 is a run-command signal R on a line 256 which is generated after the low idle interval 1-2 of cycle 1 or when the dial 88 is in the cycles only position.

Flip-flop C produces its output Q on a line 258 carrying a signal C. The output $\overline{Q}$ of the flip-flop C is produced on a line 260 carrying the signal $\overline{C}$. Flip-flop C is reset with the signal on line 206.

The set input of the flip-flop C is provided on a line 262 connected to the output of a NOR gate 264. One input to the NOR gate 264 is the signal on line 218. The other input of the NOR gate 264 is connected to the output of a NAND gate 266 over a line 268. Gate 266 has one input connected to the output Q of flip-flop B on line 208 and its other inputs are connected to +V.

FLip-flop D has its output Q supplied on a line 270 carrying a signal D. The output $\bar{Q}$ of flip-flop D for producing the signal $\bar{D}$ is on a line 272. Flip-flop D is reset with the signal on the line 206.

Flip-flop D has its set input connected to a line 274 which is coupled to the output of a NOR gate 276. One input to the gate 276 is the output of a NOR gate 278 over a line 280. One input of the NOR gate 278 is coupled to the line 224 and the other input of the gate 278 is connected to the line 232.

The other input of the NOR gate 276 is connected to the output of a NAND gate 282 over a line 284. The gate 282 has one input connected to the output Q of flip-flop C on line 258. The other three inputs of the gate 282 are the signals on the lines 182A, 184F and 186A from FIG. 5. The signals on these lines 182A, 184F, and 186A are coupled through the setting of contacts (not shown) of the second acceleration thumbwheel switch 62 to these lines. In the example given, the thumbwheel switch 62 has been set to five seconds which is the duration of the second acceleration interval 3-4.

Flip-flop E has its output Q coupled to a line 286 carrying the signal E. Flip-flop E has its output $\bar{Q}$ coupled to a line 288 carrying the signal $\bar{E}$. The line 206 is coupled to the reset input of flip-flop E.

To set the flip-flop E, a NOR gate 290 feeds an output signal over a line 292 to the set input. The gate 290 has one input coupled to the line 280 and its other input coupled to the output of a NAND gate 294 over a line 296.

One input of the NAND gate 294 is connected to the line 250. The other input of the gate 294 is coupled to the output Q of a flip-flop 298 over a line 300. The flip-flop 298 is reset with the signal on the line 206 and set with an output signal from a NAND gate 302 over a line 304. The gate 302 has one input connected to the line 270 or output Q of flip-flop D, a second input connected to the line 182A from FIG. 5, and a third input connected to the line 167 from FIG. 5.

The output Q of flip-flop F is generated on a line 306 carrying the signal F. Flip-flop F has its output $\bar{Q}$ coupled to a line 308 carrying the signal $\bar{F}$. Flip-flop F is reset with the signal on line 206.

The set input of flip-flop F is coupled over a line 310 to the output of a NOR gate 312. One input to the NOR gate 312 is the signal on line 232 and the other input to the gate 312 is the output of the NAND gate 314 on a line 316. The gate 314 has one input connected to the output Q of flip-flop E on line 286. Three other inputs of the gate 314 are connected to the respective lines 182A, 184A, and 186B through the third acceleration thumbwheel switch 72 on the console 52. This connection corresponds to the ten second time period for the third acceleration interval 5-6 in the present example.

Flip-flop G has its output Q coupled to a line 318 carrying the signal G. The output $\bar{Q}$ of flip-flop G is connected to a line 320 carrying the signal $\bar{G}$. Flip-flop G is reset with the signal on line 206.

Flip-flop G has its set input connected to the output of a NOR gate 322 over a line 324. One input of the gate 322 is connected to the line 232. The other input of the gate 322 is connected over a line 326 to the output of a NAND gate 328. One input of the gate 328 is the output Q of flip-flop F on the line 306. The other three inputs to the gate 328 are connected to the lines 182A, 184C, and 186F of FIG. 5 through the stabilization thumbwheel switch 80 on the console 52. This corresponds to the time of 52 seconds for the stabilization interval 6-7 in the example.

The output Q of flip-flop H is provided over a line 330 carrying the signal H and output $\bar{Q}$ of this flip-flop H is coupled to a line 332 carrying the signal $\bar{H}$. Flip-flop H is reset with the signal on line 152 from FIG. 4.

Flip-flop H is set with the output of a NAND gate 334 via a line 336. One input of the gate 334 is the signal on line 318 which is the output Q of flip-flop G. Gate 334 has the other inputs connected, respectively, to the lines 182A, 184F, and 186D through the lug thumbwheel switch 82 on console 52. This corresponds to the 35 second lug interval 7-8 of the present example.

The reset signal on the line 206 is provided at the output of a NOR gate 338 which has three inputs. One input of gate 338 is connected to the line 154 from FIG. 4. Another input is connected to the line 116 from FIG. 4. A third input is connected to the output of an AND gate 340 over a line 342. The gate 340 has one input connected to the line 182A and its other input connected over a line 344 to the output of an AND gate 346.

One input of the gate 346 is connected to the line 148 which is also shown in FIGS. 4 and 5 and carries the signal indicating the end of the EPA test. The other input of gate 346 is coupled to the output of a NAND gate 348 over a line 350. One input of the gate 348 is the output Q of the flip-flop H on line 330. The other three inputs of the gate 348 are connected to the lines 184F, 186B and 188D through the low idle time thumbwheel switch 58. This particular connection is in view of the low idle time interval 1-2 of 315 seconds in the present example.

A NAND gate 352 of FIG. 6 provides an output signal on the line 126 which is fed to the NOR gate 124 of FIG. 4. Gate 352 has one input connected to the line 344 and another input connected to the line 182B of FIG. 5.

As already indicated, the state of the flip-flops A–H produces the interval signals on the lines 190, 192, 194, 196, 198, and 200. These interval signals are generated at the outputs of a plurality of AND gates 354, 358, 360, 362, 364 and 366, each of which decodes the states of two of the flip-flops A–H. An AND gate 356, while also decoding the outputs of two flip-flops, i.e., flip-flops B and C, is not utilized for reasons which will be described below.

Gate 354 has its two inputs connected to the lines 204 and 208. Therefore, the output on line 190 is a decoded or interval signal $A\bar{B}$ from two successive flip-flops A and B, which signal will be high for the duration of the first acceleration interval 2-3. The gate 358 has its inputs connected to the lines 260 and 270 of two successive flip-flops C and D, whereby the output signal on line 192 is a decoded or interval signal $C\bar{D}$ which will be high for the duration of the second acceleration interval 3-4. The gate 360 has its two inputs connected to the lines 272 and 286 of successive flip-flops D and E so that the output on line 194 is a decoded or interval signal $\bar{D}E$ which is high for the duration of the closed-throttle-pull-down interval 4-5.

The gate 362 has its inputs connected to the lines 288 and 306 of two successive flip-flops E and F. Therefore, the output on line 196 is a decoded or interval signal $E\overline{F}$ which will be high for the third acceleration interval 5-6. The gate 364 has two inputs connected, respectively, to the lines 308 and 318 of two successive flip-flops F and G. Gate 364 provides a decoded or interval signal $F\overline{G}$ on the line 198, which will be high for the duration of the stabilization interval 6-7. The gate 366 has its two inputs coupled, respectively, to the lines 320 and 330 of two successive flip-flops G and H, whereby a decoded or interval signal $G\overline{H}$ on the line 200 is provided and is high for the duration of the lug interval 7-8. When flip-flop H is set, the signal H on line 330 is high, corresponding to the duration of the low idle interval 1-2.

Flip-flop B and gate 356 are not utilized to produce an interval signal $\overline{BC}$ because such an interval is not required for an EPA test run. It will become apparent from the remainder of this disclosure that the interval $\overline{BC}$ could be utilized should the EPA test requirements be modified to include it.

A plurality of differentiators 368, 370, 372, 374, 376 and 378 each generates a differential pulse at the beginning of a particular interval to initialize the clock 162 and reset counters 182, 184, 186 and 188 shown in FIG. 5. Each of these differentiators 368, 370, 372, 374, 376 and 378 includes an RC network coupled between a +V source on a common line 380 and the respective outputs $\overline{Q}$ of the flip-flops C-H. The output of differentiator 368 is taken on a line 382, the output of the differentiator 370 is taken on a line 384, the output of the differentiator 372 is taken on a line 386, the output of the differentiator 374 is taken on a line 388, the output of the differentiator 376 is taken on a line 390, and the output of the differentiator 378 is taken on a line 392.

An OR gate 394 has its qualifying inputs connected to the lines 382, 384, 386, 388, 390 and 392 to provide an output on a line 396 coupled to an inverter 398. The output of the inverter 398 is fed by a line 400 as one input to an OR gate 402 whose output is the signal on the line 178 shown in FIG. 5. The other input for the gate 402 is connected to the line 152 shown in FIG. 4.

FIG. 6—CIRCUIT OPERATION

When the power switch 94 is turned on, after a short delay the signal on line 116 is generated to qualify the NOR gate 338, whereby flip-flops A-G are reset via the line 206. With the power on, the reset signal on the line 206 is again generated when the start button 96 is depressed by providing the signal on the line 154 to gate 338. The flip-flop H also is reset when the start button 96 is depressed due to the signal on the line 152.

Assume that the controller 10 is to function only for the second acceleration interval 3-4. Therefore, the only interval signal that should be generated is the signal $C\overline{D}$ on line 192. To accomplish this the dial 88 is placed in the second acceleration position and the start button 96 depressed. Flip-flop A will be set by the signal on line 156. AND gate 230 will be enabled by the signal on line 236 coupled to the second acceleration position of dial 88 and the signal on line 158. Therefore, the output of gate 230 will be coupled on line 228 through gate 222, line 220, gate 216, line 218 and gates 212 and 264 to lines 214 and 262. Flip-flops B and C will thereby be simultaneously set with flip-flop A. The other flip-flops D-H remain reset. Accordingly, gate 358 decodes this condition to provide the interval signal $C\overline{D}$ on line 192 corresponding to the second acceleration interval 3-4.

Assume now that the controller 10 is to function only for the third acceleration interval 5-6. The dial 88 is moved to the third acceleration position and the start button 96 depressed. Flip-flop A will be set by the signal on line 156. AND gate 226 will be enabled by the signal on line 238 connected to the third acceleration position of dial 88 and the signal on line 158. The output of the gate 226 will be fed through the gate 216 and over the line 218 to set the flip-flops B and C as already described. The output of gate 226 will also be fed over line 224 to enable gate 278, whose output over line 280 qualifies gate 276 and gate 290. The output of gate 276 will set flip-flop D and the output of gate 290 will set flip-flop E. Consequently, the flip-flops A-E are simultaneously set and the flip-flops F-H remain reset. Therefore, gate 362 will generate the only interval signal $E\overline{F}$ on line 196 corresponding to the third acceleration interval 5-6.

Now assume that the controller 10 is to function only for the lug interval 7-8. The dial 88 is placed in the lug position and the start button 96 is depressed. Flip-flop A will be set with the signal on line 156. AND gate 234 will be enabled via the signal on line 240 coupled to the lug position of dial 88 and the signal on line 158. The output of gate 234 is coupled over line 232, through gate 222 and gate 216 to set the flip-flop B and flip-flop C, as already described. The output on line 232 also qualifies gate 278 whose output on line 280 sets the flip-flop D and flip-flop E via gates 276 and 290, as already described. The output on line 232 also enables gate 312 and gate 322 to set flip-flop F and flip-flop G. Accordingly, the flip-flops A-G are set simultaneously with the flip-flop H remaining reset. Consequently, gate 366 provides the only interval signal $G\overline{H}$ on line 200 corresponding to the lug interval 7-8.

Now assume that the engine is to be operated through an EPA test run. The dial 88 will be in the EPA test position. Also assume that the engine has been run through the warm-up interval 0-0' and first low idle interval 1-2 of the first of three cycles.

At this time, a signal will be generated on line 156 to set the flip-flop A. The other flip-flops B-H remain reset. Therefore, gate 354 generates the interval signal $A\overline{B}$ on line 190 for the duration of the first acceleration interval 2-3. One second into the first acceleration interval 2-3, the input to gate 246 on line 184A goes low. At the termination of this interval 2-3 (which terminates on engine speed), the signal on line 250 goes low. Therefore, gate 246 is enabled and all the inputs to gate 242 at this time will be high. The signal on line 256 to gate 242, as noted above, is a run command signal R that is generated for running the controller 10 through the cycles. With gate 242 being enabled, flip-flop B will be set and flip-flop C will be simultaneously set. The flip-flop D-H remain reset so that gate 358 generates at this time the only interval signal $C\overline{D}$ for the start of the second acceleration interval 3-4 at the completion of the first acceleration interval 2-3.

At the end of the second acceleration interval 3-4, which terminates after five seconds, all the inputs to the gate 282 are high. Consequently, this gate 282 is enabled and flip-flop D now becomes set. The flip-flops E-H remain reset. Therefore, gate 360 generates the interval signal $D\overline{E}$ for the start of the closed-throttle-pulldown interval 4-5.

At the start of the closed-throttle-pulldown interval 4-5, the inputs to gate 302 on line 182A and line 270 are high. A short time into the CTPD interval 4-5, the signal on line 167 goes high so that gate 302 is enabled. Flip-flop 298 will then be set to qualify one input on line 300 of the gate 294. The closed-throttle-pull-down interval 4-5 terminates on speed and at this termination point, the signal on line 250 will go high whereby the other input to gate 294 will be qualified. Consequently, at the end of the interval 4-5, gate 294 is enabled and flip-flop E now becomes set. The flip-flops F-H remain reset. Therefore, gate 362 now generates the interval signal $\overline{EF}$ for the start of the third acceleration interval 5-6.

The third acceleration interval 5-6 terminates after ten seconds. At this time, all the inputs to gate 314 will be high so that this gate 314 is enabled and flip-flop F becomes set. The flip-flops G-H remain reset. Thus, gate 364 now generates the interval signal $\overline{FG}$ for the start of the stabilization interval 6-7.

The stabilization interval 6-7 terminates after 52 seconds. At this time, gate 328 will be enabled and flip-flop G now becomes set. Flip-flop H remains reset. Therefore, gate 366 now generates the interval signal $\overline{GH}$ for the start of the lug interval 7-8.

At the end of the lug interval 7-8, which terminates after 35 seconds, gate 334 will be enabled. Consequently, flip-flop H will be set to commence a delay period which is the low idle interval 1-2 of the next cycle. After 315 seconds, the gate 348 will be enabled to provide one low qualifying input to the gate 346. If it is assumed that, at this time, another cycle is to be run, i.e., that it is not the end of the EPA test, then a low qualifying signal will also be on line 148 so that at this time the gate 346 is enabled. Therefore, at this time, which is the start of the first acceleration interval 2-3 of the next cycle, gate 340 will be enabled so that a reset signal is supplied via gate 338 on the line 206 to reset the flip-flops A-G. Gate 352 also will be enabled at 0.1 seconds into the first acceleration interval 2-3. Consequently, the signal on line 126 will be generated to enable gate 124 of FIG. 4 to trigger the multivibrator 120 to start another cycle.

Upon this triggering of multivibrator 120, the pulse on line 152 will be generated by the multivibrator 120 to reset the flip-flop H of FIG. 6. Consequently, all the flip-flops A-H will be reset to commence generating the interval signals for completing another cycle. Multivibrator 122 of FIG. 4 will be triggered when multivibrator 120 times out so that line 156 goes low to set flip-flop A as the first flip-flop to thereafter be sequentially set, as described.

When an interval signal such as signal $\overline{CD}$ is generated at the start of the second acceleration interval 3-4, the differentiator 368 will generate a spike or differential pulse since $\overline{Q}$ or line 260 of the flip-flop C will go low. The gate 394 will then be qualified and its output inverted by inverter 398. The gate 402 thereby will be enabled to produce the reset pulse on line 178 to reset or initialize the clock 162 and counters 182, 184, 186 and 188 for the start of the second acceleration interval 3-4. In a like manner, the differentiators 370, 372, 374, 376 and 378 will produce differential pulses for resetting this clock 162 and counters 182, 184, 186 and 188 at the start of the respective intervals 4-5, 5-6, 6-7, 7-8 and 1-2.

FIGS. 7-10—DIGITAL SPEED COMMAND SIGNAL GENERATOR CIRCUITS

During the warm-up interval 0-0', the second acceleration interval 3-4, the third acceleration interval 5-6, the stabilization interval 6-7 and the lug interval 7-8, the engine must be at a certain speed or be accelerated or decelerated at a particular rate in accordance with the requirements of the EPA test procedures. The circuits 401, 401A, 401B and 401C, respectively, of FIGS. 7-10 are used to generate digital signals giving information as to the desired or command speed of the engine at any instant for these particular intervals. For the second acceleration interval 3-4, the engine should be accelerated at a particular rate starting from the low idle plus 200 rpm engine speed. During the third acceleration interval 5-6, the engine should be accelerated at another particular rate commencing from the peak torque speed of the engine. During the lug interval 7-8, the engine should be decelerated at yet another particular rate commencing with the rated speed of the engine. The engine should be at rated speed for the duration of the warm-up interval 0-0' and stabilization interval 6-7.

Figure 7:
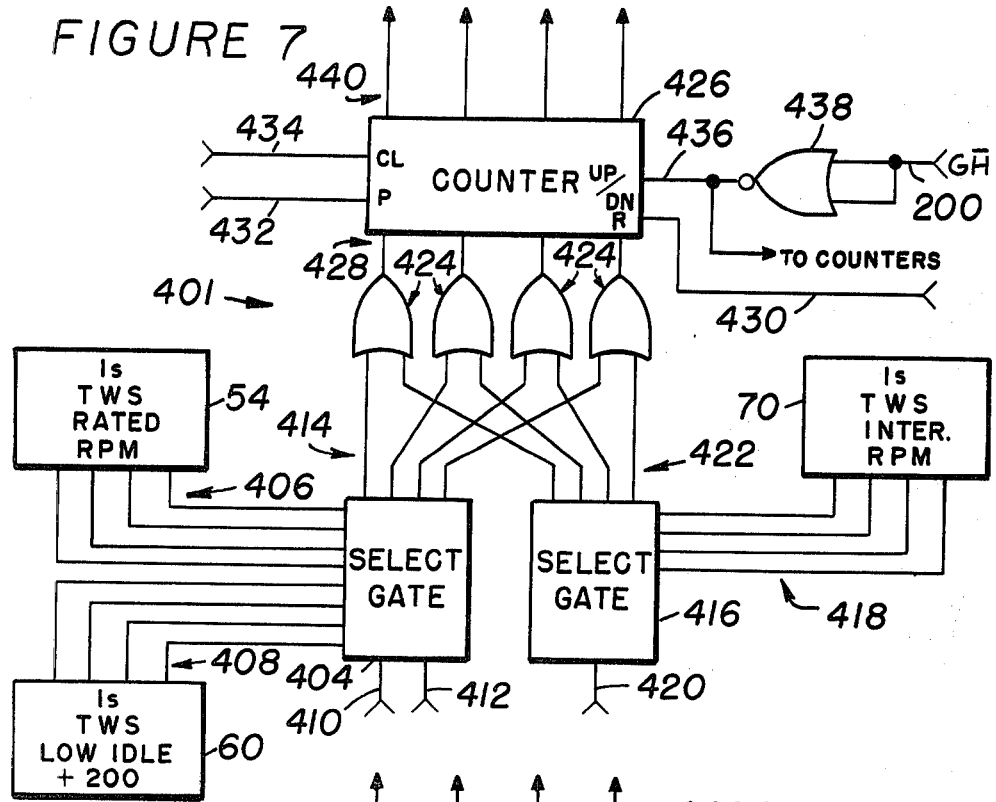

FIG. 7 shows the thumbwheel switch 54; more particularly, FIG. 7 indicates the dial of the switch 54 for setting the 1s digit for the rated rpm. FIG. 7 also shows the thumbwheel switch 60; more particularly, the dial for setting the 1s digit of the low idle plus 200 rpm. Also shown is the thumbwheel switch 70; again, more particularly, the dial for setting the 1s digit of the intermediate speed.

A select gate 404 receives the 1s data from the switch 54 over four lines 406 and the 1s data from the switch 60 over four lines 408. The gate 404 has a select input from a line 410 to select the information on lines 406 and another select input on a line 412 to select the information on lines 408. The output of the gate 404 is provided on four lines 414.

A select gate 416 receives the 1s data from the switch 70 over four lines 418. Gate 416 has a select input on a line 420 to select the information on lines 418. The output of the gate 416 is provided on four lines 422.

Four OR gates 424 each has two inputs. One of the inputs of each gate 424 is coupled to one of the lines 414 and the other input of each gate 424 is coupled to one of the lines 422.

An up-down counter 426 has four inputs connected, respectively, to the outputs of the four gates 424 over four respective lines 428. Counter 426 is reset by a signal on a line 430 and preset by a pulse on a line 432. Clock signals are supplied over a line 434 to clock the counter 426.

As will be described further, the counter 426 will count up during the second acceleration interval 3-4 and the third acceleration interval 5-6, but count down during the lug interval 7-8. To accomplish this, the counter 426 has an up-down input receiving a signal on a line 436 which is the output of a NOR gate 438. The input to the NOR gate 438 is the interval signal $\overline{GH}$ on line 200 from FIG. 6 which is high during the lug interval 7-8 and low at all other times.

Counter 426 generates a digital output signal on four lines 440, which corresponds to the desired engine speed; more particularly, to the 1s digit of the desired speed.

Figure 8:
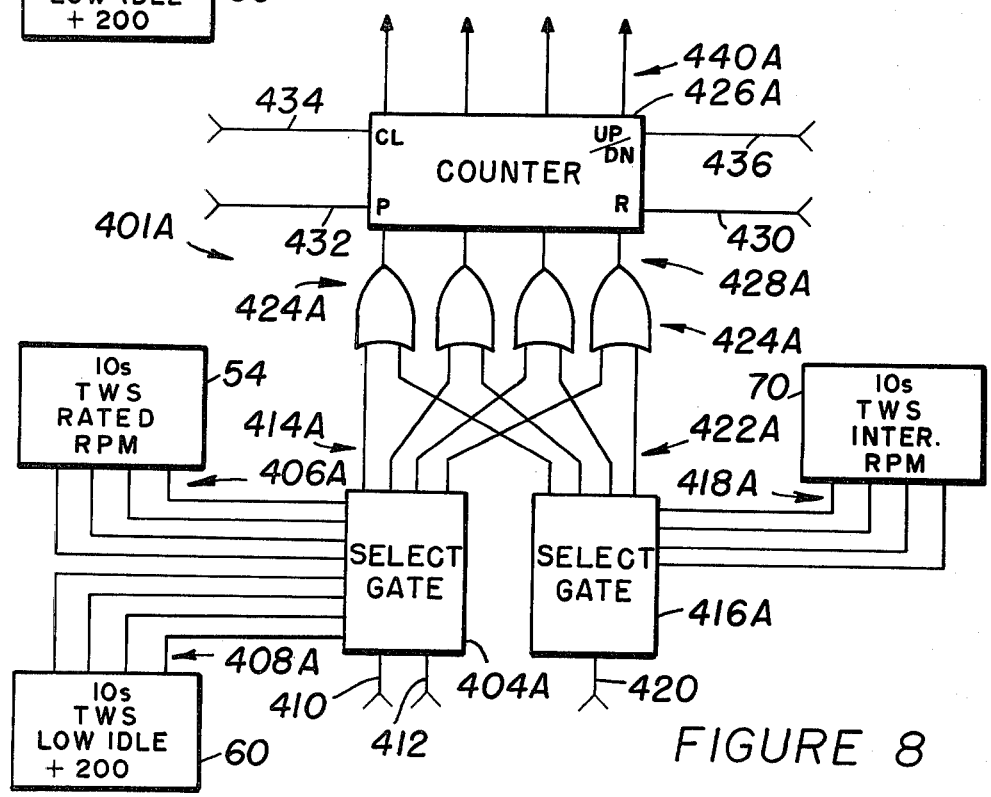

The circuits 401A-401C of FIGS. 8-10 are constructed similarly to circuit 401 of FIG. 7. Whereas circuit 401 generates the digital signals for the 1s digit of the desired speeds, as described above, circuits 401A–401C generate, respectively, digital signals for the tens digits, hundreds digits and thousands digits of the desired speed. Because of this similarity amongst the circuits 401–401C, like reference numerals are used in FIGS. 8–10 to show the like components in FIG. 7. For example, counter 426 of FIG. 7 is shown as counter 426A for FIG. 8, 426B for FIG. 9, and 426C for FIG. 10. Also, FIGS. 8–10 show the thumbwheel switches 54, 60 and 70 for providing, respectively, the tens, hundreds, and thousands digits of the speeds shown on console 52 of FIG. 3. FIG. 7 discloses the only gate 438 since the output on line 436 is coupled to the up-down inputs of the counters 426A, 426B and 426C. The counters 426, 426A, 426B and 426C are coupled in a conventional manner by carry-in and carry-out pin connections (not shown).

FIGS. 7–10—CIRCUIT OPERATION

As shown in FIG. 3, the thumbwheel switch 54 has dialed a rated speed of 2100 rpm, the switch 60 a low idle plus 200 rpm speed of 850 rpm, and the switch 70 an intermediate speed of 1400 rpm. This prestored speed data is coupled to the respective inputs of the select gates 404 and 416 of FIG. 7, 404A and 416A of FIG. 8, 404B and 416B of FIG. 9, and 404C and 416C of FIG. 10.

When power first comes on, a reset pulse is generated on line 430 to reset counters 426–426C. When a select signal is generated on line 410 and a preset pulse is generated on line 432, the gates 404, 404A, 404B and 404C will select the data from the switch 54 and output this data through the gates 424, 424A, 424B and 424C to the counters 426, 426A, 426B and 426C. With the preset pulse on line 432, the counters 426, 426A, 426B and 426C will be preset with a count corresponding to the rated speed of 2100 rpm.

Also at an appropriate time, clock pulses will be supplied on line 434 to the counters 426–426C. Consequently, these counters 426–426C will commence counting from the preset count of 2100 at a rate determined by the frequency of the clock pulses on line 434. As already indicated, the counters 426–426C will have the preset count of 2100 for the beginning of the lug interval 7-8. Consequently, the interval signal $G\overline{H}$ on line 200 will be high so that the signal on line 436 will be low to switch the counters 426–426C to the count-down mode. The output of the counters 426–426C on lines 440–440C therefore will be digital signals corresponding to reduced command speed for each count.

In a similar manner, at an appropriate time, a select signal will be on line 412 and a preset pulse on line 432. Select gates 404–404C will thus select the speed data from switch 60 and counters 426–426C will be preset to a count of 850. This count is used for the beginning of the second acceleration interval 3-4, at which time the signal on line 200 will be low and the signal on line 436 will be high to shift counters 426–426C to the count-up mode. Clock signals will also be produced on line 434 to increase the count in the counters 426–426C at the incoming clock rate.

Similarly, at an appropriate time, a select signal will be supplied on the line 420 and a preset pulse on the line 432 to preset the counters 426–426C with a count of 1400 from the switch 70. This count is used at the commencement of the third acceleration interval 5-6 at which time the signal on line 436 will cause the counters 426–426C to be in the count-up state. Again, clock signals will be generated on line 434 to increase the count in the counters 426–426C at the incoming clock rate.

FIG. 10A—RPM RESET CIRCUIT

FIG. 10A shows a simple AND gate 439 for generating the reset pulse on the line 430 to reset counters 426–426C. Gate 439 has on input coupled to the line 118 of FIG. 4 and the other input coupled to the line 202 which is connected to the flip-flop A of FIG. 6. The output of gate 439 is coupled to the line 430.

FIG. 10A—GATE OPERATION

When the power switch 94 is turned on, gate 338 of FIG. 6 is enabled by the high on line 116 to reset flip-flop A and, thereby, provide a low on line 202. As can be seen from the multivibrator 114 of FIG. 4, when line 116 is high, line 118 is low so that gate 439 is enabled. Consequently, the reset pulse is generated on line 430.

FIG. 11—RPM PRESET CIRCUIT

Figure 11:
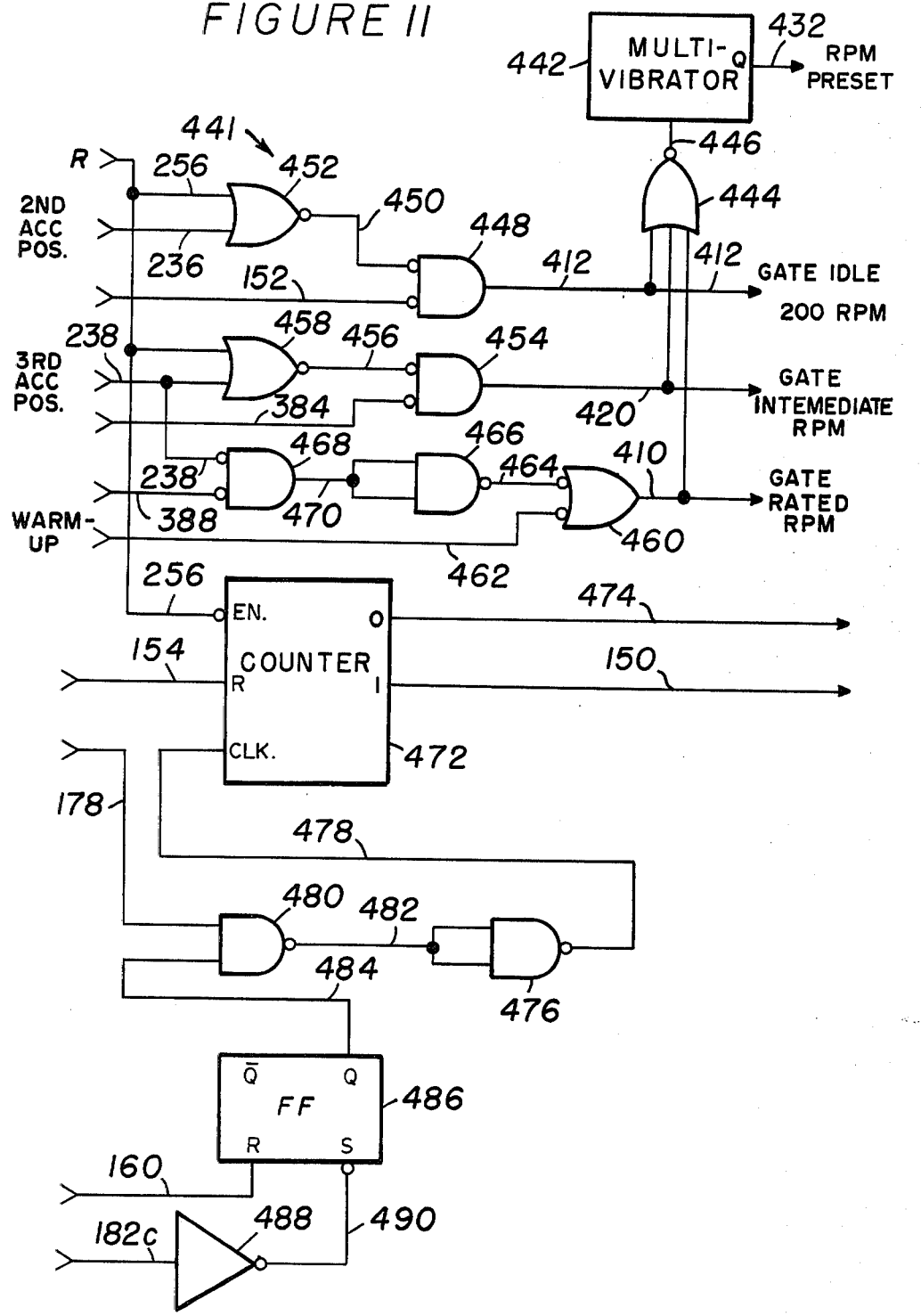
FIG. 11 is a schematic diagram of a circuit of the controller for presetting the signal generators of FIGS. 7–10.

FIG. 11 illustrates a circuit 441 for presetting the four counters 426–426C. A monostable multivibrator 442, when triggered, generates at its output Q, the preset pulse on the line 432 which is coupled to the preset inputs of the counters 426–426C. Multivibrator 442 is triggered by the output of a NOR gate 444 over a line 446. One input to the gate 444 is the signal on the line 412 which is also coupled to the four select gates 404–404C of FIGS. 7–10. Another input to the gate 444 is the signal on line 420 which is also connected to the select gates 416–416C. The third input to the gate 444 is the signal on line 410 which is also connected to the select gates 404–404C.

An AND gate 448 is coupled at its output to line 412 and has two inputs coupled, respectively, to the line 152 and a line 450. A NOR gate 452 is coupled at its output to the line 450 and has two inputs coupled, respectively, to the line 236 and the line 256. Line 236 is connected to the second acceleration position of dial 88 while line 256 carries the run-command signal R for running through the cycles.

An AND gate 454 is coupled at its output to the line 420 and has two inputs coupled, respectively, to line 384 and a line 456. Line 384 carries the differential pulse from differentiator 370 of FIG. 6. Line 456 is coupled to the output of a NOR gate 458 whose two inputs are the signals on line 256 and line 238, respectively. Line 238 is connected to the third acceleration position of dial 88.

An OR gate 460 is connected at its output to line 410 and has one input connected to a line 462 and another input connected to a line 464. The signal on line 462 stays low for the duration of the warm-up interval 0-0'. An inverter 466 couples its output to the line 464 and has its input connected to an AND gate 468 over a line 470. The two inputs to gate 468 are the signals on the line 238 and the line 388, respectively. The latter carries the differential pulse from the differentiator 374 of FIG. 6.

A counter 472 is used only when the dial 88 is in one of the initial setup positions shown on the console 52 to allow the controller 10 to operate once through the interval selected by the dial 88. Counter 472 has a clock enable input connected to the line 256 and a reset input connected to the line 154. Counter 472 can count to one, and has one output coupled to a line 474 and a second output connected to the line 150. Thus, counter 472 provides the signal on line 150 that resets flip-flop 142 of FIG. 4 and initializes or resets clock 162 of FIG. 5.

Counter 472 has a clock input connected to the output of an inverter 476 over a line 478. A NAND gate 480 is connected to the input of the inverter 476 over a line 482 and has one input connected to the line 178 and another input coupled over a line 484 to the output Q of a flip-flop 486. This flip-flop 486 is reset with a signal on the line 160 connected to the flip-flop 142 of FIG. 4 and is set with the signal on line 182C, coupled to the 0.1 second counter 182, after being inverted by inverter 488 and supplied on a line 490.

FIG. 11—CIRCUIT OPERATION

As already mentioned, to operate the controller 10 through the second acceleration interval 3-4, the counters 426–426C should be preset with the low idle plus 200 rpm data. This presetting of the counters 426–426C should occur at some time when running an EPA test procedure or when initially setting up the controller 10.

With the power on and the start button 96 depressed, a pulse will be generated on the line 152 as one input to gate 448. Also, if the dial 88 is in the EPA test position or the cycles-only position, the high run-command signal R will be generated on line 256, or if the dial 88 is in the second acceleration position, a high signal will be produced on line 236, whereby gate 452 will supply the second input to gate 448. Consequently, this gate 448 will be qualified at both inputs and the signal on line 412 will cause the select gates 404–404C to select the low idle plus 200 rpm data on lines 408–408C. Also, gate 444 will be enabled by the signal on line 412 to trigger the multivibrator 442 which will then produce the preset pulse on line 432 to preset the counters 426–426C with this selected data.

Similarly, to preset the counters 426–426C for the third acceleration interval 5-6, high signals will be generated on either line 256 or line 238, depending on whether the dial 88 is in the EPA test position or cycles-only position or the third acceleration position. Consequently, the gate 458 will be enabled to supply one qualifying input to the gate 454. At the beginning of the closed-throttle pull-down interval 4-5, the flip-flop D will be set and the differential pulse on line 384 thus will be generated, as described in FIG. 6. Accordingly, the gate 454 will now be gated on so that a select pulse on line 420 will be produced to cause select gates 416–416C to select the intermediate rpm data on lines 418–418C. Also, the gate 444 will be enabled to trigger the multivibrator 442 which will again produce the preset pulse on line 432 to preset the counters 426–426C with this selected data.

To operate the controller 10 through the lug interval 7-8 during initial set-up, or through the stabilization interval 6-7 and lug interval 7-8 for an EPA test run or a cycles-only run, the dial 88 will be in the lug position or the EPA test position or the cycles-only position. Consequently, the signal on line 238 now will be low as one input to the gate 468. When the differential pulse on line 388 from FIG. 6 is generated, gate 468 will thereby be enabled. Inverter 466 will then invert the output signal from gate 468 which will then enable the gate 460 to produce the select pulse on line 410 to cause select gates 404–404C to select the rated rpm data. Also, at this time, multivibrator 442 will be triggered by the output of gate 444 to produce the preset pulse on line 432 to preset the counters 426–426C with this data.

As has also been described, during an EPA test run, the controller 10 should command the engine to run at rated speed during the warm-up interval 0-0'. At the start of this interval 0-0', the signal on line 462 will be low to enable the gate 460. Thus, the counters 426–426C again will be preset with the rated speed data.

As already indicated, during the initial set-up period, the controller 10 should be operated only once through the second acceleration interval 3-4, the third acceleration interval 5-6 and the lug interval 7-8. The dial 88 will be in one of the initial set-up positions shown in FIG. 3. When the power then is turned on with switch 94 and the start button 96 depressed, the signal on line 154 will reset the counter 472. During this initial set-up, the run command R signal on line 256 will be low to enable the counter 472.

Also, when the power switch 94 is turned on, the flip-flop 486 will be reset by the signal on line 160 so that the signal on line 484 will be low. The controller 10 will be operating through one of the intervals 3-4, 5-6 and 7-8, selected by dial 88. After 0.2 seconds into the selected interval, e.g., interval 3-4, line 182C goes high and flip-flop 486 becomes set. Consequently, the signal on line 484 will be high, but the signal on line 178 will be low. Then, at the end of this selected interval 3-4, or in other words, at the start of the closed-throttle-pull-down interval 4-5, a differential pulse will be generated on the line 384 of FIG. 6, resulting in a high pulse being generated on line 178. Consequently, gate 480 is enabled at this time and the counter 472 will be clocked by the signal on line 478 to produce a high signal on line 150 and a low signal on line 474. The high signal on line 150 will reset the flip-flop 142 of FIG. 4 and reset the clock 162 of FIG. 5 so that flip-flop D does not get set for the closed-throttle-pull-down interval 4-5. The low signal on line 474 is used to stop the clocking of counters 426–426C as will be described.

FIG. 12—RAMP GENERATOR OSCILLATOR CIRCUIT

Figure 12:
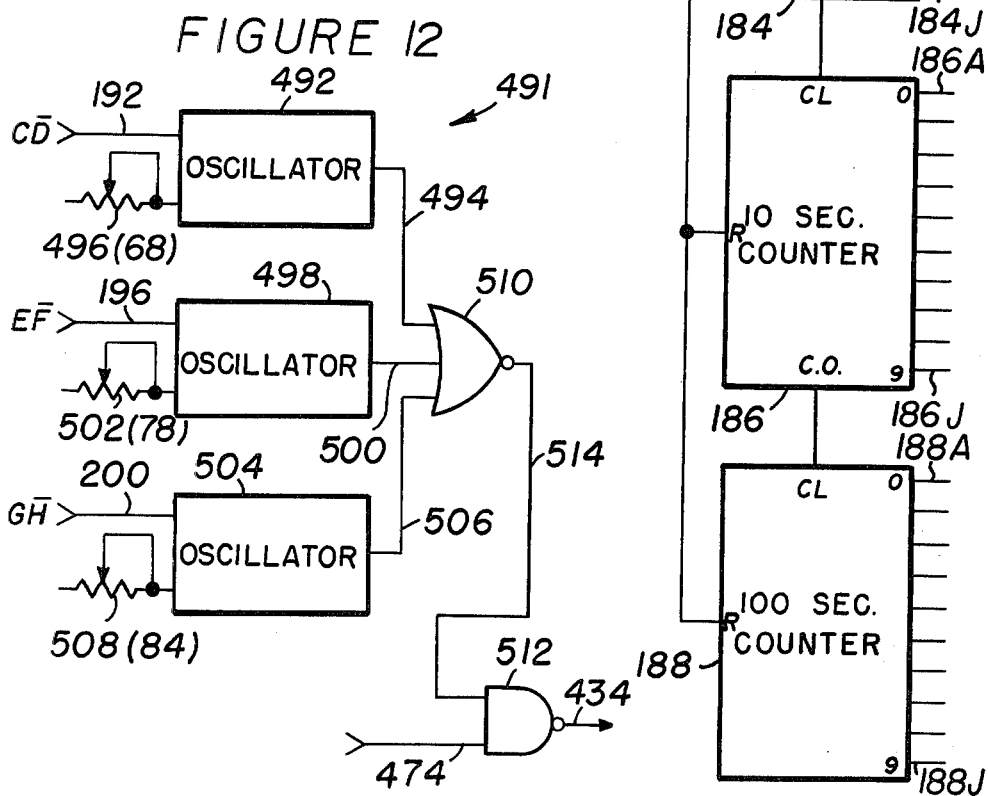
FIG. 12 shows schematically an oscillator circuit of the controller for controlling the rate of producing the digital command signals of FIGS. 7–10.

The circuit 491 of FIG. 12 is used to produce the clock signals on line 434 to clock the counters 426–426C at different rates. An oscillator 492 is activated by the interval signal $\overline{CD}$ on line 192 for the second acceleration interval 3-4 to generate a frequency signal at a preset frequency on a line 494. The frequency of the oscillator 492 is adjustable by a potentiometer 496 whose setting is controlled by the dial 68 on console 52. An oscillator 498 is activated by the interval signal $\overline{EF}$ on line 196 for the third acceleration interval 5-6 to produce a signal of a second frequency on a line 500. The frequency of the oscillator 498 can be adjusted by a potentiometer 502 whose setting is controlled by the dial 78 on console 52. A third oscillator 504 is activated by the interval signal $\overline{GH}$ on line 200 for the lug interval 7-8 to generate a signal of a third frequency on a line 506. The frequency of the oscillator 504 is adjustable by a potentiometer 508 whose setting is controlled by the dial 84 on the console 52.

A NOR gate 510 has three inputs connected, respectively, to the lines 494, 500 and 506. A NAND gate 512 has one input connected to the output of the gate 510 over a line 514 and another input connected to the line 474 from counter 472 of FIG. 11. The output of gate 512 is the clock signals on line 434 for counters 426–426C.

FIG. 12—CIRCUIT OPERATION

As can be seen from FIG. 1, the engine is to be accelerated or decelerated at different rates for the second acceleration interval 3-4, third acceleration interval 5-6 and lug interval 7-8. During the second acceleration interval 3-4, the interval signal $\overline{CD}$ on line 192 will activate the oscillator 492 to produce clock pulses on the line 434 at the frequency of this oscillator. Consequently, the counters 426–426C will count up at a rate corresponding to this frequency and this rate corresponds to the required acceleration for the interval 3-4.

During the third acceleration interval 5-6, the interval signal EF on line 196 will activate the oscillator 498. As a result, the clock signals on line 434 will be at another frequency to cause the counters 426–426C to count up at a rate corresponding to the acceleration for the interval 5-6.

During the lug interval 7-8, the oscillator 504 will be activated by the interval signal $\overline{GH}$ on line 200. Consequently, clock signals will be generated on line 434 at a third rate to cause the counters 426–426C to count down at a rate corresponding to the required deceleration for interval 7-8.

Gate 512 will be enabled during these intervals 3-4, 5-6 and 7-8 since the signal on line 474 will be high. At the end of each of these intervals, the signal on line 474 will go low, whereby no clock pulses will be generated on line 434 and the counters 426–426C will cease counting.

FIG. 13 ANALOG COMMAND SPEED SIGNAL GENERATOR

Figure 13:
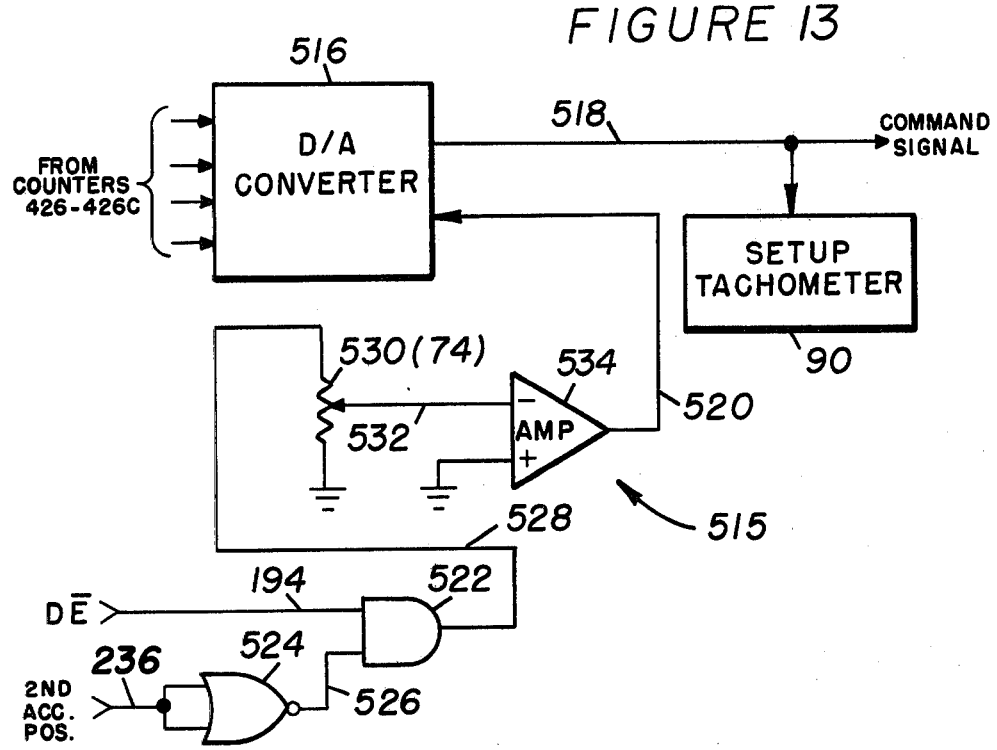
FIG. 13 is a schematic illustration of a circuit of the controller for converting the digital speed command signals to analog speed command signals.

FIG. 13 illustrates a circuit 515 for generating analog command signals proportional to the digital command signals from FIGS. 7-10. A conventional digital-to-analog converter 516 converts the digital speed signals from the counters 426–426C to analog voltage signals on a line 518. Therefore, the voltage signals on line 518 represent, at any instant of time, the desired or command engine speed being called for by the controller 10. The tachometer 90, which is also shown on the console 52, receives the voltage signals on line 518 to display the command speed.

For reasons which will be described, the voltage signal on line 518, during the closed-throttle-pull-down interval 4-5, is offset by a voltage signal on a line 520. This is accomplished by adding this offset voltage on line 520 to the signal on line 518 inside the D/A converter in a conventional manner.

To produce the offset voltage, an AND gate 522 has one input connected to the line 194 of FIG. 6 and another input connected to the output of a NOR gate 524 over a line 526. The input to the gate 524 is coupled to the line 236 connected to the second acceleration position of dial 88.

Gate 522 is coupled at its output over a line 528 to a potentiometer 530 whose setting is adjusted by the throttle delay dial 74 on the console 52. The output voltage of the potentiometer 530 is coupled over a line 532 to a unity gain inverting amplifier 534 whose output is the offset voltage on line 520.

FIG. 13—CIRCUIT OPERATION

At intervals other than the closed-throttle-pull-down interval 4-5, the D/A converter 516 produces an output voltage on line 518 which is an analog of the digital input signals to the converter 516. Thus, the output voltage on line 518 is a command signal representing the desired speed of the engine. As an example, the voltage signal on line 518 is equal to one volt per 1000 counts of counters 426–426C or one volt per 1000 rpm.

At the start of the closed-throttle-pull-down interval 4-5, during the EPA test run or cycles-only run, i.e., when the dial 88 is in the EPA test or cycles-only position, the interval signal $\overline{DE}$ on line 194 will be high; the signal on line 236 will be low so that the output of the gate 524 on line 526 will be high. Consequently, gate 522 will be enabled to provide a voltage to the potentiometer 530. The output voltage of potentiometer 530 will then change the state of the amplifier 534 so that the output voltage on line 520 is added to the voltage on line 518. Consequently, the voltage signal on line 518 corresponds to a command engine speed that is higher than the command speed represented by the digital signals at the inputs to the D/A converter 516.

The reason for this offset voltage on line 520 and hence higher voltage on line 518 is that the throttle solenoid 34 of FIG. 2 causes a minor time lag problem that is most evident during the closed-throttle-pull-down interval 4-5. As can be seen from the curve 1 of FIG. 1, at point 5 there should be a quick jump into the third acceleration interval 5-6 at the end of the closed-throttle-pull-down interval 4-5. Because of this time lag problem, the engine throttle 30 will not be fully opened quickly enough at point 5.

The count in counters 426–426C during interval 4-5 will correspond to the intermediate speed of 1400 rpm for point 5. By adding a small offset voltage on line 520 to the analog of 1400 rpm, the interval 4-5 will terminate slightly sooner. Therefore, solenoid 34 will become energized slightly sooner to account for the time lag and open the throttle 30 at just about point 5.

FIG. 14—ACTUAL ENGINE SPEED TO VOLTAGE AND COMPARATOR CIRCUIT

Figure 14:
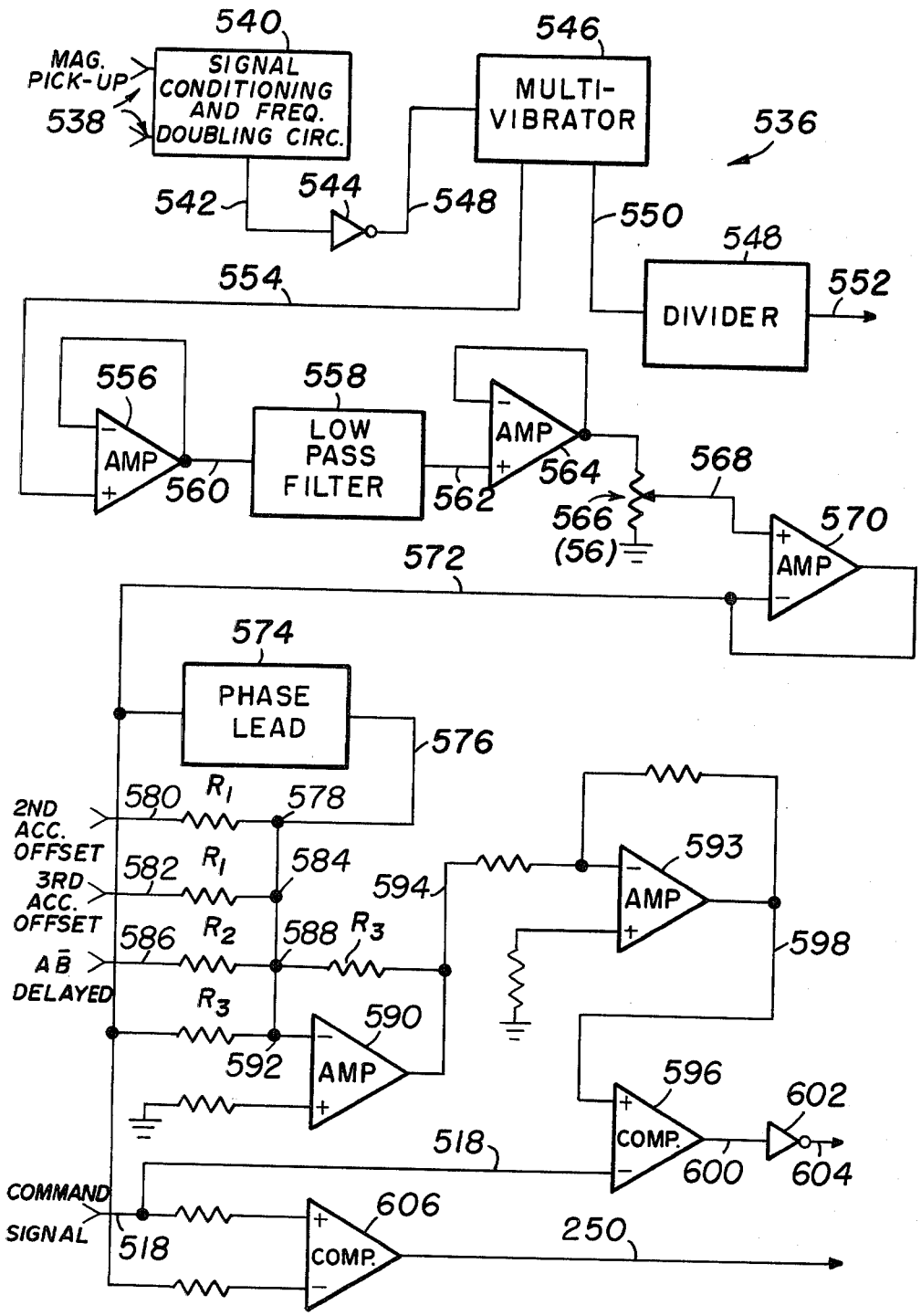
FIG. 14 is a schematic drawing of a circuit of the controller for generating actual engine speed signals and for comparing such actual engine speed to the command speed signals.

The circuit 536 of FIG. 14 of the controller 10 generates a voltage signal proportional to actual engine speed and compares it with the command signals on line 518 from the D/A converter 516. As will become apparent, the circuit 536 is part of a closed loop circuit which is closed loop on engine speed.

A frequency signal, proportional to the actual speed of the engine, is received by the controller 10 from the magnetic pickup 14 shown in FIG. 2 and fed over lines 538 to a signal conditioning and frequency doubling circuit 540. The doubled frequency signal is output on a line 542 to a Schmitt trigger 544 which squares this frequency signal to trigger a monostable multivibrator 546 via a line 548. The output $\overline{Q}$ of the multivibrator 546 is fed to a divider 548 over a line 550 to divide the frequency signal by two. The output of the divider 548 on a line 552 is thus the frequency of the input signal on lines 538 for reasons which will be described below.

The frequency signal at the output Q of the multivibrator 546 is provided on a line 554 and fed to an operational amplifier 556 which is used as a voltage follower. A low pass filter 558 filters the output signals of the amplifier 556 via a line 560 and sends the filtered signals over a line 562 to another operational amplifier 564 which is also used as a voltage follower. The voltage signals at the output of amplifier 564 are fed to a potentiometer 566 which is adjustable by the dial 56 on the console 52 for rated speed purposes as will be later described. At this point, therefore, the voltage taken from the potentiometer 566 on a line 568 is proportional to actual engine speed.

Another operational amplifier 570, which functions as a voltage follower, feeds the voltage signal proportional to actual engine speed back over a line 572. The voltage signal on line 572 is fed through a conventional phase lead network 574. As will become apparent below, network 574 maintains stable control over actual engine speed by causing the field coil 40 to become deenergized when the engine speed decreases rapidly close to a desired speed. The output signal of the phase lead network 574 is fed over a line 576 to a summing junction 578 where this signal is offset with a voltage signal on a line 580 having a resistor $R_1$. Another offset voltage signal is supplied on a line 582 having a resistor $R_1$ to a summing junction 584 where it is added to the summed signal at the junction 578. Yet another voltage signal on a line 586 having a resistor $R_2$ is fed to a summing junction 588 to be summed with the signal at junction 584. The offset on line 580 is used for the second acceleration interval 3-4, the offset on line 582 for the third acceleration interval 5-6 and the offset on line 586 for the first acceleration interval 1-2. The reasons for and manner in which these signals on lines 580, 582, and 586 are generated will be discussed in connection with FIG. 15.

An inverting operational amplifier 590 sums the voltages from lines 572, 576, 578, 580, 582 and 586. Another inverting operational amplifier 593 receives the output of the amplifier 590 over a line 594 and provides its output as one input to a non-inverting input of an operational amplifier or comparator 596 over a line 598. The voltage signal on line 598 is thus a signal basically proportional to actual engine speed, but modified by the signals on lines 576, 580, 582 and 586.

The other input to the comparator 596, at its inverting input, is the command speed signal on line 518. Thus, the comparator 596 compares the modified actual engine speed with the command or desired speed. The output of the comparator 596 is a signal on a line 600 which, after being inverted by an inverter 602, is a signal on a line 604 used to control energization of the dynamometer field coil 40 and is one of several conditions determining the flow of dynamometer cooling water.

Another operational amplifier or comparator 606 compares the command speed signal on line 518 at its non-inverting input with the actual engine speed signal on line 572 at its inverting input. The comparator 606 receives the signal on line 572 without the offsets discussed above. The output of the comparator 606 is coupled to the line 250 which leads to FIG. 6 for use for the first acceleration interval 2-3 and the closed-throttle-pull-down interval 4-5.

FIG. 14—CIRCUIT OPERATION

As the engine rotates, the speed signal is fed to the signal conditioning and frequency doubling circuit 540. Ultimately, a voltage signal on line 598 is produced that is a modified engine-speed signal. Comparator 596 receives the signal at its non-inverting input.

Assume that the controller 10 is operating through the second acceleration interval 3-4. At this time, the command signal on line 518, which is fed to the inverting input of comparator 596, is continually increasing. If the actual engine speed is less than the command speed, comparator 596 will provide a low signal on line 600 that is inverted by inverter 602. The resulting high on line 604 will be used to deenergize the field coil 40 to allow the engine speed to increase to the command speed. If the actual engine speed is greater than the command speed, the signal on line 604 will be low to energize the coil 40 and decrease the engine speed.

The comparator 606 provides the output signal on line 250 to control the state of the flip-flops B, C and E as described in FIG. 6. As also already mentioned, the first acceleration interval 2-3 and the closed-throttle-pull-down interval 4-5 terminate on speed. The comparator 606 compares the command speed signal on line 518 at its non-inverting input with the actual engine-speed signal on line 572. During the first acceleration interval 2-3, the command signal on line 518 will correspond to the low idle plus 200 rpm or termination speed of 850 rpm in the example. Until the engine reaches this command speed, the output of the comparator 606 on line 250 will be high. When the actual engine speed reaches 850 rpm at the end of the interval 2-3, the output of the comparator 606 on line 250 will go low, whereby flip-flops B and C will be set to commence the second acceleration interval 3-4.

During the closed-throttle-pull-down interval 4-5, the actual engine-speed signal on line 572 will be higher than the command speed signal on line 518. This is because at this time the engine speed will be decreasing towards the peak torque speed of 1400 rpm and the command signal on line 518 will correspond to this peak torque speed. Therefore, the output of the comparator 606 on line 250 will be low. When the actual engine speed reaches the peak torque speed, the comparator 606 will produce a high signal lin line 250. Therefore, as shown in FIG. 6, the flip-flop E will be set to commence the third acceleration interval 5-6.

FIG. 15—SECOND AND THIRD ACCELERATION OFFSET CIRCUIT

Because of the inherent error of the closed-loop speed control circuit (mentioned for FIG. 14) to constant acceleration inputs, errors are introduced in controlling the engine speed to follow the desired speed of curve 1. These errors occur primarily for the second acceleration interval 3-4 and the third acceleration interval 5-6 when the engine speed should change most quickly in accordance with the ramp or slope of these intervals. The second acceleration interval 3-4 has a greater slope than the third acceleration interval 5-6; hence, the greater error occurs here.

A circuit 607 of controller 10 supplies the offset voltages on line 580 and line 582 for the second acceleration interval 3-4 and the third acceleration interval 5-6, respectively. A solid state switch 608, shown generally in FIG. 15, has a field effect transistor 610 and a field effect transistor 612. The source S of transistor 610 is connected to a potentiometer 614 over a line 616. The drain D of transistor 610 is connected to the output line 580. The gate G of the transistor 610 is connected to the line 192 which carries the intervals signal $\overline{CD}$ for the second acceleration interval 3-4. The dial or adjustment screw for adjusting the potentiometer 614 to produce the correct offset voltage is not on console 52, but could be located in the back of controller 10.

The source S of the transistor 612 is coupled to a potentiometer 617 over a line 618 and the drain D of transistor 612 is coupled to the output line 582. The gate G of transistor 612 is coupled to line 196 which carries the interval signal $\overline{EF}$ for the third acceleration interval 5-6. The dial or adjustment screw for adjusting potentiometer 617 similarly is not on console 52.

FIG. 15—CIRCUIT OPERATION

During the second acceleration interval 3-4, the interval signal $\overline{CD}$ on line 192 will gate on transistor 610. Consequently, an offset voltage, predetermined by the potentiometer 614, will be coupled from line 616 to line 580.

During the third acceleration interval 5-6, the interval signal $\overline{EF}$ will be generated on line 196 to gate on the transistor 612. Therefore, an offset voltage, predetermined by the potentiometer 617, will be coupled over line 618 to line 582.

It now also can be seen that the offset voltage on line 586 of FIG. 14 is generated for similar reasons for the first acceleration interval 2-3 to overcome the response lag time of circuit 536. The offset voltage on line 586 is generated by the circuit of FIG. 20 to be described 1 second into the interval 2-3.

FIG. 16—DYNAMOMETER FIELD COIL CONTROL CIRCUIT

Figure 16:
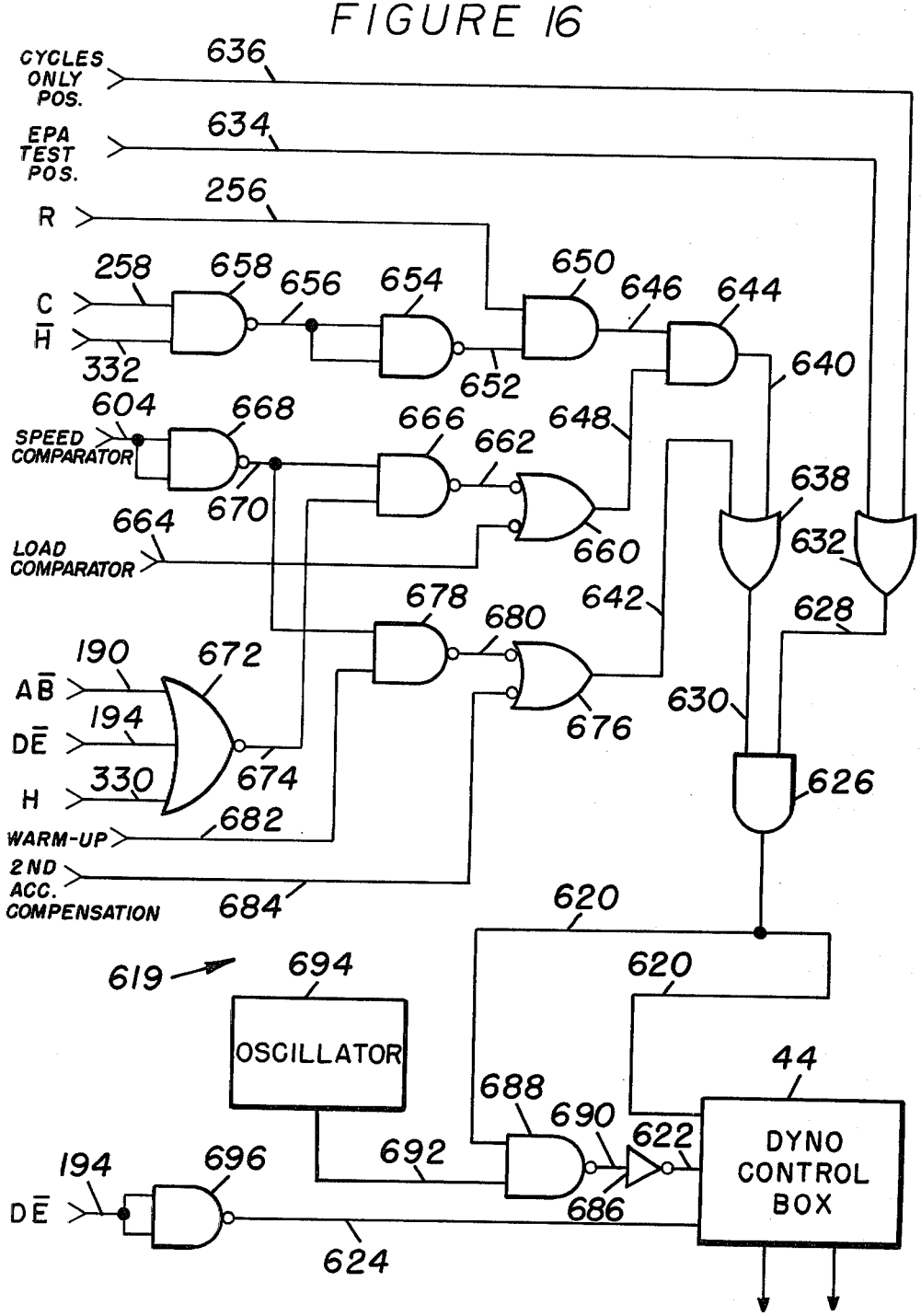
FIG. 16 illustrates schematically a dynamometer field coil control circuit of the controller.

FIG. 16 illustrates a circuit 619 of the controller 10 for activating the dynamometer control box 44 which is also shown in FIG. 2. As already indicated, when activated, the control box 44 couples 440 volt, three-phase power to the field coil 40 to load the engine. This loading controls the actual speed of the engine.

As will be described in FIG. 18, the control box 44 is controlled by input signals on a line 620, a line 622 and a line 624. Line 620 is connected to the output of an AND gate 626 having an input from a line 628 and another input from a line 630. An OR gate 632 has two inputs connected, respectively, to a line 634 and a line 636. Line 634 is coupled to the EPA test position of dial 88 and line 636 is coupled to the cycles-only position of dial 88. Thus, gate 626 will be enabled by a high signal on line 628 only when the engine is being operated through an EPA test procedure or through a cycles-only procedure.

Line 630 is connected to the output of an OR gate 638 which has one input connected to a line 640 and another input connected to a line 642. An AND gate 644 produces the output on line 640 and has one input connected to a line 646 and another input connected to a line 648. An AND gate 650, whose output is connected to the line 646, has one input connected to the line 256 carrying the run-command signal R and another input connected to a line 652. An inverter 654 has its output coupled to line 652 and inputs connected over a line 656 to the output of a NAND gate 658. One input to gate 658 is the signal C on line 258 from the flip-flop C and the other input to the gate 658 is the signal $\overline{H}$ on line 332 from flip-flop H.

Figure 17:
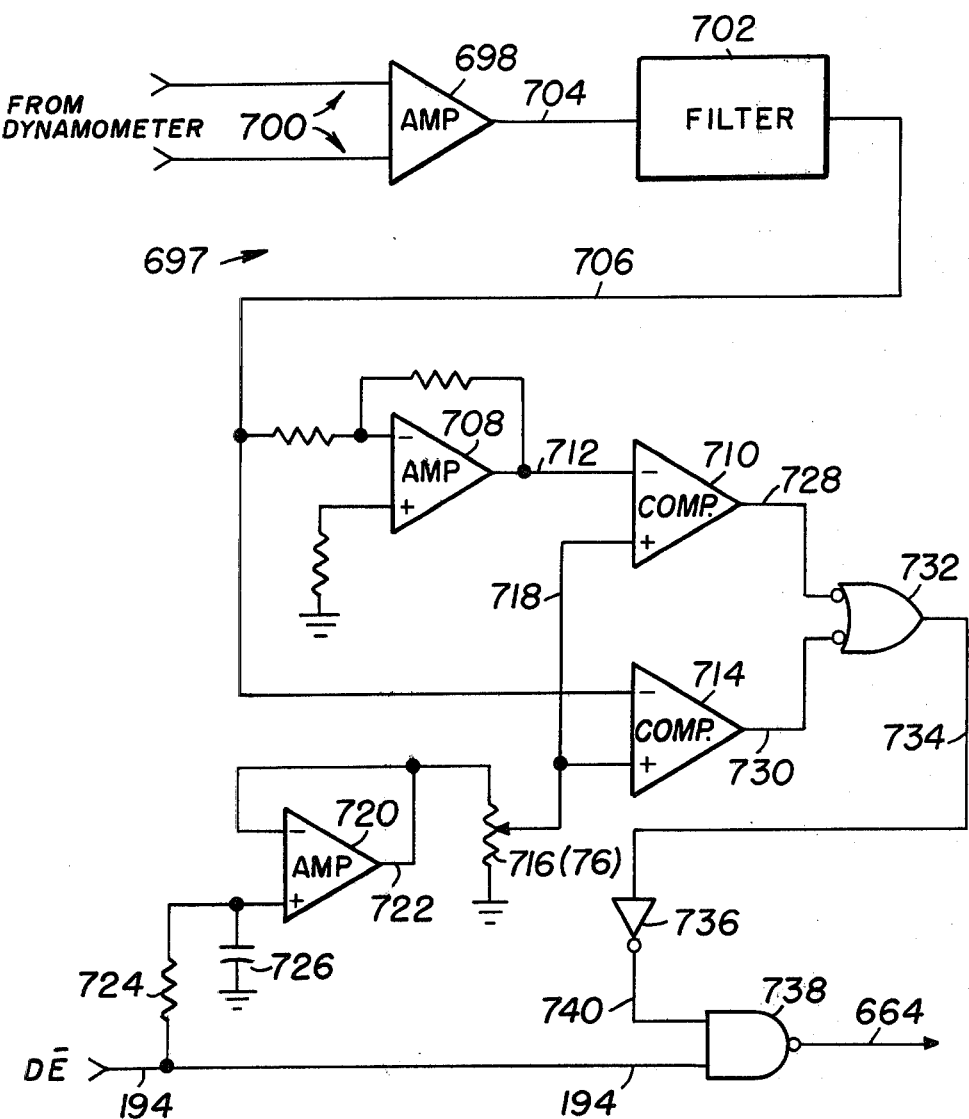
FIG. 17 shows schematically a circuit of the controller for presetting a load on the engine.

An OR gate 660 is coupled to line 648 and has one input connected to a line 662 and another input connected to a line 664 which is taken from FIG. 17 to be described. Line 664 carries the load data which is applied for the closed-throttle-pull-down interval 4-5 and third acceleration interval 5-6. A NAND gate 666 has its output connected to line 662 and one input connected to the output of an inverter 668 over a line 670. The input to inverter 668 is the speed comparator data on line 604 from FIG. 14.

Gate 666 is also coupled to the output of a NOR gate 672 over a line 674. The inputs to gate 672 are the interval signal $\overline{AB}$ on line 190 for the first acceleration interval 2-3, the interval signal $\overline{DE}$ on line 194 for the closed-throttle-pull-down interval 4-5, and the signal H on line 330 which goes high after the lug interval 7-8.

The input line 642 for OR gate 638 is coupled to the output of an OR gate 676. Gate 676 has one input connected to the output of a NAND gate 678 over a line 680. Gate 678 has one input connected to the line 670 and another input connected to a line 682 which is taken from the warm-up control circuit of FIG. 23 to be described. The other input to gate 676 is a signal on a line 684 which is generated by the dynomometer turn-on control circuit of FIG. 18 to be described.

Input control line 622 for the control box 44 is coupled to the output of an inverter 686 whose input is connected to the output of a NAND gate 688 over a line 690. Gate 688 is enabled by the signal on line 620 and by a frequency signal on a line 692 which is coupled to the output of an oscillator 694.

The input control line 624 to box 44 is coupled to the output of an inverter 696 whose input is the interval signal $\overline{DE}$ on line 194 for the closed-throttle-pull-down interval 4-5.

FIG. 16—CIRCUIT OPERATION

During an EPA test run or a cycles-only run, the control box 44 should be activated to cause energization of the field coil 40 and thereby control the speed of the engine. Dial 88 will be either in the EPA test position or cycles-only position when running an EPA test procedure or cycles-only procedure. Gate 632 will be enabled by a high on line 634 or 636. Therefore, gate 626 will have as one input a high on line 628.

Assume the run-command signal R on line 256 is generated so that one input to gate 650 is qualified. Then, at the commencement of the second acceleration interval 3-4 until the end of the lug interval 7-8, the signal on lines 258 and 332 will be high, whereby gate 658 will be enabled and inverter 654 will provide a high to the other input of gate 650. Consequently, at this time, the input on line 646 to gate 644 is high.

During the period from the commencement of the second acceleration interval 3-4 to the end of the lug interval 7-8, the signal on line 604 from the speed comparator 596 and inverter 602 of FIG. 14 will change from high to low depending on the actual engine speed and the command engine speed. If it is assumed that the actual engine speed is higher than the command speed, the field coil 40 should be energized. The signal on line 604 will be low resulting in a high on line 670 as one input to gate 666.

During the first acceleration interval 2-3, the coil 40 does not control engine speed. At this time, the interval signal $\overline{AB}$ on line 190 is high; therefore, the output of gate 672 will inhibit gate 666. Similarly, the output of gate 672 will inhibit gate 666 during the closed-throttle-pull-down interval 4-5 when interval signal $\overline{DE}$ on line 194 is high, and after the lug interval 7-8 by the high on line 330 due to signal H. Thus, only during the second acceleration interval 3-4, the third acceleration interval 5-6, the stabilization interval 6-7 and the lug interval 7-8, will gate 666 be enabled, whereby gate 644 also will be enabled via the output of gate 660. Therefore, during these intervals, gate 626 will have highs on both inputs via lines 628 and 630 to produce the control signal on line 620. Consequently, as the actual engine speed oscillates above and below the command speed, the signal on line 604 will oscillate between high and low levels and the control signal on line 620 will follow these levels.

When the signal on line 620 is high, gate 688 will be enabled with the frequency signal from the oscillator 694. Therefore, control pulses will be generated on the line 622 as inputs to the control box 44.

The EPA test procedures require that during the closed-throttle-pull-down interval 4-5, a load be applied against which the engine is accelerated for the next or third acceleration interval 5-6. Therefore, during the closed-throttle-pull-down interval 4-5, a load signal is generated on line 664 that corresponds to such a load. This signal enables gate 660 which enables gate 644 during the interval 4-5. Thus, gate 626 again will be enabled to provide a control signal on line 620 for controlling the control box 44 to energize the field coil 40 and provide such a load on the engine.

As shown in FIG. 1, the warm-up interval 0-0' occurs for 600 seconds, or ten minutes, during which time the engine should be operated at rated speed and load. During the interval 0-0', a high will be generated on line 682 for ten minutes as one input to gate 678. The level of the other input of gate 678 on line 670 is dependent on the speed comparator signal on line 604. If the engine is above rated speed, gate 678 will be enabled, as will gate 676 and gate 638. Gate 626 thus will be enabled to generate the control signals on line 620. The field coil 40 then will be energized to reduce the engine speed until rated speed is reached. Should the engine be below rated speed during this interval 0-0', the signal on line 670 will be low to disable gate 678; consequently, coil 40 will be deenergized to allow the engine speed to increase to rated speed.

For reasons that will be described in relation to FIG. 18, the signal on line 648 will be low for a short period at the beginning of the second acceleration interval 3-4. This low signal will enable gate 676, whereby gate 638 and gate 626 will be enabled to produce a control signal on line 620. Therefore, the field coil 40 will be unconditionally turned on at the start of the interval 3-4, that is, without regard to the actual engine speed from the data on line 604.

Also for reasons which will be described, gate 696 will be enabled during the closed-throttle-pull-down interval 4-5 by the interval signal $\overline{DE}$ on line 194. A low on line 624 will then be input to the control box 44 as a control signal.

FIG. 17—PRESET LOAD CIRCUIT

FIG. 17 illustrates a circuit 697 of controller 10 which is used to apply the load called for by the EPA for the closed-throttle-pull-down interval 4-5. As will become apparent, this circuit 697 is part of a closed-loop circuit that is closed loop on engine load. An amplifier 698 receives a differential voltage signal over lines 700 from a wheatstone bridge (not shown) of the dynamometer 16 shown in FIG. 2. This differential signal is proportional to the actual torque or load on the engine and can be either + or − polarity. A low pass filter 702 filters the output signal on a line 704 from the amplifier 698 and provides a filtered signal on a line 706.

An operational amplifier 708, which functions as an inverter, receives the signal on line 706 and supplies its output to the inverting input of an amplifier or comparator 710 over a line 712. Another amplifier or comparator 714 has its inverting input coupled directly to the line 706. Comparator 710 has another non-inverting input connected to the output of a potentiometer 716 on a line 718. Comparator 714 has another non-inverting input also connected to the line 718.

An operational amplifier 720, which functions as a voltage follower, supplies a voltage signal over a line 722 to the potentiometer 716. The voltage input to the operational amplifier 720 is supplied by the interval signal $\overline{DE}$ on line 194 for the closed-throttle-pull-down interval 4-5 via an RC network of resistor 724 and capacitor 726. The potentiometer 716 is adjusted by the dial 76 on console 52 to supply a voltage signal on line 718 which is proportional to the desired or command load required by the EPA.

The outputs of comparator 710 and comparator 714 are coupled over a line 728 and a line 730, respectively, as inputs to an OR gate 732 whose output is coupled over a line 734 to an inverter 736. A NAND gate 738 is coupled to the output of inverter 736 over a line 740 and to the line 194. The output of gate 738 is coupled to line 664 which leads to gate 660 described in FIG. 16.

FIG. 17—CIRCUIT OPERATION

During an EPA test run or cycles-only run, a differential signal proportional to engine load is generated on line 700 and amplified by amplifier 698. The amplified differential signal is then filtered by filter 702 and coupled over line 706 to the inverting input of amplifier 708. Assume that the signal on line 706 is +2 volts, whereby the output on line 712 to the inverting input of comparator 710 is negative. Comparator 714 however, will have +2 volts at its inverting input.

During the closed-throttle-pull-down interval 4-5, the potentiometer 716 supplies a positive preset voltage on line 718 which, as already noted, is proportional to the desired engine load. Assume this voltage is +1 volts so that in the example the actual load is greater than the present load. Comparator 710 and comparator 714 therefore will have +1 volts at their non-inverting inputs. As a result, comparator 714 and not comparator 710 will switch states to produce a low on line 730 that enables gate 732. Inverter 736 will invert the resulting high on line 734 to disable gate 738. Therefore, the signal on line 664 will be high to cause circuit 619 to deenergize coil 40 and hence reduce the load on the engine until the preset load is reached.

If the differential signal on line 706 is −2 volts, this still means that the actual engine load is greater than the +1 volt of preset load in the example. Amplifier 708 will provide +2 volts on line 712 to the inverting input of comparator 710. Comparator 714 will have −2 volts at its inverting input. Consequently, only comparator 710 will switch states to provide a low on line 728 to enable gate 732. As before, the signal on line 664 then will be high to deenergize the coil 40 until the preset load is reached.

From the above discussion, it will be seen that the circuit 697 generates the load control signal on line 664 irrespective of the polarity of the differential signal on lines 700. Furthermore, it also can now be seen that the circuit 697 will generate a low load control signal on line 664 if the actual engine load is less than the preset load, e.g., if the absolute value of the signal on line 706 is less than 1 volt in the example. This will cause circuit 619 of FIG. 16 to energize the coil 40 until the preset load is reached.

FIG. 18—THROTTLE DELAY AND DYNAMOMETER TURN-ON CIRCUIT

At the start of the second acceleration interval 3-4, the throttle 30 is fully opened and the field coil 40 energized and deenergized to control the speed of the engine in accordance with the required acceleration for this interval. However, this acceleration can initially be too steep upon commencement of the second acceleration interval 3-4 since the throttle 30 can be opened fully too rapidly in relation to builing up current in the field coil 40 to control the engine speed. This problem is avoided with a circuit 741, shown in FIG. 18, of controller 10.

A monostable multivibrator 742 has an input coupled to the line 110 shown in FIG. 4 for reset purposes. Multivibrator 742 is triggered by the signal on line 268 from the NAND gate 266 of FIG. 6. This signal goes low for the start of the second acceleration interval 3-4. The normally low output pulse $\overline{Q}$ of multivibrator 742 is provided over a line 744 while the output pulse Q of multivibrator 742 is supplied on a line 746, the latter being normally high. Multivibrator 742, when so triggered, generates output pulses of preset width by adjustment of a potentiometer 748. This potentiometer 748 is adjusted with the dial 64 on the console 52.

A monostable multivibrator 750 has an input coupled to the line 110 for reset purposes. Multivibrator 750 is triggered with the trailing edge of the pulse on line 744 and provides a normally high output pulse $\overline{Q}$ on a line 752 which is one input to a NOR gate 754. The other input to gate 754 is the pulse on line 746. The output of gate 754 is coupled to the line 684 described in FIG. 16 for unconditionally energizing the coil 40. The duration of a low pulse on line 752, when multivibrator 750 is so triggered, is controlled by a potentiometer 756 which is preset with the dial 66 shown on console 52.

FIG. 18—CIRCUIT OPERATION

When the power switch 94 is turned on, multivibrator 742 and multivibrator 750 will be reset by the signal on line 110. At the beginning of the second acceleration interval 3-4, NAND gate 266 from FIG. 6 will be enabled to produce a low signal on line 268 which will trigger multivibrator 742. The resulting low pulse on line 746 will, as will be shown in connection with FIG. 22, delay opening of the throttle 30 but will enable gate 754. Therefore, a low pulse will be produced on line 684 to unconditionally energize the field coil 40, as described in relation to FIG. 16. Thus, current will build up in the coil 40 to begin loading the engine.

After a preset time set by the potentiometer 748, the pulse on line 744 will go low and the pulse on line 746 will go high. Therefore, at this time, the throttle 30 will be opened by the signal on line 746 and multivibrator 750 will be triggered by the signal on line 744. A low pulse on line 752 then will be generated, resulting in a low pulse on line 684 to continue unconditionally energizing the coil 40 for a duration corresponding to the duration of the low pulse on line 752. By setting the potentiometer 748 and potentiometer 756, the delay in opening the throttle 30 and unconditionally energizing the field coil 40 at the start of the second acceleration interval 3-4 can be adjusted to prevent the engine from accelerating initially too steeply.

FIG. 19—DYNAMOMETER CONTROL BOX AND FIELD COIL

Figure 19:
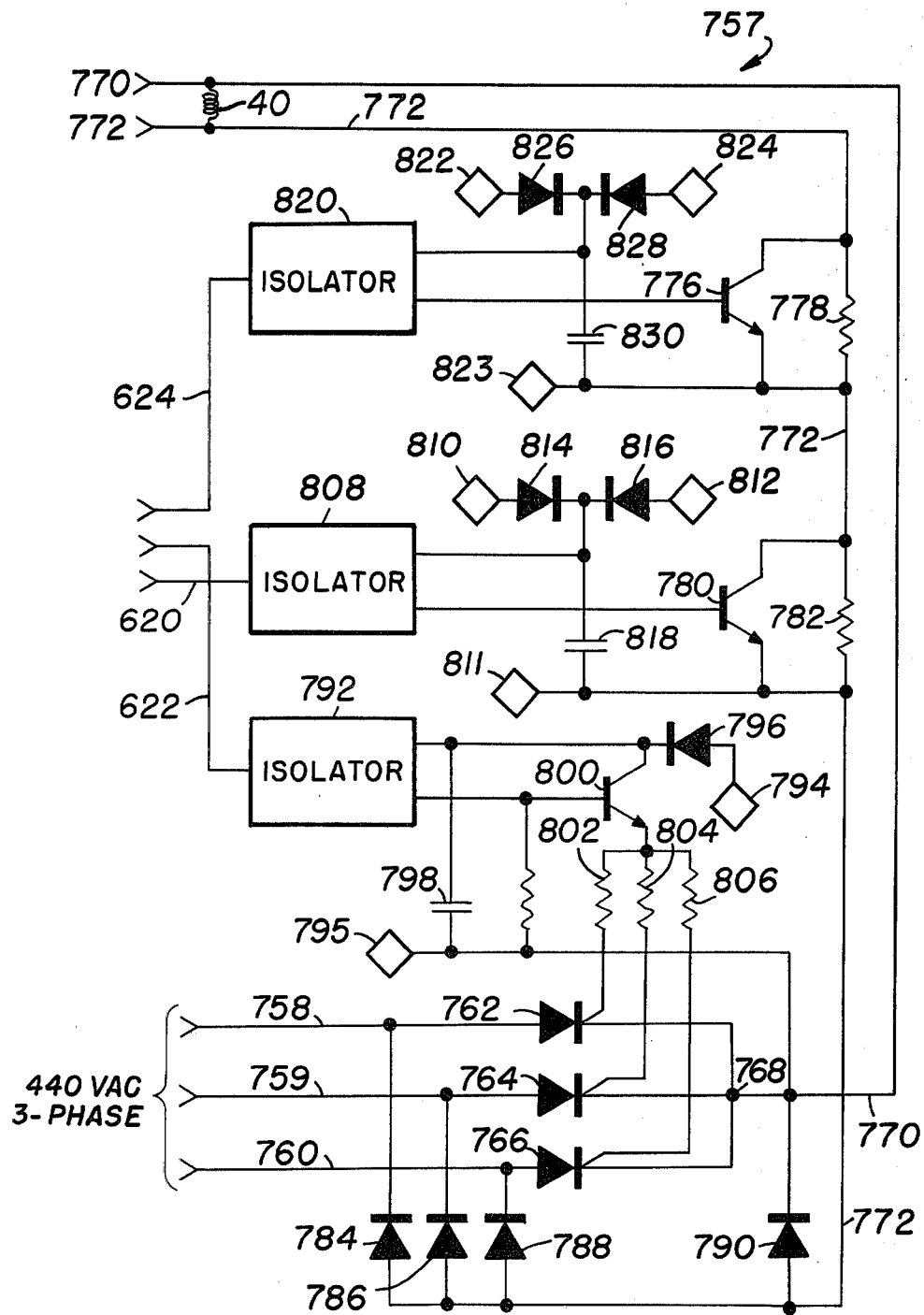
FIG. 19 shows a schematic circuit of the controller for energizing the dynamometer field coil.

FIG. 19 illustrates a circuit 757 of the controller 10 for energizing and deenergizing the field coil 40 in response to the control signals on lines 620, 622 and 624 of FIG. 16. Three lines 758, 759 and 760 supply the 440 volt, three-phase power shown in FIG. 2 through three silicon-controlled rectifiers (SCR) 762, 764 and 766 to a common junction 768. From junction 768, the power is supplied over a line 770, through the field coil 40 and back over a line 772.

The current on line 772 is returned through a transistor 776 or resistor 778 and a transistor 780 or a resistor 782. Line 772 then extends to three diodes 784, 786, and 788 which are coupled, respectively, to lines 758, 759 and 760. Another diode 790, which is termed a freewheeling diode, is coupled between line 770 and line 772.

To gate on the SCRs 762, 764, and 766, the control signals on line 662 from FIG. 16 are coupled to an optical isolator 792 which isolates these low control voltage signals of about 5 volts from the 440 volt, three-phase load supply. An AC supply, shown at terminals 794 and 795, which is rectified and filtered by a diode 796 and a capacitor 798, is coupled through the isolator 792 when the latter is activated by the signal on line 622 to bias on a transistor 800. Current then flows from the collector of transistor 800 to the emitter and then through three resistors 802, 804 and 806 to the gate electrodes of the respective SCRs 762, 764 and 766.

A similar optical isolator 808 is coupled to the line 620 to receive the dynamometer control signals on this line. An AC supply via terminals 810, 811 and 812 is rectified by diodes 814 and 816, and filtered by capacitor 818. When the isolator 808 is activated by the signal on line 620, the rectified and filtered voltage signal is coupled via the isolator 808 to bias transistor 780 on and short circuit the resistor 782.

Another similar optical isolator 820 is controlled by the signal on line 624. An AC supply via terminals 822, 823 and 824 is rectified by diodes 826 and 828 and filtered by a capacitor 830. When the signal on line 624 is received, isolator 820 couples this rectified and filtered voltage signal to the base of transistor 776 to turn it on and short circuit the resistor 778.

FIG. 19—CIRCUIT OPERATION

When the control signals are generated on line 622, isolator 792 will turn on transistor 800. Then, SCRs 762, 764 and 766 will be gated on simultaneously. As the three-phase power is supplied on lines 758, 759 and 760, due to the phase difference on this supply, first, for example, SCR 762 will conduct current, followed by SCR 764 and then SCR 766. This current will then be coupled over line 770, through the field coil 40 and then over line 772 through diodes 786, 788 and 784 to the respective lines 759, 760 and 758.

As already noted, at certain intervals, particularly the second acceleration interval 3-4, the third acceleration interval 5-6, the stabilization interval 6-7 and the lug interval 7-8, the circuit 536 of FIG. 14 is in a condition of being closed-loop on engine speed. At this time the field coil 40 is being energized and deenergized to control engine speed by the gating of SCRs 762, 764 and 766. It is known that for a circuit such as 757 of FIG. 19, with the high voltage application for field current build up and with free wheeling provision for field current decay, current build up will be quicker than current decay. This difference is response time can cause reduced system closed-loop stability.

To solve this problem of reduced instability, the insolator 808 turns transistor 780 on and off in response to the control signal on line 620. When the SCRs 762, 764 and 766 are gated off by the output of transistor 800, the signal on line 620 will be low to turn off transistor 780. Therefore, resistor 782 will be in circuit with the coil 40 resulting in a quicker decay time than if the resistor 782 were shorted. This is because, as is known, the time constant is given by the formula L/R, where L is the inductance of the coil 40 and R is the resistance in circuit. When the SCRs 762, 764 and 766 are gated on to energize the coil 40, the signal on line 620 is high to bias transistor 780 on. This short circuits the resistor 782 thus restoring the natural time constant for current build up in the field coil 40.

With respect to isolator 820, during the closed-throttle-pull-down interval 4-5, the circuit 697 of FIG. 17 is in a condition of being closed loop on torque with the throttle 30 closed. During this interval 4-5, the engine speed can be reduced too quickly if the load on the engine is reduced too slowly. Therefore, isolator 820 responds to the signal on line 624 during this interval 4-5 to turn off transistor 776 and put resistor 778 in circuit. This reduces the decay time of the coil 40, thereby unloading the engine more quickly and preventing too rapid a decrease in the engine speed. In intervals other than the closed-throttle-pull-down interval 4-5, the signal on line 624 will be high, causing transistor 776 to turn on and short circuit resistor 778.

FIG. 20—DYNAMOMETER WATER CONTROL CIRCUIT

Figure 20:
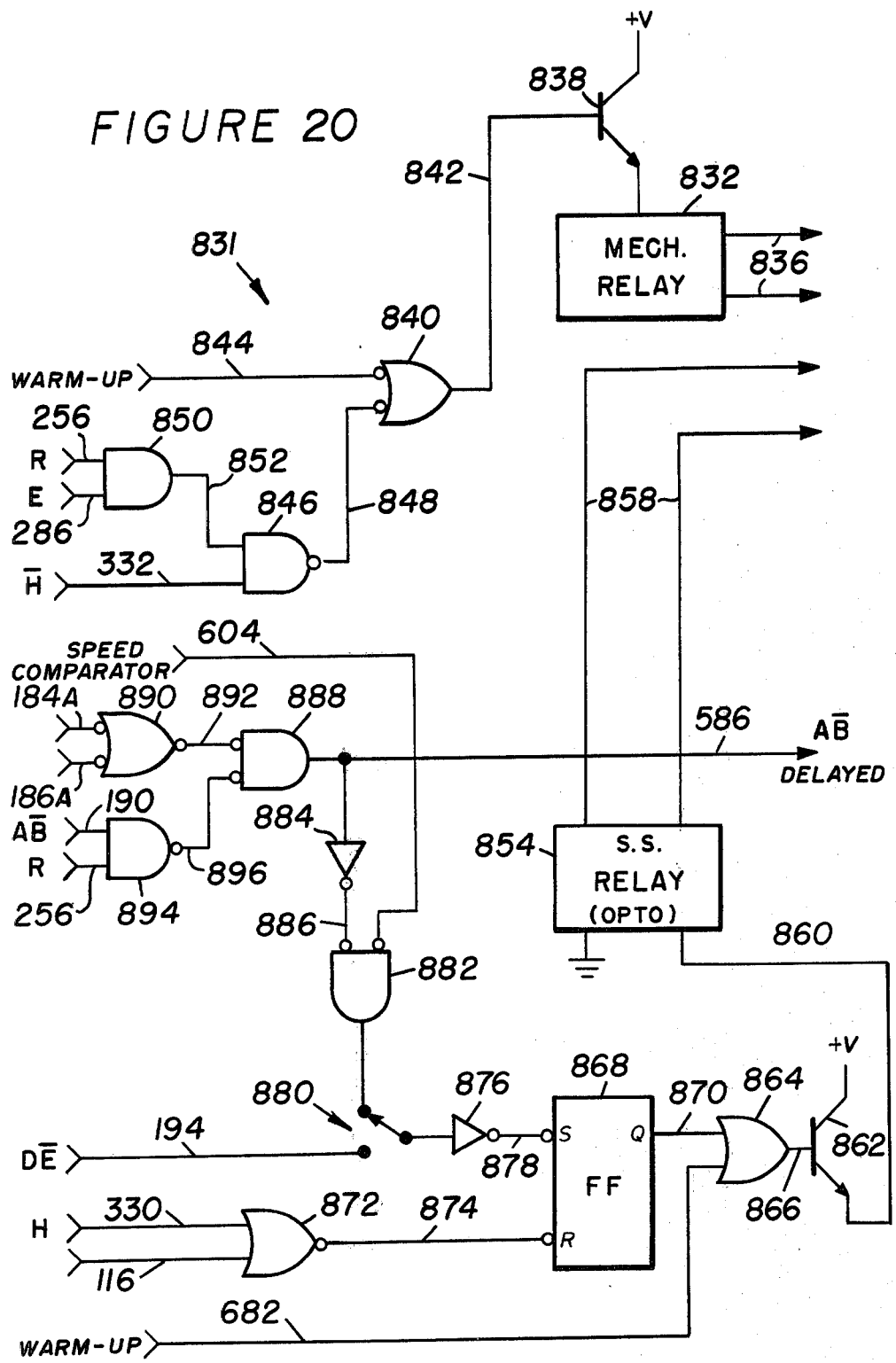
FIG. 20 is a schematic illustration of a circuit of the controller for regulating the flow of dynamometer cooling water.

FIG. 20 shows a circuit 831 of controller 10 which is used to control the flow of cooling water to the dynamometer 16 during an EPA test run. There will be described two flow conditions, one being a minimum flow condition and the other being a set flow condition. Minimum flow means that there is a minimum flow of cooling water irrespective of the water temperature while set flow means that water flow, greater than minimum flow, will be allowed in dependence on the water temperature.

A mechanical relay 832, when energized, actuates a thermostatic control (not shown) over lines 836. The thermostatic control then controls the set flow of cooling water depending on the temperature of the water.

To energize relay 832, a transistor 838 has its base connected to the output of an OR gate 840 over a line 842. One input to gate 840 is a signal on a line 844 from FIG. 23 to be described. Gate 840 has its other input coupled to the output of a NAND gate 846 over a line 848. The line 332 from flip-flop H, carrying the signal $\overline{H}$, is coupled to one input of gate 846, the other input being coupled to an AND gate 850 over a line 852. Gate 850 has one input connected to the line 256 carrying the run-command signal R and another input connected to the line 286 from flip-flop E carrying the signal E.

A solid state relay 854, when energized, energizes a solenoid valve (now shown) over lines 858 to provide the minimum flow of cooling water. Relay 854 is energized over a line 860 when a transistor 862 is turned on. An OR gate 864 has its output coupled over a line 866 to the base of transistor 862. One input to gate 864 is the signal on the line 682 shown in FIG. 23 to be described. The other input is the output Q of a flip-flop 868 over a line 870.

Flip-flop 868 is reset by the output of a NOR gate 872 over a line 874. Gte 872 has one input connected to the line 116 from FIG. 4 and another input connected to line 330 from flip-flop H carrying the signal H.

Flip-flop 868 has its set input connected to the output of an inverter 876 over a line 878. The input to inverter 876 is connected through a manual switch 880 either to the line 194 carrying the interval signal $\overline{DE}$ for the closed-throttle-pull-down interval 4-5, or the output of an AND gate 882. Switch 880 can be on the back of controller 10 and this is not shown on console 52.

Gate 882 has one input connected to the speed comparator signal line 604 from FIG. 14 and another input connected to the output of an inverter 884 over a line 886. An AND gate 888 provides an output on the line 586 which was described in FIG. 14 for providing an offset voltage and which also extends to the input of inverter 884. One input to gate 888 is the output of a NOR gate 890 over a line 892 and the other input is the output of a NAND gate 894 over a line 896.

Gate 890 has one input connected to the line 184A and another input connected to the line 186A, the latter two being shown in FIG. 5. Gate 894 has one input connected to the line 190 carring the interval signal $A\overline{B}$ for the first acceleration interval 2-3 and another input connected to the line 256 carrying the run-command signal R.

FIG. 20—CIRCUIT OPERATION

Both minimum flow and set flow of cooling water occur during the warm-up interval 0-0'. During the warm-up interval 0-0', the signal on line 844 from FIG. 23 will be low, whereby gate 840 will be enabled to turn on transistor 838 and energize relay 832 for set flow. At the same time, the signal on line 682 from FIG. 23 will be high for this interval 0-0' and gate 864 therefore will be enabled to turn on transistor 862. Relay 854 then will be activated to provide also minimum flow at this time. After the warm-up interval 0-0', the signals on lines 844 and 682 change levels; whereby both gates 840 and 864 will be disabled and transistors 838 and 864 will be turned off.

At the commencement of the third acceleration interval 5-6, the signal E on line 286 will go high due to the setting of flip-flop E and the run-command signal R on line 256 already will be high. Therefore, gate 850 is enabled as is gate 846 since the signal $\overline{H}$ on line 332 from flip-flop H is high until the end of lug interval 7-8. Gate 840 is thus enabled from the commencement of the third acceleration interval 5-6 to the end of the lug interval 7-8 on turn on transistor 838 and energize relay 832 to provide for the set flow.

At the start of the first acceleration interval 2-3, the interval signal $A\overline{B}$ on line 190 will be high as will be the run-command signal R on line 256. Consequently, gate 894 is enabled at this time to provide one low qualifying signal to gate 888 over line 896. After 1 second into this inverval 2-3, the signal on line 184A goes low to enable gate 890 and, thereby, gate 888. The output signal on line 586 from gate 888 is the interval signal $A\overline{B}$ delayed by 1 second and is used in FIG. 14 as an offset voltage in FIG. 14.

Inverter 884 inverts the delayed signal $A\overline{B}$ to provide one qualifying input to gate 882. During the first acceleration interval 2-3, the comparator signal on line 604 from FIG. 14 will be high until the engine reaches low idle plus 200 rpm so that gate 882 is disabled. With the switch 880 in the position shown, the flip-flop 868 will thus remain reset to disable gate 864 and keep transistor 862 off. Thus, during the first acceleration interval 2-3, there is neither set nor minimum flow of cooling water.

At the start of the second acceleration interval 3-4, the signal on line 604 goes low. Gate 882 will be enabled to set the flip-flop 868 through inverter 876. Gate 864 then turns on transistor 862 to provide the minimum flow of water. Flip-flip 868 then will be reset at the end of the lug interval 7-8 when the signal H on line 330 goes high to enable gate 872. Thus, minimum water flow also is provided from the beginning of the second acceleration interval 3-4 to the end of the lug interval 7-8. Note that flip-flop 868 had initially been reset when power first comes on by the high on line 116 into gate 872.

If the switch 880 were coupled to line 194, the interval signal DE for the closed-throttle-pull-down interval 4-5 will set flip-flop 868 through inverter 876. Minimum water flow then would be delayed or not start until the interval 4-5.

FIG. 21—MOTOR CONTROL CIRCUIT FOR ENGINE THROTTLE

Figure 21:
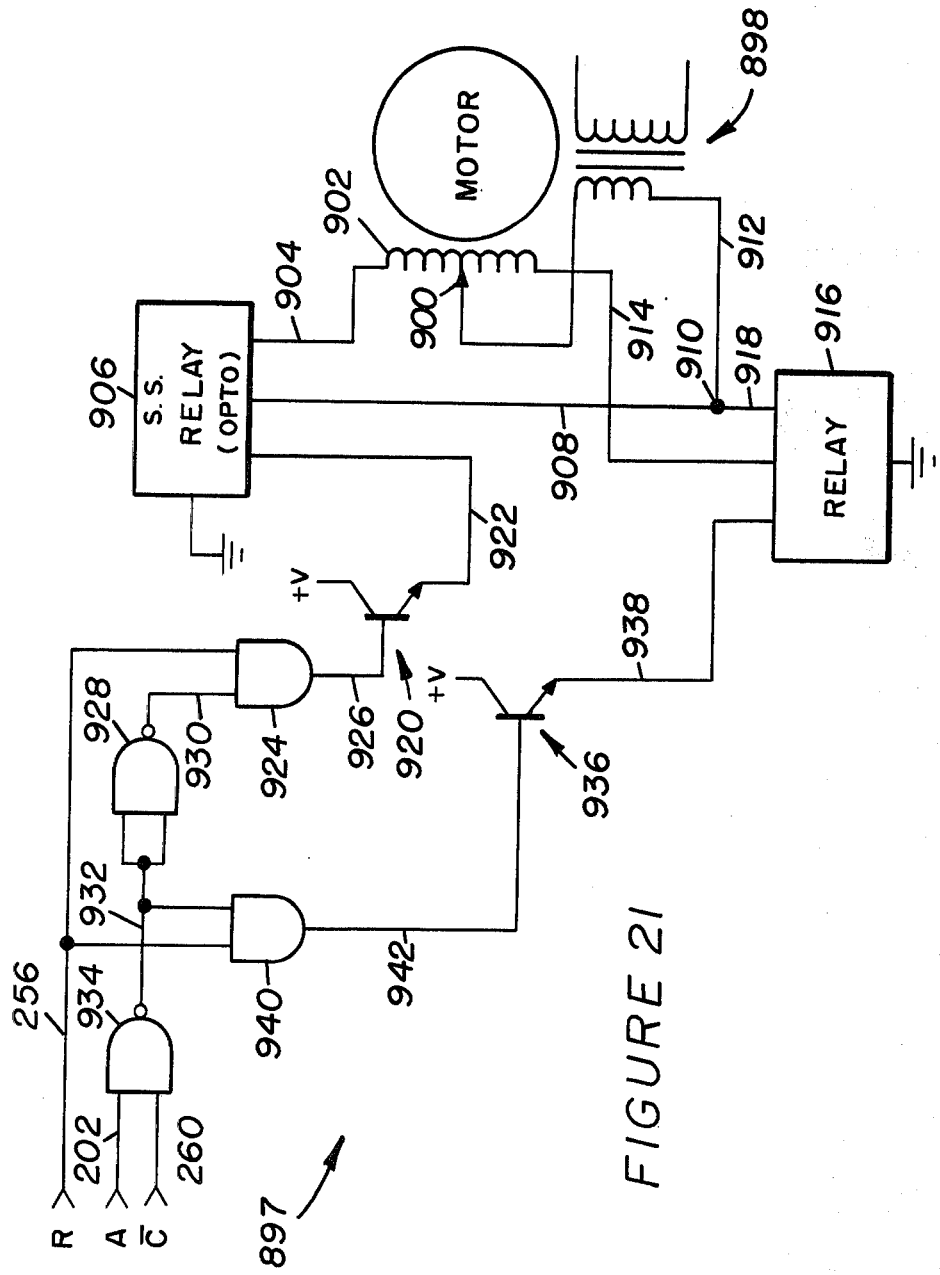
FIG. 21 illustrates, schematically, a motor control circuit of the controller for slowly opening the engine throttle.

FIG. 21 shows a circuit 897 of the controller 10 to energize the servo motor 18 of FIG. 2 and open the throttle 30 slowly during the first acceleration interval 2-3.

A transformer 898 has one end of a secondary winding coupled to a terminal 900 intermediate the ends of a motor winding 902. A line 904 extends between the upper end of winding 902 and a solid state relay 906. Another line 908 is coupled between relay 906 and a junction 910. A line 912 is connected between the junction 910 and the lower end of the secondary winding of transformer 898. When energized, relay 906 will couple line 904 to line 908 to complete a circuit for opening the throttle 30.

A line 914 is coupled between the lower end of motor winding 902 and a solid state relay 916. A line 918 extends between relay 916 and junction 910. When activated, relay 916 couples line 914 to line 918 to complete a circuit for closing the throttle 30.

Relay 906 is energized when a transistor 920 is turned on, the emitter of transistor 920 being coupled over a line 922 to relay 906. The base of transistor 920 is connected to the output of an AND gate 924 over a line 926. Gate 924 has one input connected to the line 256 carrying the run-command signal R and another input connected to the output of an inverter 928 over a line 930. Gate 928 has its input connected to a line 932 coupled to the output of a NAND gate 934. Line 202 carrying the signal A from flip-flop A and line 260 from flip-flop C carrying the signal C̄ are the two inputs to gate 934.

Relay 916 is energized when a transistor 936 is turned on, the emitter of transistor 936 being coupled over a line 938 to relay 916. An AND gate 940 has its output connected over a line 942 to the base of transmitter 936 and has its two inputs connected, respectively, to the line 256 and the line 932.

FIG. 21—CIRCUIT OPERATION

As already mentioned, at the start of the first acceleration interval 2-3 during an EPA test run or cycles-only run, the throttle 30 should be opened slowly by motor 18. At this time, the run-command signal R will be generated on line 256 as one input to gate 924. Flip-flop A will be set and flip-flop C reset to produce highs on line 202 and line 260, respectively. Therefore, gate 934 will be enabled to provide a low on line 932 which will be inverted by gate 928 to enable gate 924 via the high on line 930. Transistor 920 will then be turned on and relay 906 activated.

With relay 906 activated, a circuit will be completed from the upper end of the secondary of transformer 898, through terminal 900 to the upper end of motor winding 902, through lines 904 and 908 to junction 910 and over line 912 to the lower end of the secondary of transformer 898. Consequently, motor 18 will be energized in one direction to slowly open the throttle 30.

At the end of the first acceleration interval 2-3, flip-flop C will be set and a low provided on line 260. Gate 934 will now become disabled while gate 940 will be enabled by the highs on line 932 and line 256. Transistor 936 will be turned on to activate relay 916.

With relay 916 activated, a circuit will be completed from the upper end of the secondary of transformer 898, through junction 900 to the lower end of winding 902 to line 914, through line 918 to junction 910 and then over line 912 to the lower end of the secondary. Motor 18 thus will be energized in the other direction to close throttle 30.

FIG. 22—THROTTLE SOLENOID CONTROL CIRCUIT

Figure 22:
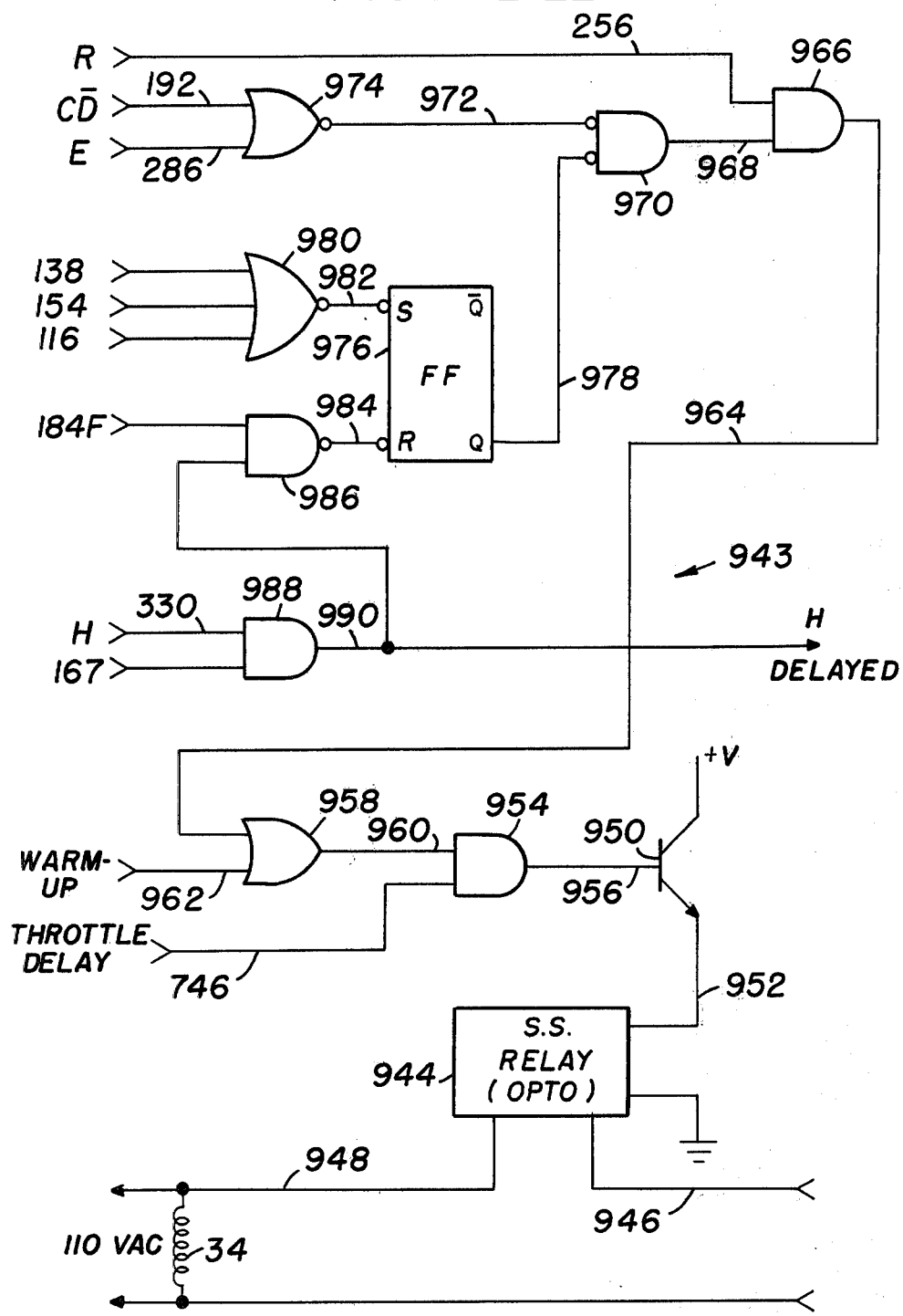
FIG. 22 is a schematic diagram of a throttle solenoid control circuit of the controller for rapidly opening the engine throttle.

As already discussed, the throttle 30 should be opened for the warm-up interval 0-0', should be fully opened quickly at the start of the second acceleration interval 3-4, should be closed quickly at the start of the closed-throttle-pull-down interval 4-5, should be fully opened quickly at the start of the third acceleration interval 5-6 and remain open until after the lug interval 7-8. FIG. 22 illustrates a circuit 943 for energizing and deenergizing the solenoid 34 to so open and close the throttle 30.

A solid state relay 944, when energized, supplies an AC voltage across the solenoid 34 by coupling a line 946 to a line 948. Relay 944 is controlled by a transistor 950 whose emitter is coupled to a line 952 extending to relay 944. An AND gate 954 has its output coupled to the base of transistor 950 over a line 956. Gate 954 has one input connected to the line 746 from FIG. 18 carrying the throttle delay signal and another input connected to an output of an OR gate 958 over a line 960. Gate 958 has one input connected to a line 962 from FIG. 23 to be described. The other input to gate 958 is coupled over a line 964 to the output of an AND gate 966.

Gate 966 has one input connected to the line 256 carrying the run-command signal R and another input connected to a line 968. An AND gate 970 has its output connected to line 968, with one input being coupled over a line 972 to the output of a NOR gate 974 and another input being connected to the output Q̄ of a throttle enable flip-flop 976 over a line 978. Gate 974 has its input connected to the line 192 carrying the interval signal CD̄ for the second acceleration interval 3-4 and the line 286 carrying the signal E from flip-flop E.

Flip-flop 976 is set by the output of a NOR gate 980 over a line 982. Gate 980 has one input connected to line 138, another input connected to the line 154 and a third input connected to the line 116, all shown in FIG. 4.

The reset input of flip-flop 976 is connected over a line 984 to the output of a NAND gate 986. Gate 986 has one input connected to the line 184F of FIG. 5 and another input connected to the output of an AND gate 988 over a line 990. Line 330 carrying the signal H from flip-flop H and line 167 from clock 162 of FIG. 5 are the two inputs to gate 988. The signal on line 990 will be the signal H delayed by 33 milliseconds by the clock signal on line 167.

FIG. 22—CIRCUIT OPERATION

During the ten minute warm-up interval 0-0', the signal on line 962 will be high so that gate 958 will provide a high on line 960 as one input to gate 954. During this ten minute interval, the throttle delay signal on line 746 from FIG. 18 also will normally be high. Gate 954 now will turn on transistor 950 to actuate relay 954 and energize solenoid 34. Throttle 30 will then be fully open to run the engine at rated speed for interval 0-0'. At the end of this interval 0-0', the signal on line 962 will go low to disable gate 954 and turn off transistor 950 so that throttle 30 will return to its closed position for the low idle interval 1-2.

At the start of the second acceleration interval 3-4, interval signal $\overline{CD}$ on line 192 is generated to enable gate 974 and provide a low enabling signal to one input of gate 970. The flip-flop 976, which was set by the signal on line 116 or 138 or 154, will be providing a low on line 978 at this time as the other input to gate 970. Gate 970 thus will be enabled, as will the following gate 966 due to the high signals on lines 256 and 968, whereby gate 958 provides a high on line 960.

Figure 18:
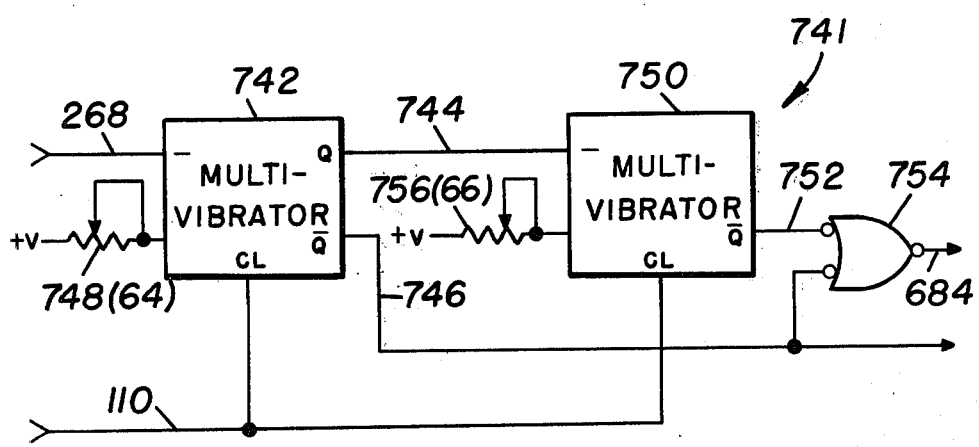
FIG. 18 is a schematic drawing of a throttle delay and dynamometer turn on control circuit of the controller.

At the commencement of the second acceleration interval 3-4, the signal on line 746 will be low for a brief duration as described in FIG. 18. Thereafter, line 746 goes high to enable gate 954 and turn on transistor 950. Consequently, during the remainder of the second acceleration interval 3-4, throttle 30 will be fully opened. At the end of the second acceleration interval 3-4, the interval signal $\overline{CD}$ on line 192 goes low so that solenoid 34 is deenergized and the throttle 30 closes for the next or closed-throttle-pull-down interval 4-5.

At the termination of the closed-throttle-pull-down interval 4-5 and the commencement of the third acceleration interval 5-6, flip-flop E is set to produce the signal E on line 286 into gate 974. Flip-flop 976, at this time, is still in its set condition so that gate 970 is enabled as is gate 966, gate 958 and gate 954. Thus, as can be seen, at the start of the third acceleration interval 5-6, solenoid 34 will be energized to fully open the throttle 30.

Throttle 30 remains fully open until a short period of time after the lug interval 7-8 is completed. At the end of the interval 7-8, flip-flop H will be set to produce a high on line 330 as one input to gate 988. After 33 milliseconds, line 167 goes high to enable gate 988, whereby gate 986 has one input qualified. Five seconds after the interval 7-8, the signal on line 184F will go high and enable gate 986 to reset flip-flop 976. As a result, gate 970 will be disabled to deenergize solenoid 34 to close the throttle 30 for the next succeeding low idle interval 1-2.

FIG. 23—WARM-UP AND AUTOMATIC RUN CONTROL CIRCUIT

Figure 23:
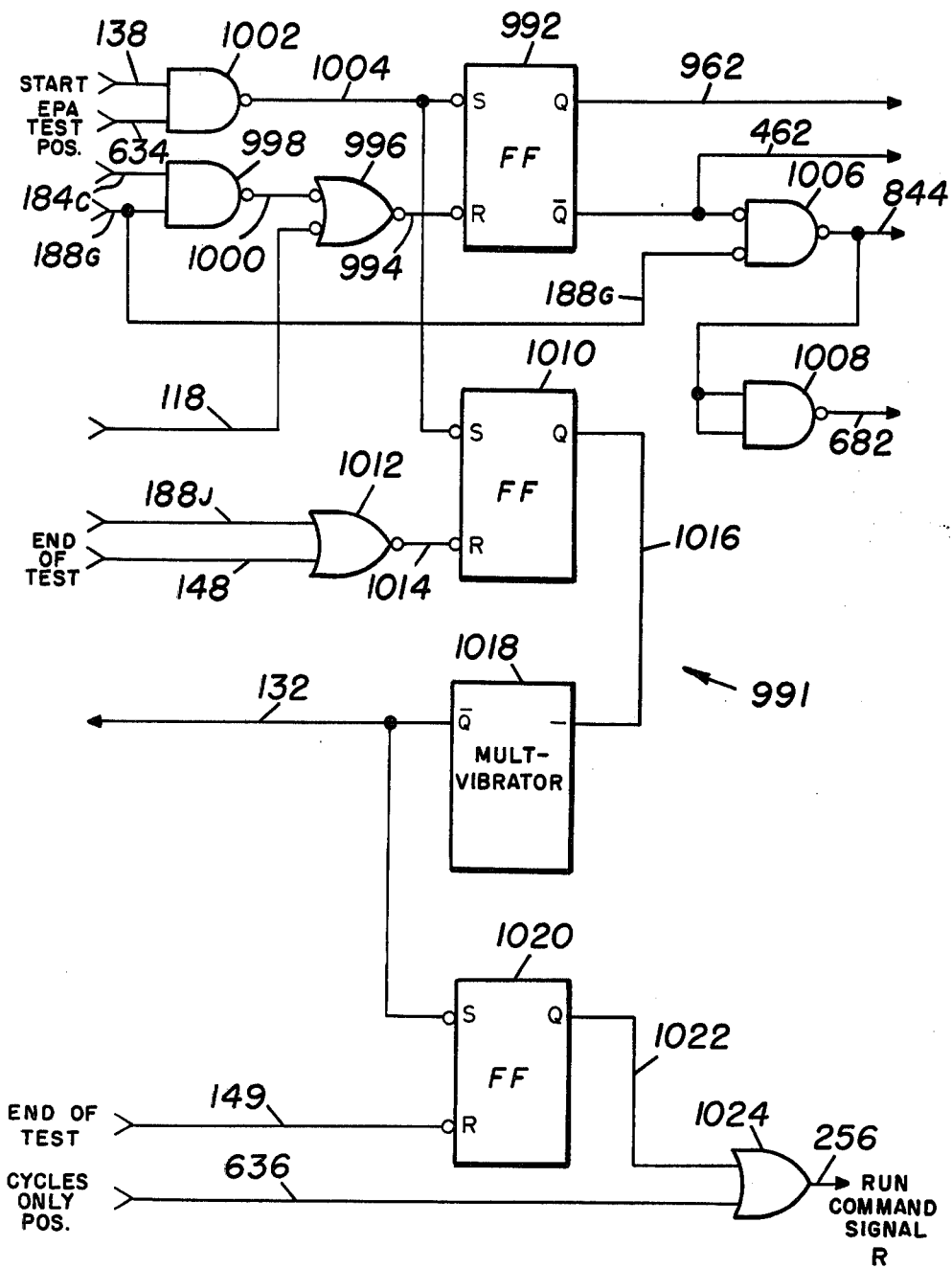
FIG. 23 shows, schematically, an engine warm-up and automatic run control circuit of the controller.

FIG. 23 shows a circuit 991 which is used to start the running of the engine through the entire EPA test procedure including the warm-up interval 0-0' followed by three cycles each beginning with the low idle interval 1-2 to the end of the lug interval 7-8.

A warm-up control flip-flop 992 has its output Q coupled to the line 962 leading to FIG. 22 and its output $\overline{Q}$ connected to the line 462 leading to FIG. 11. Flip-flop 992 has its reset input connected to a line 994 coupled to the output of a NOR gate 996. Gate 996 has one input connected to the line 118 from FIG. 4 and another input connected to the output of a NAND gate 998 over a line 1000. Gate 998 has one input connected to the line 184C and another input connected to the line 188G, both from FIG. 5.

The set input of flip-flop 992 is coupled to a NAND gate 1002 over a line 1004. Gate 1002 has one input connected to the line 138 from FIG. 4 and another input connected to the line 634 coupled to dial 88 in the EPA test position.

The output line 462 from flip-flop 992 is coupled to one input of a NAND gate 1006 whose other input is coupled to line 188G. An inverter 1008 is connected to the output of gate 1006 on the line 844 and provides an output on the line 682 leading to FIG. 16 to control the dynamometer field coil 40 and to FIG. 20 to control the dynamometer water flow.

A flip-flop 1010 has its set input connected to line 1004 and its reset input connected to the output of a NOR gate 1012 over a line 1014. Gate 1012 has one input connected to line 188J from FIG. 5 and another input connected to line 148 from FIG. 24 to be described. Line 148 carries the end-to-test signal.

Flip-flop 1010 has its output Q connected over a line 1016 to the trigger input of a monostable multivibrator 1018. The output $\overline{Q}$ of multivibrator 1018 is connected to line 132 leading to FIG. 4. A flip-flop 1020 has its set input connected to line 132 and its reset input connected to the line 149 from FIG. 24. Line 149 also carries an end-of-test signal. The output Q of flip-flop 1020 is coupled over a line 1022 as one input to an OR gate 1024, the other input to this gate being the line 636 connected to dial 88 in the cycles-only position. The output of gate 1024 is the run-command signal R on line 256.

FIG. 23—CIRCUIT OPERATION

To commence an EPA test run, dial 88 is placed in the EPA test position, the power is turned on with switch 94 and then the start button 96 is depressed. First, a reset pulse will be generated on line 118 to reset flip-flop 992 through gate 996. Then, gate 1002 will be enabled by the high signals on line 138 and line 634. Flip-flop 992 is then set to provide a high on line 962 to energize solenoid 34 as described in FIG. 22 and thereby fully open throttle 30.

At this time, line 462 will be low from the output $\overline{Q}$ of flip-flop 992 and line 188G will be low since the 600 second or ten minute interval has not yet occurred. Gate 1006 will thus be enabled to generate a low on line 844 to control the dynamometer water flow as described in FIG. 20. Inverter 1008 will provide a high on line 682 to control energization of the dynamometer field coil 40 as described in FIG. 16 and to control dynamometer water flow as described in FIG. 20. Thus, at this time, the throttle 30 is fully opened and the dynamometer field coil 40 is being energized and deenergized to operate the engine at rated speed and load in accordance with the warm-up interval 0-0'.

At 600 seconds, the signal on line 188G goes high to disable gate 1006. The field coil 40 thus is deenergized and water flow ceases. Two seconds thereafter, the signal on line 184C goes high so that gate 998 is now enabled. A low is then generated on line 1000 to reset flip-flop 992 via gate 996. Consequently, the signal on line 962 goes low to deenergize solenoid 34 and close the throttle 30. At this time, the engine commences running at low idle speed with no load or, in other words, the low idle interval 1-2 of the first cycle has started. This transition from warm-up to low idle is shown by line 0'-1 of curve 1.

When flip-flop 992 was set by the signal on line 1004, flip-flop 1010 also was set. After 900 seconds or 15 minutes from the start of the warm-up interval 0-0', the signal on line 188J goes high. Gate 1012 will be enabled to reset flip-flop 1010 whereby the signal on line 1016 goes low to trigger multivibrator 1018. Multivibrator 1018 then will produce a low on line 132 which, as can be seen from FIG. 4, triggers multivibrator 120 to generate pulses on lines 152, 154, 156 and 158. Flip-flop 1020 also will be set to enable gate 1024 to generate the runcommand signal on line 256.

The significance of the 900 seconds mentioned above is that for 600 seconds the engine will be running through the warm-up interval 0-0' and then for about 300 seconds the engine will be running through the first idle interval 1-2 of the three cycles in this example. (The idle interval 1-2 for the remaining two cycles in the example will be controlled by the 315 seconds set with thumbwheel switch 58). At the end of this first idle interval 1-2 of about 300 seconds, when the multivibrator 1018 and multivibrator 120 are triggered, the pulse on line 156 which is generated sets flip-flop A to commence the first acceleration interval 2-3 of the first cycle.

After the engine is operated through three cycles, this is the end of test. At this time, the signal on line 148 will go high and the signal on line 149 will go low to reset flip-flop 1010 and reset flip-flop 1020, respectively.

FIG. 24—CYCLE COUNTER AND DISPLAY

Figure 24:
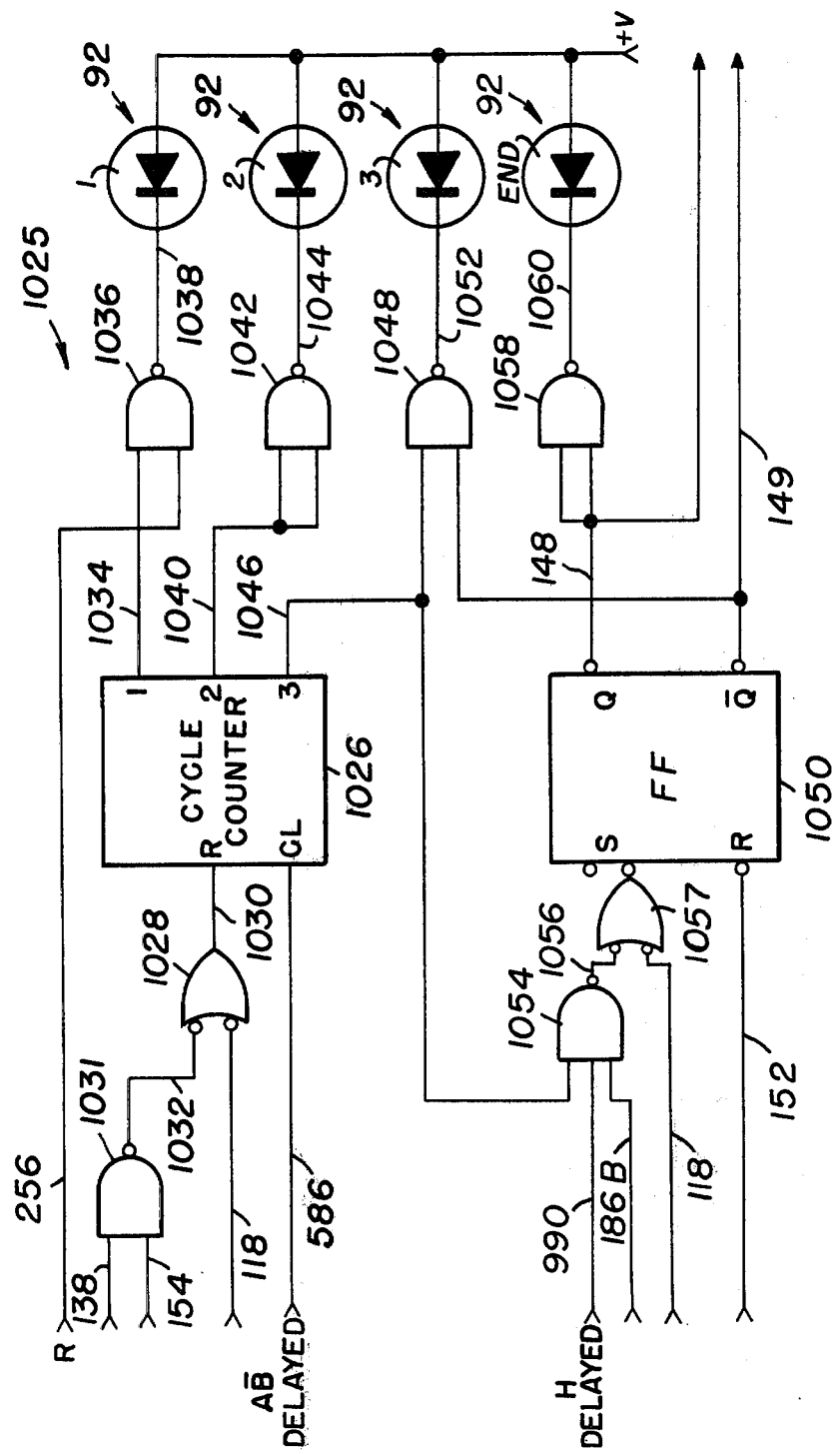
FIG. 24 illustrates, schematically, a circuit of the controller for counting and displaying cycles of engine operation.

FIG. 24 illustrates a circuit 1025 of controller 10 which is used to count the three cycles of the EPA test procedure or cycles-only procedure and energize the lights 92 shown on the console 52.

A counter 1026, which counts the three cycles, has a reset input connected to the output of an OR gate 1028 over a line 1030. Gate 1028 has one input connected to the line 118 and another input connected to the output of a NAND gate 1031 over a line 1032. Gate 1031 has one input connected to the line 138 and another input connected to the line 154. Counter 1026 is clocked with the signal on line 586 from FIG. 20, which is the interval signal AB delayed by 1 second.

Counter 1026 has a "1" count output connected over a line 1034 as one input to a NAND gate 1036. The other input of gate 1036 is the runcommand signal R on line 256. A "No. 1" light emitting diode (LED) 92 is coupled to the output of gate 1036 over a line 1038.

Counter 1026 has a "2" count output connected over a line 1040 as the input to an inverter 1042. A "No. 2" LED 92 is connected to the output of gate 1042 over a line 1044.

Counter 1026 has a "3" count output connected over a line 1046 as one input to a NAND gate 1048. The other input to gate 1048 is an output $\overline{Q}$ from an end-of-test flip-flop 1050 over the line 149. A "No. 3" LED 92 is connected to the output of gate 1048 over a line 1052.

Flip-flop 1050 is reset by the signal on line 152. Flip-flop 1050 is set by the signal on line 118 or the output of a NAND gate 1054 over a line 1056 through a NOR gate 1057. Gate 1054 has one input connected to line 1046, another input connected to line 990 from FIG. 22, which is the signal H delayed by 33 milliseconds, and a third input connected to line 186B. An inverter 1058 is coupled to the output Q of flip-flop 1050 on line 148 and has its output connected over a line 1060 to an end-of-test LED 92.

FIG. 24—CIRCUIT OPERATION

As already noted, the circuit 1025 of FIG. 24 is used to count and provide a display of the three cycles. When the power switch 94 is turned on, the reset pulse on line 118 is generated and counter 1026 is thereby reset via gate 1028. Then, when the start button 96 is depressed, the signals on line 138 and line 154 will go high to enable gate 1031 and again reset counter 1026 should this have been needed.

After one second into the first acceleration interval 2-3 of cycle No. 1, the delayed signal $A\overline{B}$ on line 586 will go high as described in FIG. 20. Counter 1026 will be clocked to a count of "1" to produce a high on line 1034 as one input to gate 1036. At this time the run-command signal R on line 256 will be high as described in FIG. 23, so that gate 1036 will be enabled and the No. 1 LED 92 shown on console 52 will be lit.

After one second into the first acceleration interval 2-3 of cycle No. 2, the signal on line 586 again will go high. Counter 1026 will be clocked to a count of "2" whereby the signal on line 1034 will be low and the signal on line 1040 high. The gate 1036 will be disabled and inverter 1042 will invert this high so that the No. 1 LED 92 will go off and the No. 2 LED 92 will be lit.

After one second into the first acceleration interval 2-3 for the No. 3 cycle, the signal on line 586 will again go high. Counter 1026 will be clocked to a count of "3" so that the signal on line 1040 will go low to deenergize the No. 2 LED 92. Gate 1048 will be enabled at this time by the high on line 1046 and the high on line 149 from the output $\overline{Q}$ of flip-flop 1050 which was reset when line 152 went low at power up. Consequently, the No. 3 LED 92 will be lit.

At the end of the lug interval 7-8 of the third cycle, or in other words at the end of the EPA test procedure, the signal on line 1046 is high. At this time flip-flop H becomes set and the signal on line 990 pulses high every 33 milliseconds as described in FIG. 22. Ten seconds later, the signal on line 186B goes high so that at this time gate 1054 is enabled. Flip-flop 1050 is thereby set to provide a high on line 148 and a low on line 149. The high on line 148 is inverted by inverter 1058 and the low on line 149 disables gate 1048. Consequently, the No. 3 LED 92 is deenergized and the end-of-test LED 92 is lit, indicating the end of the test.

FIG. 25—SPEED CONTROLLER FOR CHART RECORDER

Figure 25:
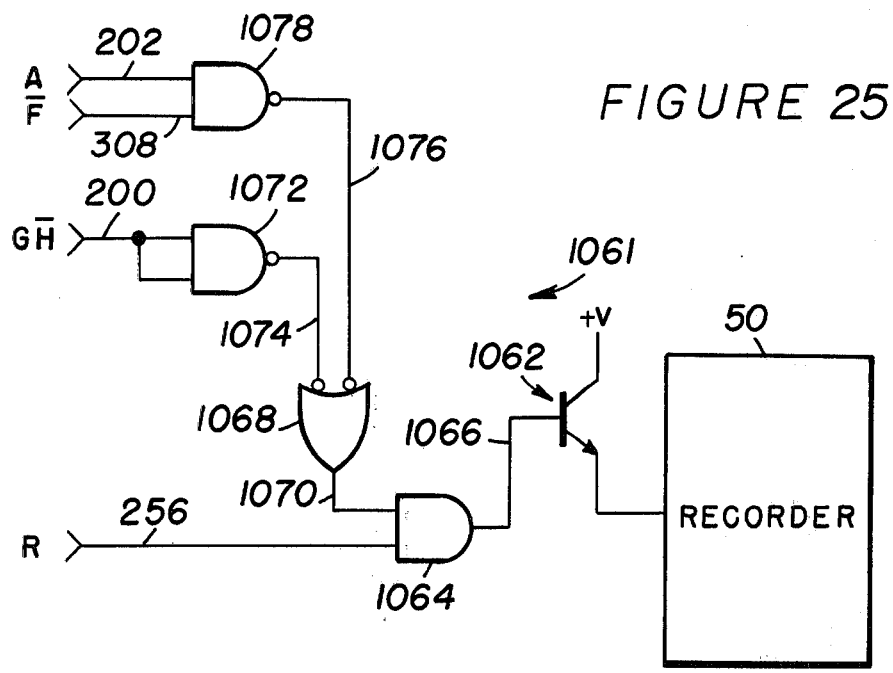
FIG. 25 is a schematic illustration of a chart speed control circuit of the controller for controlling the speed of chart paper of a chart recorder and FIG. 26 is a schematic drawing of a frequency conversion circuit of the controller.

FIG. 25 illustrates a circuit 1061 which is used to control the speed of a conventional chart recorder 50 as specified by the EPA test conditions. Essentially, recorder 50 is required to have two speeds to record certain information, the speed being dependent upon the particular interval during which the engine is being controlled.

A transistor 1062, when turned on, energizes a pair of solenoids (not shown) in the recorder 50 to control the gear ratio of the chart recorder 50 to produce one speed. When turned off, transistor 1062 deenergizes these solenoids to change the gear ratio to run the recorder 50 at the other speed. An AND gate 1064 has its output connected at the base of transistor 1062 over a line 1066. One input to the gate 1064 is the run-command signal R on line 256. The other input to gate 1064 is the output of an OR gate 1068 on a line 1070.

Gate 1068 has one input connected to the output of an inverter 1072 over a line 1074 and another input connected via a line 1076 to the output of a NAND gate 1078. Gate 1072 has its input connected to line 200 which carries the lug interval signal $G\overline{H}$. Gate 1078 has one input connected to line 202 carrying the signal A from flip-flop A and another input connected to line 308 carrying the signal $\overline{F}$ from flip-flop F.

FIG. 25—CIRCUIT OPERATION

During an EPA test run, the command signal R on line 256 will be high as one input to gate 1064. Then, at the start of the first acceleration interval 2-3, flip-flop A will be set to produce a high on line 202 and flip-flop F will remain reset until the start of the stabilization interval 6-7 to produce a high on line 308. Gate 1078 will thus be enabled and qualify gate 1068 to provide a high on line 1070. Gate 1064 now will be enabled to turn on transistor 1062 to run the recorder 50 at one speed from the first acceleration interval 2-3 through the third acceleration interval 5-6.

At the start of the stabilization interval 6-7, flip-flop F is set, whereby the signal on line 308 goes low. Consequently, gate 1078 is disabled as are gates 1068 and 1064. Transistor 1062 is then turned off to shift the recorder 50 to the other speed for the interval 6-7. Then, at the start of the lug interval 7-8, the interval signal GH on line 200 goes high and is inverted by inverter 1072 to enable gate 1068. Consequently, gate 1064 again turns on transistor 1062 to operate recorder 50 at the one speed for interval 7-8.

FIG. 26—FREQUENCY CONVERSION CIRCUIT

Figure 26:
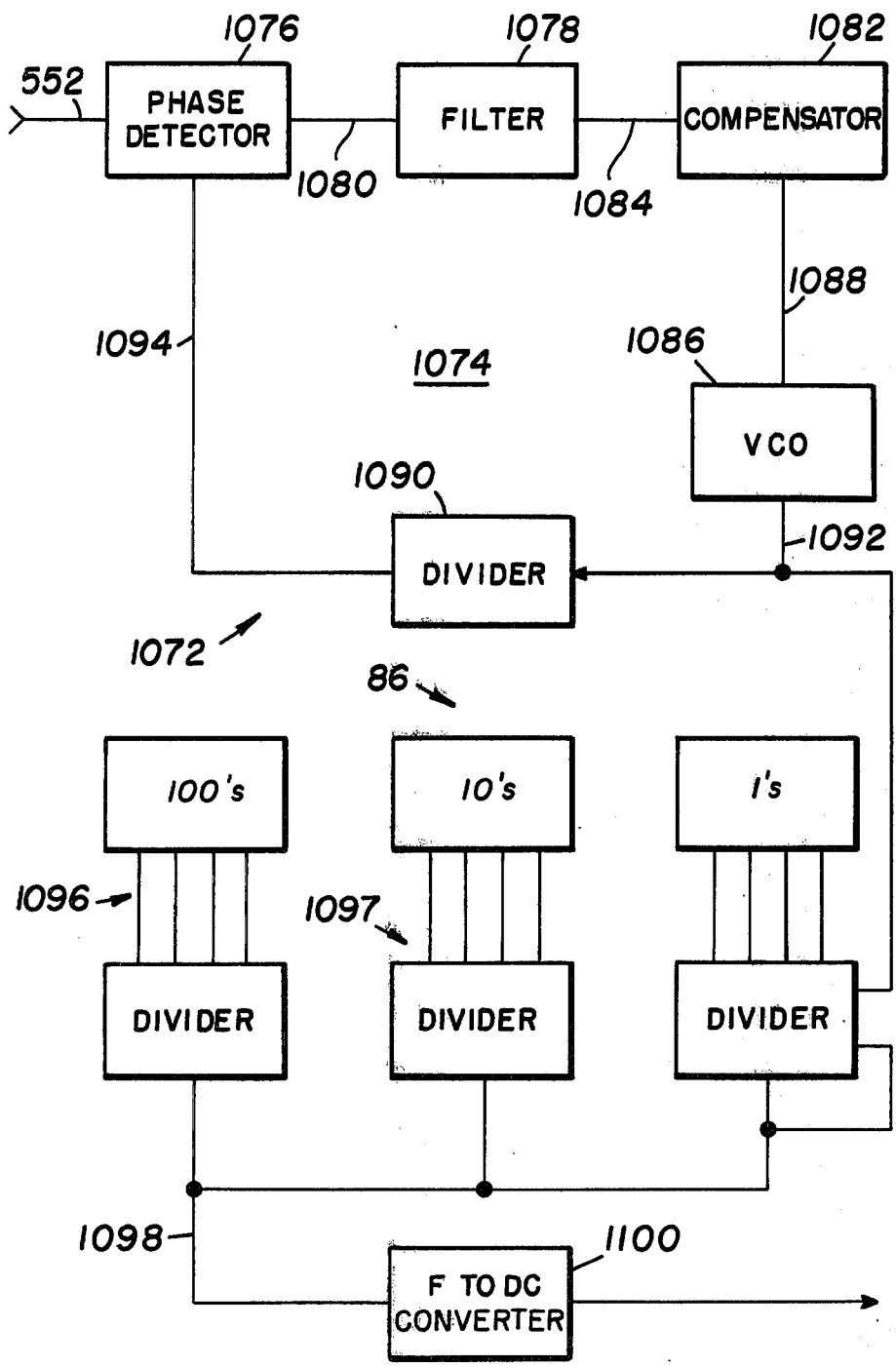

FIG. 26 shows a circuit 1072 for converting one frequency signal to another frequency signal. Circuit 1072 includes a phase locked loop 1074 having a phase detector 1076, a filter 1078 coupled to the output of detector 1076 over a line 1080, a loop compensator 1082 coupled to the output of filter 1078 over a line 1084, a voltage controlled oscillator 1086 coupled to compensator 1082 over a line 1088, and a divider 1090 coupled to the output of the oscillator 1086 over a line 1092. The phase detector 1076 has two inputs, one being the frequency signal on line 552 from FIG. 14 and the other being the divided frequency signal on a line 1094 from divider 1090.

Circuit 1072 also includes a divider shown generally at 1096 which divides the frequency signal on line 1092 from the oscillator 1086. The divider 1096 constitutes a counter shown generally at 1097, connected in cascade, which is preset with a count determined by the setting of the thumbwheel switch 86 which is also shown on console 52 of FIG. 3. The output of counter 1097 is a frequency signal on a line 1098 that is applied to a frequency-to-DC converter 1100. The frequency signal on line 1098 is the converted signal of the frequency signal on line 552 leading to the phase detector 1076 and is proportional to actual engine speed.

FIG. 26—Circuit Operation

In the present example, the wheel 12 has 60 teeth and, therefore, thumbwheel switch 86 is set to a value of 60. Consequently, counter 1097 will be set to count down from 60 the frequency signal on line 1092. Also, in this example, the voltage-controlled oscillator 1086 will multiply the input signal on line 552 by 60 and the divider 1090 will divide the multiplied signal by 60.

In operation, the phase detector 1076 will receive the frequency signal on line 552 and the frequency signal on line 1094 to provide a voltage signal on line 1080 that is proportional to the difference in phase between these two signals. The filter 1078 and compensator 1082 filter and compensate this voltage signal on line 1080 for conventional phase lock loop purposes. The oscillator 1086 then provides a multiplied frequency signal on line 1092 that is proportional to the phase difference between the signals on lines 552 and 1094. The divider 1090 divides this signal on line 1092 by 60 to provide the frequency signal on line 1094. Consequently, when phase lock occurs, the signals on lines 552 and 1094 will be equal in frequency.

The multiplied frequency signal on line 1092 is divided by the divider 1096. In the example, the multiplied signal on line 1092 will be divided by 60 due to the setting of thumbwheel switch 86. The output on line 1098 will then be a frequency signal proportional to actual engine speed. This frequency signal can be converted by converter 1100 to provide a voltage signal that, for example, can be fed to the chart recorder 50 to print on the chart paper the actual engine speed. This print should coincide with the curve 1 for an EPA test procedure.

It can be seen that the overall function of the circuit 1072 is to multiply the input signal on line 552 by 60 to provide the multiplied frequency signal on line 1092 and then to divide this multiplied signal by the number of teeth on wheel 12. If, for example, the wheel had only 10 teeth, then thumbwheel switch 86 would be set to 10. The result is that the output on line 1098 will be a frequency signal corresponding to engine speed as if the wheel 12 did have 60 teeth. This means that the actual speed of the engine can be determined directly by counting the frequency signal on line 1098 for one second.

Industrial Applicability

As already mentioned, the controller 10 can be programmed and used to control automatically a member through a course specified by one of a plurality of curves. The present invention was specifically designed to operate an engine through an EPA test procedure in accordance with a predetermined sequence as given by the speed curve shown in FIG. 1. The control of the engine, from initial set up of the controller 10 to the last interval of an EPA test run, will now be described.

I. INITIAL SET-UP

The initial set-up of controller 10 is to be performed prior to engine hook-up. That is, the controller 10 need not be coupled to any of the external components such as the magnetic pick-up 14 and motor 18 shown in FIG. 2.

A. Second Acceleration, Third Acceleration & Lug Intervals

The interval periods for the second acceleration interval 3-4, third acceleration interval 5-6 and lug interval 7-8 are set on the console 52 with the respective thumbwheel switches 62, 72 and 82. In the example, switch 62 is set to five seconds, switch 72 to ten seconds, and switch 82 to thirty-five seconds. The starting point or speed for each of these three intervals is also preset by the appropriate thumbwheel switches 60, 70 and 54, respectively. Switch 60 is set to 850 rpm corresponding to point 3 on the curve 1 at the commencement of the second acceleration interval 3-4. Switch 70 is set to 1400 rpm corresponding to point 5 at the commencement of the third acceleration interval 5-6. Switch 54 is set to 2100 rpm which is the speed occurring at point 7 for the commencement of the lug interval 7-8. The end points of the intervals 3-4, 5-6 and 7-8 are dependent upon the acceleration rates for these intervals, which rates are controlled by the terminal rpm dials 68, 78 and 84.

Initial set-up for the second acceleration interval 3-4 continues in the following manner. The dial 88 is turned to the second acceleration position to provide a high on line 236 at power up. The power switch 94 is then turned on to generate the pulses on line 110, line 116 and line 118. Multivibrators 742 and 750 of FIG. 18 are reset by the pulse on line 110. Flip-flop 142 of FIG. 4 is reset by the pulse on line 116 in anticipation of pressing the start button 96. Also reset or set by the pulse on line 116 are the flip-flops A-G of FIG. 6, the throttle enable flip-flop 976 of FIG. 22 and the minimum flow flip-flop 868 of FIG. 20. The pulse on line 118 resets the cycle counter 1026 and sets the end-of-test flip-flop 1050 of FIG. 24, and generates the rpm counter reset pulse on line 430, as shown in FIG. 10A. The latter resets counters 426-426C shown in FIGS. 7-10.

Then, the start button 96 is depressed so that the pulses on line 152, line 154, line 156, line 158 and line 160 of FIG. 4 are generated, as well as the pulse on line 138. The pulse on line 152 sets the flip-flop 142 of FIG. 4, resets flip-flop H and generates the reset pulse on line 178 of FIG. 6, resets the end-of-test flip-flop 1050 of FIG. 24, and enables gate 448 of FIG. 11. The reset pulse on line 178 resets clock 162 and counters 182, 184, 186 and 188 of FIG. 5. The resetting of flip-flop 1050 resets flip-flop 1020 of FIG. 23 so that the run-command signal R on line 256 is not generated.

Gate 448, being enabled as shown in FIG. 11, generates the pulse on line 412 to cause gates 404-404C of FIGS. 7-10 to select the 850 rpm data from switch 60 and produces the rpm preset pulse on line 432 to preset counters 426-426C with this data. The setting of flip-flop 142, which produces a high on line 160, resets flip-flop 486 of FIG. 11 in anticipation of a run only through one interval. Counter 472 of FIG. 11 is already enabled by the low on line 256, since the run-command signal R is not being generated.

The pulse on line 154 enables gate 1031 of FIG. 24 again to reset cycle counter 1026, to reset flip-flops A-G, to set the throttle enable flip-flop 976 of FIG. 22, and reset counter 472 of FIG. 11.

The pulse on line 156 sets flip-flop A. Simultaneously, the pulse on line 158 enables gate 230 of FIG. 6, whereby flip-flop B and flip-flop C are simultaneously set. Accordingly, the interval signal $C\overline{D}$ for the second acceleration interval 3-4 is generated on line 192. Oscillator 492 of FIG. 12 is then actuated to produce the clock pulses on line 434 to cause counters 426-426C to start counting from the 850 rpm preset count. Since the lug interval signal GH is not being generated at this time, the output of gate 438 of FIG. 7 will cause counters 426-426C to count up.

As the second acceleration interval 3-4 continues, the D/A converter 516 of FIG. 13 will be producing an increasing output voltage which is received by the tachometer 90 to display command engine speed. At 0.2 seconds into the inerval 3-4, counter 182 of FIG. 5 provides a high on line 182C to cause flip-flop 486 of FIG. 11 to be set and provide a high as one input to gate 480. Then, at the end of the interval 3-4, i.e., after five seconds, flip-flop D is set and the differential pulse on line 384 is generated to produce the reset pulse on line 178. Consequently, gate 480 is now enabled to clock counter 472 to the "1" count. The resulting low on line 474 from couner 472 disables gate 512 of FIG. 12 to inhibit the clock pulses on line 434. The high on line 150 from counter 472 resets flip-flop 142 and initializes clock 162. Thus, controller 10 is run through only the second acceleration interval 3-4.

At the end of the second acceleration interval 3-4, if the tachometer 90 is more than 100 rpm from 85% of rated speed, which should be the actual engine speed, then the terminal rpm dial 68 should be adjusted. This will adjust the frequency of the oscillaor 492 of FIG. 12 by adjusting the potentiometer 496. Then, the above run through interval 3-4 can be repeated until a terminal rpm of about 85% of command rated speed is achieved.

Initial set up for the third acceleration interval 5-6 is achieved in a similar manner. The dial 88 is placed in the third acceleration position to provide a high on line 238 when the power button 94 and start button 96 are depressed. The pulses generated by the circuit of FIG. 4 are again generated as already described. Flip-flop A through flip-flop E become simultaneously set due to the pulse on line 156 and the enabling of gate 226. Gate 454 of FIG. 11 is enabled by the dial 88 being in the third acceleration position and by the pulse on line 384 of FIG. 6 being produced by the setting of flip-flop D. A select pulse on line 420 of FIG. 11 is generated to cause select gates 416-416C to select the intermediate or 1400 rpm data from switch 70 and generate the preset pulse on line 432 to preset counters 426-426C with this data. Since the lug interval signal $G\overline{H}$ is not being generated at this time, gate 438 of FIG. 7 places the counters 426-426C in the count up state.

The interval signal $E\overline{F}$ on line 196 for the third acceleration interval 5-6 activates oscillator 498 to produce the frequency pulses on line 434. Consequently, the D/A converter 516 of FIG. 13 generates an increasing output voltage which is again detected by tachometer 90 to display command engine speed.

At 0.2 seconds into the third acceleration interval 5-6, flip-flop 486 of FIG. 11 is set. At the end of this interval, gae 480 is enabled by the pulse on line 178 to clock counter 472 from the "0" count to the "1" count. The low on line 474 and high on line 150 perform the same functions already described for terminating further counting by counters 426-426C. Thus, controller 10 is run through only the third acceleration interval 5-6.

If the tachometer 90 is more than 100 rpm from 95% of rated speed at the end of the third acceleration interval 5-6, then dial 78 should be adjusted. This will vary the setting of potentiometer 502 and hence the frequency of oscillator 498. The sequence for running the controller 10 through the third acceleration interval 5-6 is repeated until a terminal rpm of about 95% of rated speed is achieved.

Initial set-up for the lug interval 7-8 occurs by turning dial 88 to the lug position, turning power switch 94 on and depressing start button 96. The pulses of FIG. 4 are generated as already described. Flip-flop A through flip-flop G become simultaneously set so that the interval signal GH is generated. Gate 468 of FIG. 11 is enabled by the low on line 238 due to the dial 88 not being in the third acceleration position and by the low on line 388 being generated when flip-flop F is set. Consequently, the select pulse on line 410 is generated to cause select gates 404-404C to select the rated rpm data from switch 54 and to generate the present pulse on line 432 to preset counters 426-426C with this data. At this time, the lug interval signal GH is high so that gate 438 of FIG. 7 places counters 426-426C in the count down mode. Also, signal GH actuates oscillator 504 of FIG. 12 to produce the clock pulses on line 434, whereby counters 426-426C count down from the preset rpm data. The D/A converter feeds the resulting analog voltages to tachometer 90.

At 0.2 seconds into lug interval 7-8, flip-flop 486 of FIG. 11 is set. At the end of this interval 7-8, the signal on line 178 goes high to enable gate 480 of FIG. 11. Counter 472 then goes from count "0" to count "1" to produce the low on line 474 and the high on line 150. This inhibits further counting by counters 426-426C as already described at the termination of interval 7-8. The controller 10 is run through only the lug interval 7-8.

At the end of interval 7-8, if the tachometer 90 is not within 100 rpm of peak torque speed in accordance with point 8 of the curve in FIG. 1, the terminal dial 84 should be adjusted. This will adjust the potentiometer 508 of oscillator 504 to change its frequency. The sequence for the lug interval 7-8 then should be repeated until a terminal rpm of about peak torque speed is achieved.

B. Stabilization and Low Idle Time

Initial set-up for the stabilization interval 6-7 and low idle interval 1-2 is accomplished merely by setting in the appropriate interval duration with thumbwheel switches 80 and 58, respectively. In the present example, a time of 52 seconds is set for the stabilization interval 6-7 and a time of 315 seconds set for the low idle interval 1-2. The latter actually is for the second and third cycles of an EPA test run, as already indicated.

II. FINAL SET-UP

A. Rated Speed Adjustment

Final set-up of the controller 10 is performed after the engine to be tested is running for awhile and with the controller 10 coupled to the external components as shown in FIG. 2. To determine if the engine is running at rated speed, as it should, for example, during the warm-up interval 0-0′, the dial 88 is put in the EPA test position. Also, the correct number of gear teeth, i.e., 60 in the present example, is selected with the switch 86. Then the power button 94 and start button 96 are turned on.

In a manner to be described below for a full EPA test run, the controller 10 immediately will generate a command signal of 2100 rpm corresponding to rated speed of the engine as set with the thumbwheel switch 54. Also, the throttle 30 will be fully open. If the engine is not then running at rated speed, as can be determined by a conventional actual-engine-speed read-out device (not shown), then the engine speed can be adjusted by turning the rated speed fine adjustment dial 56 on console 52. This will change the setting of potentiometer 566 of FIG. 14 so that the output voltage of amplifier 570, which is proportional to actual engine speed, will result in the engine being run at rated speed. When this fine adjustment is accomplished the stop button 98 can be depressed to cease engine control.

B. First Acceleration Adjustment

As already mentioned, the first acceleration interval 2-3 begins at idle speed and should advance 200 rpm within three seconds. The rate of advance is controlled by the coupling of cable 28 to a particular eyelet 26 on the lever 22. Also, the slack of cable 28 should not be so great that it takes too much time after energization of motor 18 before the throttle 30 is moved to accelerate the engine.

The dial 88 is placed in the cycles-only position. Then the power switch 94 and start switch 96 are turned on.

As can be seen in FIG. 23, the positioning of dial 88 will produce a high on line 636 to generate the run-command signal R on line 256. This run-command signal R will be supplied as one input to gate 924 of the motor control circuit of FIG. 21. From FIG. 6, it will be seen that upon pressing the start button 96, only flip-flop A becomes set. Therefore, at this time, the signal on line 202 from flip-flop A and the signal on line 260 from flip-flop C are high to enable gate 934 of FIG. 21. Consequently, gate 924 is enabled to turn on transistor 920 and energize motor winding 902 to slowly open the throttle 30.

Also, the run command signal R on line 256, as can be seen from FIG. 11, will enable gate 452 whereby, with the start button 96 having been depressed, gate 448 will be enabled. Consequently, the select pulse on line 412 will be generated to preset counters 426-426C with the low idle plus 200 rpm data, i.e., 850 rpm, from thumbwheel switch 60, as already described. Note that counters 426-426C are not clocked for the first acceleration interval 2-3.

During the first acceleration interval 2-3, the circuit 536 of FIG. 14 will be providing a high on line 250 from the output of comparator 606. This is because the command speed signal on line 518 will be proportional to 850 rpm while the actual engine speed signal on line 572 will not have reached a value proportional to that speed. Then, when the actual engine speed reaches 850 rpm, the signal on line 250 will go low, whereby gate 246 of FIG. 6 will be enabled. Therefore, flip-flops B and C will be set corresponding to the end of the first acceleration interval 2-3. If this acceleration over interval 2-3 does not occur within three seconds, or if too much time elapses before the acceleration begins, then the rate of advance or cable slack can be adjusted as discussed above.

C. Second Acceleration Adjustment

After the engine has been run through the first acceleration interval 2-3 with the dial 88 in the cycles-only position, as described above, the engine will be controlled by the controller 10 through the second acceleration interval 3-4. From the chart speed trace of actual engine speed provided by the recorder 50, it can be determined if the second acceleration start point 3 of curve 1 is within about 50 rpm of the low idle plus 200 rpm speed. If it is not within this 50 rpm tolerance, then the thumbwheel switch 60 should be adjusted somewhat until the point 3 is within 50 rpm.

If the trace shows the end point 4 of the second acceleration interval 3-4 to be off from the 85% value of rated speed, then terminal rpm dial 68 should be adjusted until the acceleration ends at the correct speed.

As already noted in connection with FIG. 18, at the commencement of engine acceleration, the second acceleration interval 3-4 should not be too steep. If, at the start of interval 3-4, the throttle 30 is opened too quickly in relation to building up the current in the coil 40, then the engine will accelerate too rapidly. On the other hand, if the current builds up too much in the coil 40 prior to the throttle 30 being opened, then there could be a reduction in the engine speed at the start of interval 3-4.

After running the engine through the second acceleration interval 3-4, the speed trace can be examined to determine if the initial acceleration is correct. If not, dials 64 and 66 should be adjusted as already described to produce the proper throttle delay and unconditional coil energization.

D. Closed-Throttle-Pull-Down And Third Acceleration Adjustment

As the engine is being run through the closed-throttle-pull-down interval 4-5, the dynamometer 16 will provide a reading of actual load on the engine. This load should be the load required for the third acceleration interval 5-6. If the actual load is not proper, the dial 76 should be adjusted. This sets the potentiometer 716 of FIG. 17 to produce the command load signal needed to apply the correct actual load.

As with the beginning of the second acceleration interval 3-4, the acceleration for interval 5-6 also might begin too steeply or not steeply enough if the throttle 30 is not opened timely in relation to energization of coil 40. At the start of the third acceleration interval 5-6, there is current in the field coil 40 due to the load set in interval 4-5. Despite this current, if the throttle 30 is opened too quickly, the engine will be accelerated too rapidly. If there is too much of a delay in the opening of the throttle 30, the load on the engine caused by the coil 40 will retard acceleration of the engine. The correct acceleration can be accomplished by adjusting the dial 74 and hence the potentiometer 530 of FIG. 13, as already described.

III. EPA TEST RUN

The dial 88 is placed in the EPA test position and then the power switch 94 and start button 96 are depressed. The pulses on lines 110, 116, 118, 152, 154, 156, 158, 160 and 138 of FIG. 4 are generated as already described.

A. Warm-Up Interval 0-0'

As shown in FIG. 23, with the dial 88 in the EPA test position, the signal on line 634 will be high as will the signal on line 138 when the start button 96 is depressed. Gate 1002 then sets flip-flop 992 and flip-flop 1010. The output Q of flip-flop 992 on line 962 enables gate 958 and thus gate 954 of FIG. 22. Transistor 950 is then turned on to energize relay 944 which energizes throttle solenoid 34 to fully open the throttle 30.

The output Q from flip-flop 992 on line 462 enables gate 460 of FIG. 11 to produce the select pulse on line 410 and the preset pulse on line 432. Consequently, counters 426-426C of FIGS. 7-10 are preset with a count of 2100 rpm corresponding to rated speed. This count is converted by the D/A converter 516 of FIG. 13 to produce the command voltage signal on line 518 that is fed as one input to the speed comparator 596 of FIG. 14. The other input to comparator 596 is the signal on line 598 proportional to actual engine speed. Until the engine reaches the command speed of 2100 rpm, the signal on line 604 will be high and fed to gate 668 of FIG. 16.

As shown in FIG. 16, since line 604 is high, the control pulses on line 620 will be low. Thus, the field coil 40 will be deenergized to permit the engine speed to rise to rated speed.

With reference again to FIG. 23, gate 1006 will be enabled for 600 seconds, with the low on line 188G. Line 462 is low, as already indicated. Therefore, line 682 will be high for the entire warm-up interval 0-0' of 600 seconds. When the engine speed reaches 2100 rpm, line 604 will oscillate between high and low as the engine speed oscillates about rated speed. Consequently, gate 678 of FIG. 16 will be enabled and disabled, whereby coil 40 will be energized and deenergized to maintain the engine at rated speed for interval 0-0'.

The high on line 682, as shown in FIG. 20, also enables gate 864 to turn on transistor 862 and provide for minimum water flow. The low on line 844 from the output of gate 1006 of FIG. 23 also enables gate 840 to turn on transistor 838 and provide simultaneously for set flow of water.

As shown in FIG. 25, gate 1064 is not enabled because the run-command signal R on line 256 is not yet generated. Therefore, transistor 1062 is off and the recorder 50 is being run at one of its two speeds.

B. Low Idle Interval 1-2—First Cycle

At 600 seconds, line 188G shown in FIG. 23 goes high to disable gate 1006. This results in line 682 going low to disable gate 678 of FIG. 16 and turn off transistor 862 of FIG. 20. Also, line 844 goes high to turn off transistor 838 of FIG. 20. Therefore, coil 40 is deenergized and dynamomter water flow ceases. The engine is thus unloaded at this time.

Two seconds later, line 184C of FIG. 23 also goes high to enable gate 998 and thereby reset flip-flop 992. The output Q on line 962 goes low to disable gate 958 of FIG. 22, whereby transistor 950 is turned off to fully close the throttle 30. Therefore, at this time, the engine begins running at low idle speed for the low idle interval 1-2 of the first cycle.

The run-command signal R on line 256 still has not yet been generated so that gate 1064 of FIG. 25 is disabled and the recorder 50 is being run at the one speed.

C. First Acceleration Interval 2-3

After 900 seconds from the start of interval 0-0', or in other words, after about 300 seconds of interval 1-2, line 188J of FIG. 23 goes high. Gate 1012 becomes enabled to reset flip-flop 1010. The resulting negative-going edge on line 1016 from flip-flop 1010 triggers multivibrator 1018. Line 132 from multivibrator 1018 then sets flip-flop 1020 of FIG. 23 and enables gate 130 of FIG. 4. With flip-flop 1020 of FIG. 23 now set, the gate 1024 is enabled to generate the run-command signal R on line 256 to commence controlling the engine through the remaining intervals. Also, by enabling gate 130, the pulses on lines 152, 154, 156, 158 and 160 are again generated.

When the pulse on line 156 is again generated, flip-flop A of FIG. 6 becomes set. Therefore, the interval signal $A\overline{B}$ on line 190 for the first acceleration interval 2-3 is generated. Gate 672 of FIG. 16 is thereby enabled by the signal on line 190 so that gate 666 is disabled and the field coil 40 not energized for the duration of interval 2-3.

Also at the commencement of the first acceleration interval 2-3, gate 924 of FIG. 21 is enabled. Therefore, transistor 920 is turned on to energize the motor 18 to commence slowly opening the throttle 30.

Also at the commencement of the first acceleration interval 2-3 when the run-command signal R is generated, gate 448 of FIG. 11 is enabled. Therefore, the select pulse on line 412 and the preset pulse on line 432 are generated to preset counters 426-426C of FIGS. 7-10 with a count of 850 rpm corresponding to the end of the first acceleration interval 2-3.

As shown in FIG. 25, at the commencement of interval 2-3, gate 1078 and hence gate 1064 are enabled to turn on transistor 1062. Therefore, recorder 50 is shifted to its other speed. As described in FIG. 20, the interval signal $A\overline{B}$ on line 190 is delayed by one second with the gates 890, 894 and 888. When the one second delay signal $A\overline{B}$ is generated on line 586, counter 1026 of FIG. 24 is clocked to enable gate 1036. The No. 1 cycle light 92 is thus lit. The delayed signal $A\overline{B}$ on line 586 is also being applied as an offset voltage in FIG. 14.

D. Second Acceleration Interval 3-4

As the engine accelerates towards 850 rpm, the comparator 606 of FIG. 14 will be comparing actual engine speed represented by the signal on line 572 with the command speed signal on line 518 which is taken from the D/A converter 516 and is proportional to 850 rpm data preset in the counters 426–426C. When the engine reaches 850 rpm in about 3 seconds, the output of comparator 606 on line 250 will go low to enable gate 246 of FIG. 6. Note that the line 184A into gate 246 is already low at this time. Therefore, gate 242 of FIG. 6 is enabled to set simultaneously flip-flop B and flip-flop C. This terminates the first acceleration interval 2-3 and commences the second acceleration interval 3-4.

At the start of interval 3-4, the differential pulse on line 382 of FIG. 6 is generated to produce the reset pulse on line 178 for resetting clock 162 and counters 182, 184, 186 and 188 of FIG. 5. Also, gate 940 of FIG. 21 becomes enabled since gate 934 is disabled by the low on line 260 when flip-flop C is set. Therefore, transistor 936 is turned on and transistor 920 turned off so that the motor 18 is energized to return the throttle 30 to the closed position.

However, with the circuit 943 of FIG. 22, solenoid 34 is energized to quickly open throttle 30 in the following manner. Flip-flop 976 was previously set by the output of gate 980 when the pulse on line 154 was automatically generated after the warm-up interval 0-0'. The interval signal $C\overline{D}$ on line 192 is generated at the start of the second acceleration interval 3-4, so that gate 974 is enabled, as are gate 970 and 966. Therefore, gate 958 is enabled as is gate 954 to turn on transistor 950. Of course, as already described, gate 954 is enabled after a delay provided by the pulse on line 746 which is obtained from the output of multivibrator 742 of FIG. 18. Multivibrator 742 is triggered by the signal on line 268 which is the output of gate 266 of FIG. 6 used to set flip-flop C. The turning on of transistor 950 thereby energizes solenoid 34 to fully open throttle 30. Also, with the output on line 684 of FIG. 18 being low at the start of interval 3-4, gate 676 of FIG. 16 will be enabled to unconditionally energize field coil 40 for a short period.

When the interval signal $C\overline{D}$ is generated on line 192, oscillator 492 of FIG. 12 is actuated to generate the clock pulses on line 434. Counters 426–426C are thereby clocked to count up from the preset count of 850. Therefore, the D/A converter 516 of FIG. 13 produces the output voltages on line 518 corresponding to the command speeds to accelerate the engine.

Also at the start of the interval 3-4, gate 882 of FIG. 20 will be enabled. Consequently, with the switch 880 in the position shown, flip-flop 868 becomes set to turn on transistor 862 and provide for minimum water flow.

As the engine speed increases during the second acceleration interval 3-4, the comparator 596 of FIG. 14 compares the actual engine speed signal on line 598 with the command speed signal on line 518. At this time, as can be seen from FIG. 14, the signal on line 598 has an offset due to the offset voltage generated on line 580. The latter is obtained from FIG. 15 since FET 610 is gated on by the interval signal $C\overline{D}$ on line 192.

As a result of the comparison by comparator 596, the signal on line 604 of FIG. 14 will go high and low as the engine accelerates about the command data. From FIG. 16 it will then be seen that gate 666 is enabled and disabled in dependence on the signal on line 604 to energize and deenergize the field coil 40 during the second acceleration interval 3-4.

E. Closed-Throttle-Pull-Down Interval 4-5

After five seconds into the interval 3-4 as counted by counters 182, 184 and 186, gate 282 of FIG. 6 will be enabled to set flip-flop D for the start of the closed-throttle-pull-down interval 4-5.

When flip-flop D is set, the differential pulse on line 384 of FIG. 6 is generated to produce the reset pulse on line 178 to reset clock 162 and reset counters 182, 184, 186 and 188. Also, the pulse on line 384 is fed to gate 454 of FIG. 11 which is enabled at this time to produce the select pulse on line 420 and preset pulse on line 432. Consequently, at the start of the closed-throttle-pull-down interval 4-5, counters 426–426C are preset with the intermediate speed data of 1400 rpm.

Since the interval signal $C\overline{D}$ on line 192 for the second acceleration interval is not generated at this time, gate 970 of FIG. 22 is disabled. Therefore, gates 966, 958 and 954 will be disabled to turn off transistor 950 and deenergize solenoid 34. The throttle 30 will then move to a fully closed position, whereby engine speed will be reduced.

During the interval 4-5, the controller 10 is closed loop on load rather than on speed so as to apply the load required for this interval 4-5 and for the acceleration of the following third acceleration interval 5-6. This is accomplished by the interval signal $D\overline{E}$ on line 194 enabling gate 672 of FIG. 16 to disable gate 666. At the same time, the signal $D\overline{E}$ on line 194 enables gate 738 of FIG. 17 whose other input is the load information on line 740. The load comparator output signal on line 664 from FIG. 17 is thus fed to gate 660 of FIG. 16. This signal on line 664 thus controls or causes energization of the coil 40 to produce the required load on the engine.

As the engine speed is reduced during the interval 4-5 by the closing of throttle 30 and application of the load, the comparator 606 of FIG. 14 will be comparing the actual engine speed signal on line 572 with the command speed signal on line 518. At this time, the D/A converter 516 is producing the output voltage on line 518 that is offset with the voltage from potentiometer 530. This is as a result of gate 522 of FIG. 13 being enabled by the interval signal $D\overline{E}$ on line 194. The other input to gate 522 on line 526 has been high because the dial 88 is not in the second acceleration position so that line 236 is low.

F. Third Acceleration Interval 5-6

When the actual engine speed is at the intermediate speed of 1400 rpm, comparator 606 will provide a high on line 250 to enable gate 294 of FIG. 6. At this time, flip-flop 298 will have been set since gate 302 will have been enabled 33 milliseconds into the interval 4-5 by the signal on line 167 from clock 162. Therefore, flip-flop E will become set to commence the third acceleration interval 5-6.

When flip-flop E is set, the differential pulse on line 386 is generated to produce the rest pulse on line 178 and reset clock 162 and counters 182, 184, 186 and 188.

Also, when flip-flop E is set, the signal E on line 286 goes high to enable gate 974 of FIG. 22. Therefore, transistor 950 is turned on via gates 970, 966, 958 and 954. Throttle 30 is thereby opened fully to commence accelerating the engine, which acceleration occurs initially against the load that was set during the CTPD interval 4-5.

Figure 15:
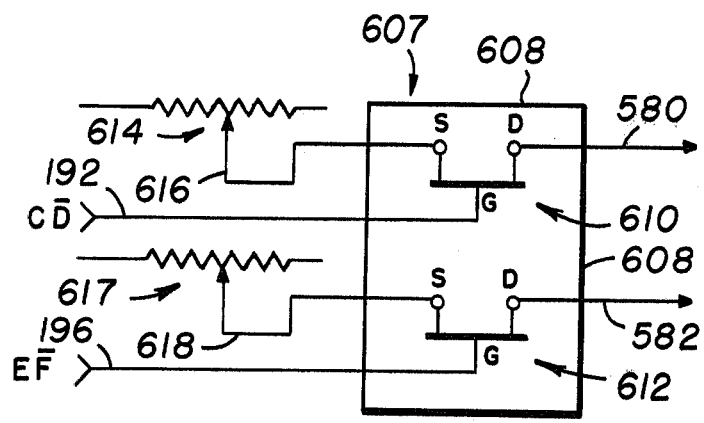
FIG. 15 is a general schematic diagram of a circuit of the controller for controlling engine acceleration for certain intervals.

The interval signal $\overline{EF}$, which is generated on line 196 when flip-flop E is set, activates oscillator 498 of FIG. 12 at the start of interval 5-6. Therefore, clock pulses are generated on line 434 which clock counters 426-426C of FIGS. 7-10 to count up from the intermediate speed of 1400 rpm. The D/A converter 516 of FIG. 13 then generates voltage signals on line 518 as command signals to comparator 596 of FIG. 14. The other input to comparator 596 is the actual engine speed signal on line 598 that has been offset by the voltage signal on line 582. As shown in FIG. 15, the offset voltage on line 582 is generated at the start of the interval 5-6 when the signal $\overline{EF}$ on line 196 gates on FET 612. Gate 666 of FIG. 16 will be gated on and off, due to the output of line 604 from comparator 596 as the engine accelerates about the command speed, to energize and deenergize coil 40.

At the start of interval 5-6, when flip-flop E becomes set, the signal E on line 286 goes high to enable gate 850 of FIG. 20. Therefore, gates 846 and 840 will be enabled to turn on transistor 838 and provide for set flow dynamometer cooling water.

G. Stabilization Interval 6-7

After ten seconds into the third acceleration interval 5-6, gate 314 of FIG. 6 is enabled. Therefore, flip-flop F is now set to commence the stabilization interval 6-7. When flip-flop F is set, the differential pulse on line 388 is generated to produce the reset pulse on line 178 and reset clock 162 and counters 182, 184, 186 and 188.

The pulse on line 388 also enables gate 468 of FIG. 11 at this time. The other input on line 238 to gate 468 is low because dial 88 is not in the third acceleration position. Therefore, the select pulse on line 410 and preset pulse on line 432 are generated. Counters 426-426C are thus preset to a count of 2100 corresponding to rated speed which should be the speed of the engine during interval 6-7.

The D/A converter 516 of FIG. 13 then produces an output voltage on line 518 proportional to rated speed, which voltage is supplied as one input to comparator 596 of FIG. 14. In a similar manner as already described, comparator 596 receives the actual engine speed voltage signal on line 598 to produce the control signal on line 604. The field coil 40 thus will be first deenergized for a short period at the start of interval 6-7 to increase the engine speed from 95% of rated speed to rated speed. Thereafter, coil 40 becomes energized and deenergized to maintain the engine speed at rated speed for interval 6-7.

At the start of interval 6-7, the signal $\overline{F}$ on line 308 goes low. Therefore, gate 1078 of FIG. 25 is disabled to disable gates 1068 and 1064 and turn off transistor 1062, whereby the speed of recorder 50 is changed.

H. Lug Interval 7-8

After 52 seconds, which is the end of the stabilization interval 6-7, gate 328 of FIG. 6 is enabled to set flip-flop G. The pulse on line 390 is generated to produce the reset pulse on line 178 to reset clock 162 and counters 182, 184, 186 and 188. The interval signal $\overline{GH}$ on line 200, as shown in FIG. 7, enables gate 438 to place counters 426-426C in the count down state. As shown in FIG. 12, the interval signal $\overline{GH}$ on line 200 also activates oscillator 504 to produce the clock pulses on line 534. Therefore, counters 426-426C count down from the preset count of 2100 rpm at the rate determined by oscillator 504.

Also at the start of interval 7-8, the signal $\overline{GG}$ on line 200, as shown in FIG. 25, causes gate 1064 to be enabled. Transistor 1062 is then again turned on to change again the speed of recorder 50. During the lug interval 7-8, comparator 596 of FIG. 14 compares the actual engine speed to the command speed from the D/A converter 516. The signal on line 604 of FIG. 14 is then used in FIG. 16 to control the gating on of gate 666 to energize and deenergize the field coil 40. With the throttle 30 still fully open, this energization and deenergization of coil 40 continues to lug the engine until the end of interval 7-8.

I. Second and Third Cycles

At the end of lug interval 7-8, which occurs after 35 seconds, the No. 1 cycle is completed and the No. 2 cycle is about to commence. Gate 334 of FIG. 6 is gated on to set flip-flop H. The differential pulse on line 392 is then generated to produce the reset pulse on line 178 to reset clock 162 and counters 182, 184, 186 and 188. The signal H on line 330 from flip-flop H is used in FIG. 16 to enable enable gate 672 and disable gate 666, thereby deenergizing field coil 40.

As shown in FIG. 22, the signal H on line 330 is high and every 33 milliseconds later the signal on line 167 is high. Consequently, at these times gate 988 is enabled to provide a high as one input to gate 986. At 5 seconds from the end of the lug interval 7-8, the signal on line 184F goes high so that gate 986 is enabled. Consequently, flip-flop 976 is reset to disable gate 970 and ultimately turn off transistor 950 which causes the throttle 30 to close.

As can be appreciated from the above, the coil 40 is deenergized immediately after the lug interval 7-8, but the throttle 30 is not closed until 5 seconds after the interval 7-8. The engine speed therefore will rapidly increase before decreasing to the low idle speed and this shown by the glitch in the curve 1 of FIG. 1 between point 8 and the following point 1.

With reference to FIG. 20, the signal H on line 330 enables gate 872 to reset the flip-flop 868. Transistor 862 is thereby turned off to shut the minimum flow of water. The signal $\overline{H}$ on line 332 from flip-flop H also disables gate 846, whereby transistor 838 is turned off. Consequently, the set flow of water also is turned off.

The engine is now being controlled for the low idle interval 1-2 of the No. 2 cycle shown in FIG. 1. At the end of this interval 1-2 gate 348 of FIG. 6 is gated on. This enables gate 346 via line 350 since the line 148 from the end-of-test flip-flop 1050 of FIG. 24 is low. Therefore, gate 340 is enabled to reset flip-flops A–G via gate 338 of FIG. 6. A tenth of a second later, gate 352 is enabled to produce the signal on line 126 to trigger multivibrator 120 of FIG. 4. As a result of this triggering of multivibrator 120, the pulses on lines 152, 154, 156, 158 and 160 will be generated in a manner already described. Therefore, flip-flop H will be reset followed by the setting, sequentially, of flip-flops A–H as already described to control the engine speed through intervals 2-3, 3-4, 4-5, 5-6, 6-7, and 7-8 for the second cycle, and interval 1-2 for the third cycle. Thereafter, intervals 2-3, 4-5, 5-6, 6-7 and 7-8 again will occur for the third cycle.

When the controller 10 is operating through the first acceleration interval 2-3 for the No. 2 cycle, the signal on line 586 of FIG. 20 will be generated. This is the signal $A\overline{B}$ delayed by one second. This signal is then used in FIG. 24 to clock counter 1026 to a count of 2. The No. 2 light 92 thereby will be lit to indicate the running of the No. 2 cycle.

During the interval 2-3 for the third cycle, the signal on line 586 again will be generated to clock counter 1026 to a count of 3. Therefore, the No. 3 light 92 will be lit to indicate this is the third cycle.

At the end of the lug interval 7-8 for the No. 3 cycle the flip-flop H, as already noted, becomes set. With reference to FIG. 24, at this time gate 1054 has a high from line 1046 and every 33 milliseconds later a high from line 990 of FIG. 22. Ten seconds after the end of this lug interval 7-8, the signal on line 186B goes high to enable gate 1054. Therefore, flip-flop 1050 is set to light the end-of-test light 92.

When flip-flop 1050 is set, this constitutes the end of the EPA test. The output Q on line 148 goes high to disable gate 346 of FIG. 6 to prevent resetting of flip-flops A–H. This high on line 148 also enables gate 1012 of FIG. 23 to reset flip-flop 1010, to enable gate 146 of FIG. 4 and thereby reset flip-flop 142, and to enable gate 176 to initialize clock 162. The low on line 149 from flip-flop 1050 resets flip-flop 1020 of FIG. 23 to prevent the run-command signal R on line 256 from being generated. Another EPA test can now be run by keeping dial 88 in the EPA test position and pressing start button 96.

IV. SUMMARY

With the controller 10, a highly skilled systems operator would not be required to carry out an EPA test procedure. Merely by pre-setting the various dials and switches on console 52 and then pressing the start button 96, the speed and loading of the engine can be automatically controlled in accordance with such test procedure. Thus, the disadvantages of manual control required with prior systems are eliminated.

Further, and with respect particularly to FIG. 19, the circuit 757 has several advantages. While the power supply is a 440 VAC, 3 phase supply this is rectified by SCR's 762, 764 and 766 to make available about 620 VDC across the coil 40. This high voltage is utilized to speed the response of the inherently slow dynamometer 16 and thereby meet the EPA test requirements. Also, the "free-wheeling" diode 790 is provided so that when increased field coil energization is not required, i.e., when SCR's 762, 764 and 766 are turned off, the field coil current will flow around the path including line 770, line 772 and diode 790 coupled between these lines.

Furthermore, the high voltage is applied across the coil 40 in response to digital signals that gate on the SCR's 762, 764 and 766. The fact that the circuit 757 is controlled digitally makes possible a small, lightweight, economical design for this circuit. Also the combination of a 3-phase input, a large inductance of coil 40 and the free-wheeling provision allows for the absence of any external filtering components that otherwise might be required.

Other aspects, objects and advantages of this invention can be obtained from a study of the drawings, the disclosure and the appended claims.

I claim:

1. Apparatus (11) for actuating an engine in accordance with a predetermined speed curve (1) having a plurality of sequential intervals (0-0', 1-2, 2-3, 3-4, 4-5, 5-6, 6-7, 7-8), the curve (1) specifying the engine speed at any instant of time, comprising:
    (a) means (12, 14, 16, 18, 30, 34, 40, 44) for controlling the speed of the engine; and
    (b) means (10) for automatically actuating said controlling means (12, 14, 16, 18, 30, 34, 40, 44) to run the engine as specified by the speed curve (1), including
        (i) first means (58, 62, 72, 80, 82) for storing data of the duration of several (1-2, 3-4, 5-6, 6-7, 7-8) of said intervals;
        (ii) second means (60, 70) for storing data of the termination speed for at least one (2-3, 4-5) of said intervals;
        (iii) third means (54) for storing data of a speed at which the engine is to run for the duration of at least one (0-0', 6-7) of said intervals; and
        (iv) means (100, 161, 189, 401–401C, 441, 491, 515, 536, 607, 619, 697, 741, 897, 943, 991, 1025) for generating control signals during said plurality of intervals in dependence on the stored data of said first storing means (58, 62, 72, 80, 82), said second storing means (60, 70) and said third storing means (54), wherein said controlling means (12, 14, 16, 18, 30, 34, 40, 44) is responsive to said control signals.

2. Apparatus (11) according to claim 1 wherein said first storing means (58, 62, 72, 80, 82), said second storing means (60, 70), and said third storing means (54) are programmable.

3. Apparatus (11) according to claim 2 wherein said first storing means (58, 62, 72, 80, 82), said second storing means (60, 70) and said third storing means (54) each includes a thumbwheel switch.

4. Apparatus (11) according to claim 1 wherein said means (100, 161, 189, 401–401C, 441, 491, 515, 536, 607, 619, 697, 741, 897, 943, 991, 1025) for generating control signals includes sequencing means (189) for producing interval signals over said sequential intervals.

5. Apparatus (11) according to claim 1 wherein said means (100, 161, 189, 401–401C, 441, 491, 515, 536, 607, 619, 697, 741, 897, 943, 991, 1025) for generating control signals includes:
    (a) means (401–401C, 441, 515) for generating a command signal proportional to said speed data stored in said third storing means (54);
    (b) means (536) for receiving data of actual engine speed and for comparing said actual engine speed data to said command signal and for generating a comparison signal in response thereto; and
    (c) means (619) for generating at least one of said control signals in response to said comparison signal for the duration of at least one (6-7) of said several intervals (1-2, 3-4, 5-6, 6-7, 7-8) given by said data of said first storing means (58, 62, 72, 80, 82).

6. Apparatus (11) according to claim 1 wherein said means (100, 161, 189, 401–401C, 441, 491, 515, 536, 607, 619, 697, 741, 897, 943, 991, 1025) for generating control signals includes:
    (a) means (401–401C, 441, 491, 515) for generating a plurality of command signals proportional to variable speeds at a predetermined rate commencing from said termination speed data of said second storing means (60, 70); and (b) means (536, 619) for generating at least one of said control signals in respose to said command signals for the duration of at least one (3-4, 5-6, 7-8) of said several intervals (1-2, 3-4, 5-6, 6-7, 7-8) given by said data of said first storing means (58, 62, 72, 80, 82).

7. Apparatus (11) according to claim 1 wherein said means (100, 161, 189, 401–401C, 441, 491, 515, 536, 607, 619, 697, 741, 897, 943, 991, 1025) for generating control signals includes:
   (a) means (189) for generating timing signals in response to said data of said first storing means (58, 62, 72, 80, 82) and said second storing meas (60, 70); and
   (b) means (897) for generating at least one of said control signals in response to said timing signals to change slowly the speed of the engine during one (2-3) of said plurality intervals (0-0', 1-2, 2-3, 3-4, 4-5, 5-6, 6-7, 7-8).

8. Apparatus (11) according to claim 1 wherein said means (100, 161, 189, 401–401C, 441, 491, 515, 536, 607, 619, 697, 741, 897, 943, 991, 1025) for generating control signals includes:
   (a) means (189) for generating timing signals in response to said data of said first storing meas (58, 62, 72, 80, 82) and said second storing means (60, 70); and
   (b) means (943) for generating at least one of said control signals in response to said timing signals to change rapidly the speed of the engine.

9. Apparatus (11) for actuating an engine in accordance with a predetermined speed curve (1) having a plurality of sequential intervals (0-0', 1-2, 2-3, 3-4, 4-5, 5-6, 6-7, 7-8), the curve (1) specifying the engine speed at any instant of time, comprising:
   (a) means (12, 14, 16, 18, 30, 34, 40, 44) for controlling the speed of the engine, including
      (i) throttle means (18, 30, 34) for changing engine speed, said throttle means (18, 30, 34) including first means (18) for slowly accelerating the engine, and second means (34) for quickly accelerating the engine; and
      (ii) means (40, 44) for loading the engine to control engine speed; and
   (b) means (10) for automaticaly actuating said controlling means (12, 14, 16, 18, 30, 34, 40, 44) to run the engine as specified by the speed curve (1), including means (100, 161, 189, 401–401C, 441, 491, 515, 536, 607, 619, 697, 741, 897, 943, 991, 1025) for generating a plurality of control signals to control said throttle means (18, 30, 34) and said loading means (40, 44) over said sequential intervals (0-0', 1-2, 2-3, 3-4, 4-5, 5-6, 6-7, 7-8), said generating means including
      (i) means (189, 897) for generating one of said control signals during one (2-3) of said intervals (0-0', 1-2, 2-3, 3-4, 4-5, 5-6, 6-7, 7-8) to actuate said first means (18); and
      (ii) means (189, 943) for generating another of said control signals during at least one other (0-0', 3-4, 5-6) of said intervals (0-0', 1-2, 2-3, 3-4, 4-5, 5-6, 6-7, 7-8) to actuate said second means (34).

10. Apparatus (11) for actuating an engine in accordance with a predetermined speed curve (1) having a plurality of sequential intervals (0-0', 1-2, 2-3, 3-4, 4-5, 5-6, 6-7, 7-8), the curve (1) specifying the engine speed at any instant of time, comprising:
    (a) means (12, 14, 16, 18, 30, 34, 40, 44) for controlling the speed of the engine, including means (40, 44) for loading the engine, said loading means (40, 44) including an energizeable field coil (40) and means (44) for controlling energization of said field coil (40), said energization controlling means (44) including
       (i) controllable rectifier means (762, 764, 766, 784, 786, 788) for delivering power across said field coil (40), including three silicon controlled rectifiers (762, 764, 766) in circuit with said field coil (40) and three diodes (784, 786, 788) in circuit, respectively, with said three silicon controlled rectifiers (762, 764, 766); and
       (ii) means (792, 800) for gating on said rectifier means (762, 764, 766, 784, 786, 788).

11. Apparatus (11) according to claim 10 wherein said means (792, 800) for gating on includes means (800) for simultaneously gating on said three silicon controlled rectifiers (762, 764, 766).

12. Apparatus (11) according to claim 11 wherein said controllable rectifier means (762, 764, 766, 784, 786, 788) further includes a fourth diode (790) in circuit with said field coil (40) and being reverse bias when said silicon controlled rectifiers (762, 764, 766) are conductive.

13. Apparatus (11) according to claim 10 wherein said means (44) for controlling energization of said field coil (40) includes means (776, 780, 808, 820) for controllably inserting resistance in circuit with said field coil (40) to control the decay rate of said coil (40).

14. Apparatus (11) for actuating an engine in accordance with a predetermined speed curve (1) having a plurality of sequential intervals (0-0', 1-2, 2-3, 3-4, 4-5, 5-6, 6-7, 7-8), the curve (1) specifying the engine speed at any instant of time, comprising:
    (a) means (12, 14, 16, 18, 30, 34, 40, 44) for controlling the speed of the engine, including means (40, 44) for loading the engine, said loading means (40,44) including
       (i) an energizeable field coil (40); and
       (ii) means (44) for controlling energization of said field coil (40) including means (776, 780, 808, 820) for controllably inserting resistance in circuit with said field coil (40) to control the decay rate of said coil (40); and
    (b) means (10) for automatically actuating said controlling means (12, 14, 16, 18, 30, 34, 40, 44) to run the engine as specified by the speed curve (1).

15. Apparatus (10) for actuating controlled devices (18, 30, 34, 40, 44) to operate a member in a sequence specified by a predetermined curve (1), the curve (1) including a plurality of lines (0-0', 1-2, 2-3, 3-4, 4-5, 5-6, 6-7, 7-8), each line having a slope and end points and corresponding to an interval (0-0', 1-2, 2-3, 3-4, 4-5, 5-6, 6-7, 7-8) in the sequence, comprising:
    (a) first means (52, 100, 161, 189, 991) for generating first signals corresponding to the intervals;
    (b) second means (52, 401–401C, 441, 491, 515) for generating second signals corresponding to the slopes of certain of said lines in response to certain of said first signals; and
    (c) means (536, 607, 619, 697, 741, 897, 943, 1025) for generating control signals to control the devices to operate the member in the sequence in response to said first signals and said second signals.

16. Apparatus (10) according to claim 15 wherein said first means (52, 100, 161, 189, 991) for generating includes means (52) for generating signals corresponding to the end points of certain of said lines.

17. Apparatus (10) according to claim 16 wherein said means (52) for generating signals corresponding to the end points is programmable.

18. Apparatus (10) according to claim 15 wherein said first means (52, 100, 161, 189, 991) for generating includes means (189, 991) for sequentially generating said first signals, said sequentially generated first signals corresponding to the duration of said intervals.

19. Apparatus (10) according to claim 18 wherein said means (189, 991) for sequentially generating includes:
  (a) a plurality of switchable means (A–H) for producing output signals in dependence on the state of said switchable means;
  (b) means (156, 242, 266, 282, 294, 314, 328, 334, 350) for sequentially switching the state of each of said switchable means (A–H); and
  (c) means (354, 358, 360, 362, 364, 366, 330, 332) for decoding said output signals.

20. Apparatus (10) according to claim 15 wherein said first means (52, 100, 161, 189, 991) for generating includes means (88, 226, 230, 234) for selectively generating any one of several of said first signals.

21. Apparatus (10) according to claim 20 wherein said means (88, 226, 230, 234) for selectively generating includes switch means (88) for selectively producing said several first signals in any sequence.

22. Apparatus (10) according to claim 15 wherein said second means (52, 401–401C, 441, 491, 515) for generating includes means (52, 401–401C, 441, 491) for generating output signals at a certain rate.

23. Apparatus (10) according to claim 22 wherein said means (52, 401–401C, 441, 491) for generating the output signals includes:
  (a) means (52, 401–401C, 441) for storing a count corresponding to an end point of one of the lines; and
  (b) means (491) for controlling said storing means to count from the stored count to another end point of the one line.

24. Apparatus (10) according to claim 23 wherein said means (52, 401–401C, 441) for storing includes:
  (a) means (52) for presetting data corresponding to the count;
  (b) a counter (401–401C); and
  (c) means (441) for shifting the data into said counter (401–401C).

25. Apparatus (10) according to claim 24 wherein said means (441) for shifting shifts the data into said counter (401–401C) during a predetermined interval.

26. Apparatus (10) according to claim 23 wherein said means (52, 401–401C, 441) for storing includes:
  (a) an up-down counter (401–401C); and
  (b) means (438) for controlling the direction of counting.

27. Apparatus (10) according to claim 23 wherein said means (491) for controlling said storing means includes means (492, 498, 504, 510, 512) for clocking said storing means (52, 401–401C, 441).

28. Apparatus (10) according to claim 27 wherein said means (492, 498, 504, 510, 512) for clocking includes a plurality of selectively actuatable oscillators (492, 498, 504) each at a different frequency.

29. Apparatus (10) according to claim 22 wherein said second means (52, 401–401C, 441, 491) for generating the output signals includes:
  (a) means (52, 401–401C, 441) for selectively storing counts corresponding to end points of said certain of said lines; and
  (b) means (491) for controlling said storing means (52, 401–401C, 441) to count from said counts at a selected said certain rate in response to certain of the first signals.

30. Apparatus (10) according to claim 15 wherein said means (536, 607, 619, 697, 741, 897, 943, 1025) for generating control signals includes:
  (a) means (897) for generating one of said control signals in response to one set of said first signals to move one of the controlled devices slowly during one of said intervals from a certain condition; and
  (b) means (897) for generating another of said control signals in response to another set of said first signals at the end of said one interval to return the one controlled device to said certain condition.

31. Apparatus (10) according to claim 30 wherein said means (897) for generating said one of said control signals includes:
  (a) a first transistor (920); and
  (b) first means (934, 928, 924) for gating on said first transistor (920) during said one interval.

32. Apparatus according to claim 31 wherein said means (897) for generating said another of said control signals includes:
  (a) a second transistor (936); and
  (b) second means (934, 940) for gating on said second transistor (936) at the end of said one interval.

33. Apparatus (10) according to claim 15 wherein said means (536, 607, 619, 697, 741, 897, 943, 1025) for generating control signals includes means (943) for generating one of said control signals in response to certain of said first signals during certain of said intervals in said sequence to actuate quickly one of the controlled devices.

34. Apparatus (10) according to claim 33 wherein said means (943) for generating said one of said control signals includes:
  (a) a transistor (950); and
  (b) means (954, 958, 966, 970, 974, 976, 980, 986, 988) for gating on said transistor (950) for non-consecutive of said certain intervals and for a plurality of consecutive of said certain intervals.

35. Apparatus (10) according to claim 34 wherein said means (954, 958, 966, 970, 974, 976, 980, 986, 988) for gating on includes means (954) for delaying gating on said transistor (950) a predetermined time into one of said certain intervals.

36. Apparatus (10) according to claim 15 wherein said means (536, 607, 619, 697, 741, 897, 943, 1025) for generating control signals includes means (536, 619) for occasionally generating control signals during certain of said intervals.

37. Apparatus (10) according to claim 36 wherein said means (536, 619) for occasionally generating includes:
  (a) means (540, 546, 556, 558, 564, 570, 574, 590, 593) for receiving data of the actual condition of the member and generating actual condition data signals therefrom;
  (b) means (596) for comparing said data signals to said second signals for generating output signals in response to the comparison; and
  (c) means (619) for gating said output signals in response to certain of said first signals.

38. In a system (11) for operating an engine in a sequence specified by a speed vs. time curve (1) having, successively, a warm-up interval 0-0', a low idle interval (1-2), a first acceleration interval (2-3), a second acceleration interval (3-4) a closed-throttle-pull-down interval (4-5), a third acceleration interval (5-6), a stabilization interval (6-7), and a lug interval (7-8), the system (11) including throttle means (18, 30, 34) for changing engine speed and means (40, 44) for loading said engine to control engine speed, the improvement comprising means (10) for automatically controlling said throttle means (18, 30, 34) and said loading means (16, 40, 44) to run the engine once through said warm-up interval (0-0') followed by a plurality of successive cycles, each of said cycles commencing with said idle interval (1-2) and ending with said lug interval (7-8).

39. In a system (11) according to claim 38 wherein said means (10) for automatically controlling includes logic circuit means (52, 100, 161, 401–401C, 441, 515, 536, 619, 943, 991) for activating said throttle means (18, 30, 34) and said loading means (16, 40, 44) to run the engine at a predetermined speed and for a predetermined time specified by said warm-up interval (0-0') of said curve.

40. In a system (11) according to claim 39 wherein said logic circuit means (52, 100, 161, 189, 401–401C, 441, 515, 536, 619, 943, 991) includes:
 (a) means (52, 100, 161, 943, 991) for opening rapidly said throttle means (18, 30, 34) for the start of said warm-up interval (0-0') and for maintaining said throttle means (18, 30, 34) open for said predetermined time of said warm-up interval (0-0'); and
 (b) means (52, 100, 161, 401–401C, 441, 515, 536, 619, 991) for regulating said loading means (16, 40, 44) to maintain said predetermined engine speed.

41. In a system (11) according to claim 40 wherein said means (52, 100, 161, 943, 991) for opening rapidly includes:
 (a) switch means (943) for moving said throttle means (18, 30, 34); and
 (b) means (991) for turning on said switch means (943).

42. In a system (11) according to claim 41 wherein said means (991) for turning on includes:
 (a) a control flip-flop (992) coupled to said switch means (943); and
 (b) means (996, 998, 1002) for controlling the state of said flip-flop (992) at the start and the completion of said warm-up interval (0-0').

43. In a system (11) according to claim 40 wherein said means (52, 100, 161, 401–401C, 441, 515, 536, 619, 991) for regulating said loading means (16, 40, 44) includes:
 (a) means (52, 100, 161, 401–401C, 441, 515) for generating a command signal proportional to said predetermined engine speed; and
 (b) means (536, 619) for generating a load regulating control signal in response to said command signal.

44. In a system (11) according to claim 43 wherein said means (52, 100, 161, 401–401C, 441, 515) for generating a command signal includes:
 (a) programmable means (52) for prestoring data corresponding to said predetermined engine speed;
 (b) a counter (401–401C); and
 (c) means (441) for presetting said counter (401–401C) with said data for the start of said warm-up interval (0-0').

45. In a system (11) according to claim 39 wherein said logic circuit means (52, 100, 161, 401–401C, 441, 515, 536, 619, 943, 991) includes means (991) for controlling said throttle means (18, 30, 34) and said loading means (16, 40, 44) to run the engine for said idle interval (1-2) of a first of said cycles following said warm-up interval (0-0').

46. In a system (11) according to claim 38 wherein said means (10) for automatically controlling includes logic circuit means (52, 100, 161, 189, 619, 943, 991) for regulating said throttle means (18,30,34) and said loading means (16,40,44) to run the engine at low idle speed for the duration of said low idle interval (1-2).

47. In a system (11) according to claim 46 wherein said logic circuit means (52, 100, 161, 189, 619, 943, 991) includes:
 (a) first means (52, 100, 161, 619, 943, 991) for closing said throttle means (18, 30, 34) and deactivating said loading means (16, 40, 44) after said warm-up interval (0-0') for the first idle interval (1-2) of said successive cycles; and
 (b) second means (52, 100, 161, 189, 619, 943) for closing said throttle means (18, 30, 34) and deactivating said loading means (16, 40, 44) after each said lug interval (7-8) of said successive cycles.

48. In a system (11) according to claim 47 wherein said second means (52, 100, 161, 189, 619, 943) includes:
 (a) a flip-flop (H) having output states corresponding to said idle interval (1-2) following said lug interval (7-8) and
 (b) means (52, 161, 189) for switching the state of said flip-flop (H) after said lug interval (7-8).

49. In a system (11) according to claim 48 wherein said means (52, 161, 189) for switching includes programmable means (52) for setting the duration of said lug interval (7-8).

50. In a system (11) according to claim 38 wherein said means (10) for automatically controlling includes logic circuit means (52, 100, 161, 189, 401–401C, 441, 515, 536, 619, 897, 1025) for activating said throttle means (18, 30, 34) and regulating said loading means (16, 40, 44) to accelerate the engine during said first acceleration interval (2-3) from low idle speed to a predetermined speed.

51. In a system (11) according to claim 50 wherein said logic circuit means (52, 100, 189, 401–401C, 441, 515, 536, 619, 897, 1025) includes:
 (a) means (52, 100, 189, 897) for opening slowly said throttle means (18,30,34) at the start of said first acceleration interval (2-3) to increase the speed of the engine; and
 (b) means (52, 100, 189, 401–401C, 441, 515, 536, 897) for closing said throttle means (18,30,34) in response to the engine reaching said predetermined speed.

52. In a system (11) according to claim 51 wherein said means (52, 100, 189, 401–401C, 441, 515, 536, 897) for closing includes programmable means (52, 401–401C, 441) for storing a command signal corresponding to said predetermined speed.

53. In a system (11) according to claim 51 wherein said means (52, 100, 189, 897) for opening slowly includes:
 (a) a transistor (920); and
 (b) means (934,928,924) for turning on said transistor (920) at the start of said first acceleration interval (2-3) and for turning off said transistor (920) in response to the engine reaching said predetermined speed.

54. In a system (11) according to claim 51 wherein said means (52, 100, 189, 401–401C, 441, 515, 536, 897) for closing includes:
 (a) a transistor (936);
 (b) programmable means (52, 401–401C, 441) for storing a command signal corresponding to said predetermined speed;
 (c) means (536) for generating a signal proportional to actual engine speed; and
 (d) means (606, 189, 934, 940) for comparing said command signal to said actual engine speed signal and turning on said transistor (936) in response to the engine reaching said predetermined speed.

55. In a system (11) according to claim 38 wherein said means (10) for automatically controlling includes logic circuit means (52, 100, 161, 189, 401–401C, 441, 491, 515, 536, 607, 619, 741, 943) for activating said throttle means (18,30,34) and said loading means (16,40,44) during said second acceleration interval (3-4) to accelerate the engine at a predetermined rate within a predetermined time.

56. In a system (11) according to claim 55 wherein said means (52, 100, 161, 189, 401–401C, 441, 491, 515, 536, 607, 619, 741, 943) for activating includes:
 (a) means (52, 100, 161, 189, 741, 943) for opening rapidly said throttle means (18,30,34) at the start of said second acceleration interval (3-4); and
 (b) means (52, 401–401C, 441, 491, 515, 536, 607, 619, 741) for regulating said loading means (40,44) to control the speed of the engine.

57. In a system (11) according to claim 56 wherein said means (52, 100, 161, 189, 741, 943) for opening rapidly includes:
 (a) switch means (943) for moving said throttle means (18,30,34); and
 (b) means (52, 100, 161, 189, 741) for turning on said switch means (943).

58. In a system (11) according to claim 57 wherein said means (52, 100, 161, 189, 741) for turning on includes means (52,161,189) for turning off said switch means (943) at the termination of said second acceleration interval (3-4).

59. In a system (11) according to claim 58 wherein said means (52,161,189) for turning off includes:
 (a) programmable means (52) for prestoring data corresponding to the duration of said second acceleration interval (3-4); and
 (b) means (161,189) for controlling said switch means (943) in response to said prestored duration data.

60. In a system (11) according to claim 56 wherein said means (52, 401–401C, 441, 491, 515, 536, 607, 619, 741) for regulating said loading means (16,40,44) includes:
 (a) means (52, 401–401C, 441, 491, 515) for generating command signals at said predetermined rate proportional to increasing engine speeds; and
 (b) means (536, 607, 619, 741) for generating load regulating control signals in response to said command signals.

61. In a system (11) according to claim 60 wherein said means (52, 401–401C, 441, 491, 515) for generating command signals includes:
 (a) programmable means (52) for presetting data corresponding to a predetermined engine speed at the start of said second acceleration interval (3-4);
 (b) a counter (401–401C); and
 (c) means (441,491) for shifting said data into said counter (401–401c) and counting up from said data at said predetermined rate for the duration of said second acceleration interval (3-4).

62. In a system (11) according to claim 55 wherein said means (52, 100, 161, 189, 401–401C, 441, 491, 515, 536, 607, 619, 741, 943) for activating includes adjustable means (52,741) for delaying activation of said throttle means (18,30,34) in relation to said loading means (16,40,44) at the start of said second acceleration interval (3-4).

63. In a system (11) according to claim 38 wherein said means (10) for automatically controlling includes logic circuit means (52, 100, 161, 189, 401–401C, 441, 515, 536, 619, 697, 943) for activating said throttle means (18,30,34) and regulating said loading means (16,40,44) to decrease the engine speed to a predetermined speed during said closed-throttle-pull-down interval (4-5) from the engine speed at the end of said second acceleration interval (3-4).

64. In a system (11) according to claim 63 wherein said logic circuit means (52, 100, 161, 189, 401–401C, 441, 515, 536, 619, 697, 943) includes means (52, 100, 161, 189, 401–401C, 441, 515, 536, 943) for closing rapidly said throttle means (18,30,34) at the start of said closed-throttle-pull-down interval (4-5) and for maintaining said throttle means (18,30,34) closed for the duration of said closed-throttle-pull-down interval (4-5).

65. In a system (11) according to claim 64 wherein said means (52, 100, 161, 189, 401–401C, 441, 491, 515, 536, 943) for closing rapdily and maintaining closed said throttle means (18,30,34) includes:
 (a) switch means (943) for controlling said throttle means (18,30,34);
 (b) programmable means (52, 401–401C, 441, 515) for prestoring command data proportional to said predetermined speed;
 (c) means (536) for generating a signal proportional to actual engine speed; and
 (d) means (606,189) for turning off said switch means (943) in response to said prestored data and said actual engine speed signal until the engine speed decreases to said predetermined speed.

66. In a system (11) according to claim 63 wherein said logic circuit means (52, 100, 161, 189, 401–401C, 441, 515, 536, 619, 697,943) includes means (619,697) for setting said loading means (16,40,44) to apply a predetermined load during said closed-throttle-pull-down interval (4-5).

67. In a system (11) according to claim 38 wherein said means (10) for automatically controlling includes logic circuit means (52, 100, 161, 189, 401–401C, 441, 491, 515, 536, 607, 619, 697, 943) for activating said throttle means (18,30,34) and said loading means (40,44) to accelerate the engine from a predetermined speed at a predetermined rate over a predetermined period for said third acceleration interval (5-6).

68. In a system (11) according to claim 67 wherein said means (52, 100, 161, 189, 401–401C, 441, 515, 536, 607, 619, 697,943) for activating includes:
 (a) means (52, 100, 161, 189, 401–401C, 441,515, 536, 943) for opening rapidly said throttle means (18,30,34) at the start of said third acceleration interval (5-6); and
 (b) means (52, 100, 161, 189, 401–401C, 441, 491, 515, 536, 607, 619, 697) for regulating said loading means (16,40,44) to control the speed of the engine.

69. In a system (11) according to claim 68 wherein said means (52, 100, 161, 189, 401-401C, 441, 515, 536, 943) for opening rapidly includes:
  (a) switch means (943) for moving said throttle means (18,30,34);
  (b) programmable means (52, 100, 161, 189, 401-401C, 441, 515) for prestoring command data proportional to said predetermined engine speed;
  (c) means (536) for comparing actual engine speed with said data; and
  (d) means (189) for turning on said switch means (943) in response to the actual engine speed reaching said predetermined speed.

70. In a system (11) according to claim 68 wherein said means (52, 100, 161, 189, 401-401C, 441, 491, 515, 536, 607, 619, 697) for regulating said loading means (16,40,44) includes:
  (a) means (52, 100, 161, 189, 401-401C, 441, 491, 515) for generating engine-speed command signals at said predetermined rate; and
  (b) means (536,607,619) for generating load regulating control signals in response to said command signals.

71. In a system (11) according to claim 70 wherein said means (52, 100, 161, 189, 401-401C, 441, 491, 515) for generating command signals includes:
  (a) programmable means (52) for presetting data corresponding to said predetermined engine speed for the start of said third acceleration interval (5-6);
  (b) a counter (401-401C); and
  (c) means (52, 189, 441, 491) for shifting said data into said counter (401-401C) and counting up from said data at said predetermined rate for the duration of said third aceleration interval (5-6).

72. In a system (11) according to claim 71 wherein said means (52, 189, 441, 491) for shifting and counting up includes programmable means (52,189) for presetting data corresponding to the duration of said third acceleration interval (5-6) and ceasing said counting up at the end of said third acceleration interval (5-6).

73. In a system (11) according to claim 38 wherein said means (10) for automatically controlling includes logic circuit means (52, 100, 161, 189, 401-401C, 441, 515, 536, 619, 943) for maintaining said throttle means (18,30,34) open and regulating said loading means (16,40,44) to run the engine at a predetermined speed for a predeterined time for said stabilization interval (6-7).

74. In a system (11) according to claim 73 wherein said means (52, 100, 161, 189, 401-401C, 441, 515, 536, 619, 943) for regulating said loading means (16,40,44) includes:
  (a) means (52, 100, 161, 189, 401-401C, 441, 515) for generating a command signal proportional to said predetermined speed for the duration of said stabilization interval (6-7); and
  (b) means (536,619) for generating load regulating control signals in response to said command signal.

75. In a system (11) according to claim 74 wherein said means (52, 100, 161, 189, 401-401C, 441, 515) for generating said command signal includes:
  (a) programmable means (52) for presetting data corresponding to said predetermined speed;
  (b) programmable means (52) for presetting data corresponding to the duration of said stabilization interval (6-7);
  (c) a counter (401-401C); and
  (d) means (189,441) for shifting said speed data into said counter (401-401C) for the start of said stabilization interval (6-7) and maintaining said speed data in said counter (401-401C) in response to said duration data.

76. In a system (11) according to claim 38 wherein said means (10) for automatically controlling includes logic circuit means (52, 100, 161, 189, 401-401C, 441, 491, 515, 536, 619, 943) for maintaining said throttle means (18,30,34) open and regulating said loading means (16,40,44) to decelerate the engine from a predetermined speed at a predetermined rate over a predetermined period for said lug interval (7-8).

77. In a system (11) according to claim 76 wherein said means (52, 100, 161, 189, 401-401C, 441, 491, 515, 536, 619, 943) for regulating includes:
  (a) means (52, 100, 161, 189, 401-401C, 441, 491, 515) for generating engine speed command signals at said predetermined rate; and
  (b) means (536,619) for generating load regulating control signals in response to said command signals.

78. In a system (11) according to claim 77 wherein said means (52, 100, 161, 189, 401-401C, 441, 491, 515) for generating command signals includes:
  (a) programmable means (52) for presetting data corresponding to said predetermined speed;
  (b) programmable means (52) for presetting data corresponding to said predetermined period;
  (c) a counter (401-401C); and
  (d) means (189,441,491) for shifting said speed data into said counter (401-401c) for the start of said lug interval (7-8) and counting down from said predetermined speed at said predetermined rate and for ceasing said counting down in response to said period data.

79. In a system (11) according to claim 38 wherein said means (10) for automatically controlling includes set-up means (52, 100, 161, 189, 401-401C, 441, 491, 515) for selectively generating command signals only for said second acceleration interval (3-4) or said third acceleration interval (5-6) or said lug interval (7-8).

80. In a system (11) according to claim 38 wherein said means (10) for automatically controlling includes means (52, 100, 161, 189, 401-401C, 441, 491, 515, 536, 607, 619, 741, 897, 943, 1025) for activating said throttle means (18,30,34) and said loading means (40,44) to run the engine through each said interval except said warm-up interval (O-O') and the idle interval (1-2) of a first of said successive cycles.

81. In a system (11) according to claim 38 wherein said means (10) for automatically controlling includes:
  (a) means (1031, 1028, 1026, 1036, 1042, 1048, 92) for counting each of said cycles; and
  (b) means (1054, 1050) for ceasing controlling the engine in response to counting a predetermined number of cycles.

82. In a system (11) according to claim 81 wherein said means (1031, 1028, 1026, 1036, 1042, 1048, 92) for counting includes means (1036, 1042, 1048, 92) for displaying each count of said cycles and an end of cycles condition.

83. In a system (11) according to claim 38 wherein said loading means (16,40,44) includes a dynamometer (16).

84. In a system (11) according to claim 83 wherein said means (10) for automatically controlling includes means (831) for regulating the flow of cooling water for said dynamometer (16).

85. In a system (11) according to claim 38 further including a variable speed chart recorder (50).

86. In a system (11) according to claim 85 wherein said means (10) for automatically controlling includes means (1061) for regulating the speed of said recorder (50).

87. In a system (11) according to claim 38 wherein said means (10) for automatically controlling includes means (52, 100, 161, 189) for sequentially generating interval signals for a certain sequence (2-3, 3-4, 4-5, 5-6, 6-7, 7-8, 1-2).

88. In a system (11) according to claim 87 wherein said means (52, 100, 161, 189) for generating includes:
(a) a plurality of flip-flops (A–H) corresponding, respectively, to said certain sequence (2-3, 3-4, 4-5, 5-6, 6-7, 7-8, 1-2) of intervals;
(b) means (52, 100, 161, 156, 242, 266, 282, 294, 314, 328, 334) for successively controlling the state of each said flip-flop (A–H); and
(c) means (354, 358, 360, 362, 364, 366 330) for decoding the state of said flip-flops (A–H).

89. In a system (11) according to claim 88 wherein said means (52, 100, 161, 156, 242, 266, 282, 294, 314, 328, 334) for successively controlling includes: (a) programmable means (52) for setting data corresponding to the duration of a number (3-4, 5-6, 6-7, 7-8, 1-2) of certain intervals; and (b) clock means (161) for generating time signals during each of said certain intervals (2-3, 3-4, 4-5, 5-6, 6-7, 7-8, 1-2).

90. In a system (11) according to claim 89 wherein said means (52, 100, 161, 189) for generating further includes means (368, 370, 372, 374, 376, 378, 394) for resetting said clock means (161).

* * * * *